United States Patent
Rust et al.

(10) Patent No.: US 6,418,392 B1
(45) Date of Patent: Jul. 9, 2002

(54) SYSTEM AND METHOD FOR SIMULATING OPERATIONS OF AN INSTRUMENT

(75) Inventors: Scott Rust; Jon Bellin, both of Austin; James Grey, Cedar Park, all of TX (US)

(73) Assignee: National Instruments Corporation, Austin, TX (US)

(*) Notice: Subject to any disclaimer, the term of this patent is extended or adjusted under 35 U.S.C. 154(b) by 20 days.

(21) Appl. No.: 09/696,341

(22) Filed: Oct. 24, 2000

Related U.S. Application Data

(63) Continuation of application No. 09/138,336, filed on Aug. 21, 1998, which is a continuation-in-part of application No. 09/045,243, filed on Mar. 20, 1998, now abandoned.

(51) Int. Cl.[7] .............................................. G01D 18/00
(52) U.S. Cl. ......................................... 702/123; 702/91
(58) Field of Search .......................... 702/90, 91, 117, 702/122, 123

(56) References Cited

U.S. PATENT DOCUMENTS

| | | | |
|---|---|---|---|
| 5,790,432 A | | 8/1998 | Morys |
| 5,807,175 A | | 9/1998 | Davis et al. |
| 5,847,955 A | * | 12/1998 | Mitchell et al. ............... 700/86 |
| 5,974,257 A | * | 10/1999 | Austin ......................... 123/481 |
| 6,023,541 A | * | 2/2000 | Merchant et al. ............. 385/20 |
| 6,106,298 A | * | 8/2000 | Pollak ........................... 434/29 |

OTHER PUBLICATIONS

Obland, "Applying New Software Technologies to Solve Key System Integration Issues," Jul. 1997, pp. 1–9.
*IEEE Guide to the Use of Atlas*, Apr. 1980, pp. 1–157.
*IEEE Standard C/Atlas*, Mar. 1982, pp. 2–1 thru B–14.

* cited by examiner

*Primary Examiner*—Marc S. Hoff
*Assistant Examiner*—Craig Steven Miller
(74) *Attorney, Agent, or Firm*—Conley, Rose & Tayon PC; Jeffrey C. Hood

(57) ABSTRACT

A system and method for controlling an instrumentation system, wherein the present invention includes an improved instrument driver software architecture. The instrument driver software architecture of the present invention provides a number of features, including improved simulation features. The system may comprise a computer system comprising a CPU and memory. The memory of the computer system may store a user application, a class driver, and a class simulation driver. The user application is operable to perform an application using an instrument, wherein the instrument is of a first class. The class driver is operable to receive calls from the user application, wherein the class driver is common to a plurality of instruments of the first class. The class driver may then call a class simulation driver, wherein the class simulation driver is operable to simulate operation of the instrument. For example, the class simulation driver may be operable to simulate output values and return values of function calls. The class simulation driver is preferably operable to simulate operation of the plurality of instruments of the first class. The memory may also store a specific driver which is specific to the respective instrument. The class simulation driver may be operable to simulate operation of at least a portion of the specific driver. The class simulation driver may also be operable to simulate operation of at least a portion of the specific driver for each of the plurality of instruments of the first class.

34 Claims, 36 Drawing Sheets

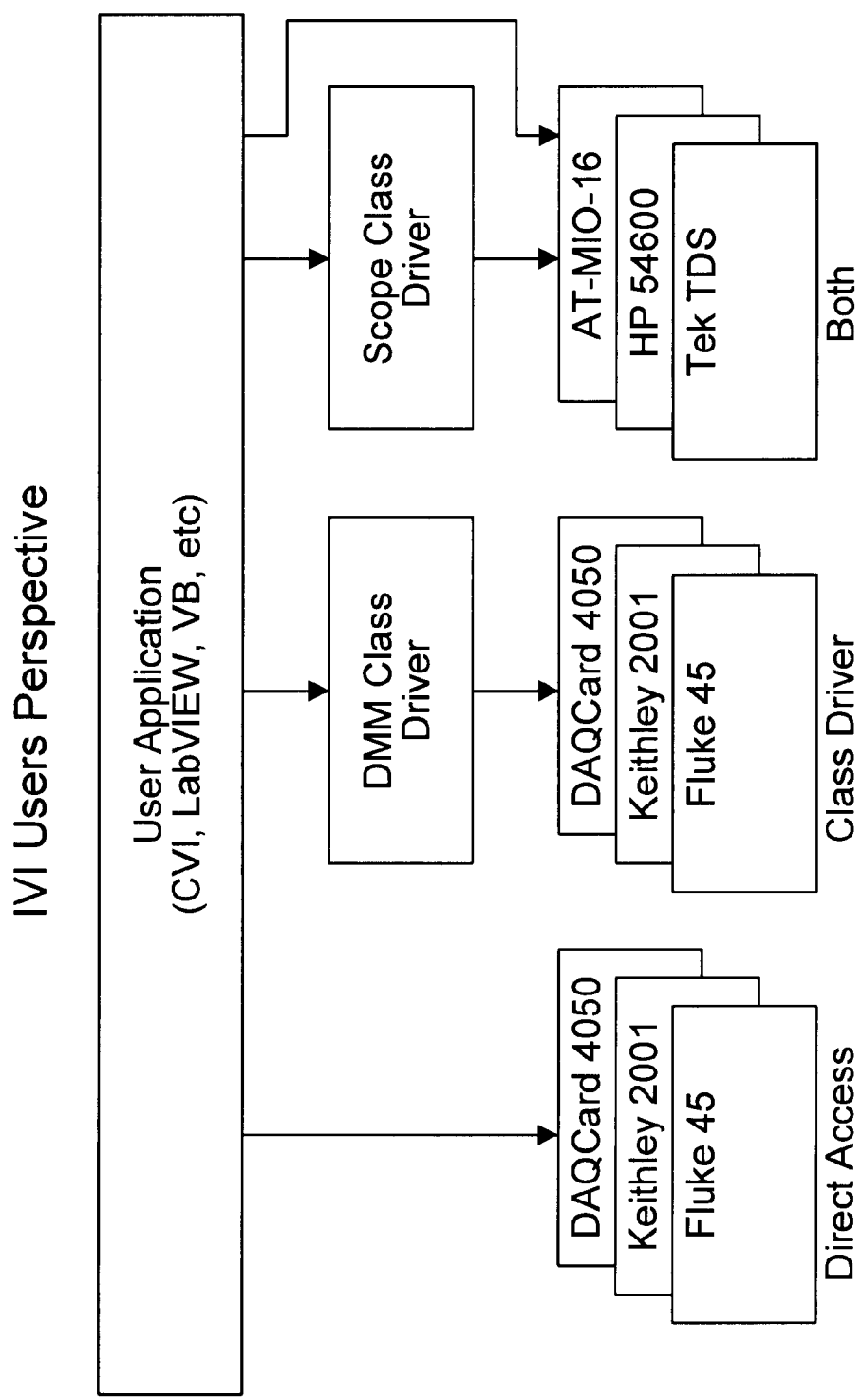

SYSTEM AND METHOD FOR SIMULATING OPERATIONS OF AN INSTRUMENT

CONTINUATION DATA

This is a continuation of application Ser. No. 09/138,336 titled "Instrumentation System and Method Which Performs Instrument Interchangeability Checking" filed Aug. 21, 1998 now pending, whose inventors are Scott Rust, Jon Bellin, and James Grey which is a continuation-in-part of application Ser. No. 09/045,243 titled "Instrumentation System and Method Using Generic Instrument Drivers" and filed Mar. 20, 1998, now abandoned, whose inventors are Scott Rust, Jon Bellin, and James Grey.

FIELD OF THE INVENTION

The present invention relates to instrument driver software for instrumentation systems, and more particularly to an instrumentation driver software architecture for communicating with and controlling instruments in an instrumentation system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modem instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into various types, including IEEE 488-controlled instruments (GPIB instruments), VXI bus instruments, plug-in data acquisition (DAQ) boards, PCI bus and PXI bus instruments, and serial instruments, such as RS-232-controlled, USB, or IEEE 1394 instruments, among others. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message-based instruments and register-based instruments. A message-based instrument is an instrument which is controlled by a string of ASCII characters, whereas a register-based instrument is controlled by writing a bit stream of 1's and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system.

PCI (Peripheral Component Interconnect) bus instruments and PXI (PCI eXtensions for Instrumentation) instruments leverage off of the PCI bus found in mainstream computer systems. These instruments include a connector which is electrically compatible with the PCI bus. "Desktop PCI" instruments have a conventional PCI form factor for use in desktop PCs. The PXI instrumentation bus standard, promulgated by National Instruments, includes a Compact-PCI mechanical form factor, is electrically compatible with the PCI bus, and includes extra signal definitions for instrumentation purposes.

A computer can also control an instrumentation system through a serial connection, such as the computer's serial or RS-232 port, the USB (Universal Serial Bus), or the IEE 1394 or 1394.2 bus, referred to as Firewire. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently requires the involvement of a programmer to develop software for acquisition, analysis and presentation of instrumentation data.

The software architecture for an instrumentation system, such as a virtual instrumentation system, comprises several components. The top level of the software architecture typically comprises an application program used for high level control of the virtual instrument. Examples of high level application programs for instrumentation control are LabVIEW, LabWindows\CVI, and ComponentWorks from National Instruments Corp. Other examples of applications programs are HP VEE from Hewlett-Packard and DasyLab from DasyTec GMBH, among others. These application programs provide a user with the tools to control instruments, including acquiring data, analyzing data, and presenting data.

The application programs mentioned above typically operate in conjunction with one or more instrument drivers to interface to actual physical instruments. For example, the LabVIEW and LabWindows application software each include instrument libraries comprising drivers for more than six hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become de facto standards in the industry. Another example of driver level software is the Standard Instrument Control Library (SICL) offered by Hewlett-Packard and the VISA (Virtual Instrument Software Architecture) promulgated by the VXIplug&play Consortium.

FIG. 1 illustrates the historical evolution of instrument drivers. When IEEE 488.1 instruments were first introduced, standardized I/O libraries were provided which allowed users to provide strings to instruments. These standardized libraries include libraries for IEEE 488.1, IEEE 488.2 and the VISA I/O libraries. The progression from IEEE 488.1 to IEEE 488.2 and then to VISA represent a progression or evolution of the I/O libraries and how the user communicates with an instrument. However, each of these libraries generally still required the user to understand command strings and/or what registers were required to peek and poke within an application to control an instrument.

After the introduction of standardized I/O libraries, there was a movement to standardize the commands that users provided to instruments. This standardization of commands was referred to as SCPI (Standard Commands for Programming Instruments). SCPI allowed generic applications that worked with any of a plurality of instruments. In other words, each of the instruments accepted the same commands and behaved generically based on those commands. However, SCPI did not provide a sufficient number of commands to cover all the different types of instruments available.

During this time, companies such as National Instruments and Hewlett Packard, among others, have been developing instrument drivers. Instrument drivers are custom written libraries of software that are specific to a given instrument. These instrument drivers encapsulate, at a high level, the commands that are required to communicate to a given instrument. These instrument drivers encapsulate all of the low level syntax and the order of operation that is required to send commands to an instrument, which can be very difficult and time consuming.

Examples of current prior art instrument drivers are those developed for LabVIEW and LabWindows/CVI. These instrument drivers present the user with a set of high level functions that are easy to understand and use in their programs. The VXIplug&play consortium was formed to extend these instrument drivers. The VXIplug&play standard ensured that the user could install instrument drivers from a variety of vendors on one computer, and those instrument drivers would not conflict with each other. In other words, instrument drivers which conformed to the VXIplug&play standard would behave gracefully in a system comprising a plurality of instrument drivers supplied by a variety of vendors, thus providing system interoperability. However, the VXIplug&play instrument drivers did not address other high level system issues, such as state caching, simulation and instrument interchangeability, among others.

A primary problem with the traditional software architecture for an instrumentation system is that a separate instrument driver is required for each specific instrument. In addition, the user is required to include certain instrument driver specific commands in an application program. Thus, when a user creates an application program using an instrument of a certain class, if the user later desires to use a different instrument of that same class, such as instrument from a different vendor, or if the user desires to use an instrument of that same class but having a different hardware interface type, the user is required to modify the application program and then recompile the program.

Therefore, it would be highly desirable for instrument driver software to be independent or generic with respect to a certain class of instruments. In other words, when a user writes a software application to control a specific instrument of a first class, it would be desirable for the software application to control all instruments of that first class, such as instruments supplied from different vendors or with different hardware interface types. It would further be desirable to provide other high level instrument driver features, including state caching, simulation, verification of replacement instruments, and an attribute model.

Therefore, an improved system and method is desired for controlling instrumentation systems and for providing a user or developer with the capability to develop instrument drivers and application software for controlling instrumentation systems. An instrument driver software architecture is further desired which allows the use of generic instrument drivers and provides enhanced features.

SUMMARY OF THE INVENTION

The present invention comprises a system and method for controlling an instrumentation system, wherein the present invention includes an improved instrument driver software architecture. The instrument driver software architecture of the present invention provides a number of features, including instrument interchangeability, i.e., the use of interchangeable virtual instruments or interchangeable instrument drivers, improved performance, an improved attribute model, improved range checking, and improved simulation features, among others.

The instrumentation system comprises a computer system including a CPU and memory and at least one instrument coupled to the computer system. The instrument includes a plurality of settings which indicate a state of operation of the instrument.

The memory of the computer system stores a user application which performs an application using the instrument. The memory also stores a specific instrument driver which controls the instrument, wherein the specific instrument driver includes a plurality of functions which control operation of the instrument. The specific instrument driver includes a plurality of attributes which model the attributes or settings of the instrument. If the system includes a plurality of instruments, the memory preferably stores a specific i.d. for each instrument.

In the preferred embodiment, the instrument is of an instrument class, such as DMM, scope, etc. The memory of the computer system preferably stores a class driver which is generic to instruments of the respective class. Thus the class driver incorporates capabilities or functions which are generic or common to instruments of the respective class, and the class driver operates with substantially all instruments of the respective class. For example, the instrumentation system includes a class driver which is generic to all DMMs (digital multimeters), a class driver which is generic to oscilloscopes, etc. The class driver operates for any instrument within the class of instruments regardless of manufacturer or hardware interface type.

The memory of the computer system also stores an interchangeable virtual instrument (IVI) engine. The IVI engine operates as a support library to each of the class drivers. Thus, the IVI engine is generic to each of the class drivers, and provides services to each of the class drivers. The IVI engine includes one or more set attribute functions for setting attributes in the instrument and includes one or more get attribute functions for obtaining values of attributes from the instrument. The set attribute functions and the get attribute functions in the IVI engine are common for each of the class drivers and specific instrument drivers.

The memory of the computer system further stores an initialization (INI) file which includes configuration information for a virtual instrument, wherein the virtual instrument includes the instrument and the specific driver. The INI file specifies the name and location of the specific driver and the address of the instrument as well as other information regarding the virtual instrument. According to the present invention, the user is generally required only to change configuration information in the INI file in order to replace instruments of a class or change functionality of the virtual instrument.

The user application includes an initialization (init) function call to the class driver which initializes the class driver and the specific driver. After the single init call, the user application can make calls to functions in the class driver or the specific driver. The user application preferably makes calls to the class driver. All the functions in the class driver are generic functions, i.e., functions which are common to all or most of the specific drivers within the class. This provides the instrument interchangeability benefits of the present invention. The user application can also make calls to generic functions directly to the specific driver. The user application can further make calls to unique functions, also referred to as instrument-specific functions, i.e., functions which are not generic to the class and hence do not reside in the class driver, directly to the specific driver.

When the class driver receives a function call from the user application, the class driver obtains a function pointer from the IVI engine. The class driver uses the pointer to invoke the corresponding function in the specific instrument driver. Functions in the specific driver perform operations on the respective instrument. The functions include calls to VISA to communicate directly with the instrument and/or they include calls to the set attribute functions and/or get attribute functions in the IVI engine, which operate to set and get attributes in the specific driver.

The set and get attribute functions perform a standard set of operations. These operations include range checking, coercion of attribute values, state caching, writing a setting to the instrument, reading a setting from the instrument, and checking the instrument status. To perform these operations, the set and get attribute functions access range tables provided by the specific instrument driver and invoke callback functions in the specific instrument driver.

As noted above, the specific driver includes attributes which model attributes or settings of the instrument. The specific driver also includes attributes referred to as development/production attributes, such as state caching, interchangeability checking, range checking, instrument status checking, and coercion recording. The INI file stores the attribute values for the virtual instrument, and the IVI engine is operable to examine the initialization file and configure the attributes in the specific driver with attribute settings from the INI file. According to the present invention, the initialization (INI) file is operable to be configured with these development/production attributes in a development mode during development of the user application. The initialization (INI) file is operable to be configured with these development/production attributes in a production mode during production of the user application. In other words, during development and testing of the system, the user can configure the INI file with these attributes in a mode for testing and development, e.g., state caching disabled, and interchangeability checking, range checking, instrument status checking, and coercion recording enabled for debugging purposes. After development has been completed, the user can configure the INI file with these attributes in a mode which provides increased performance, such as enabling state caching, and disabling interchangeability checking, range checking, instrument status checking, and coercion recording.

Each class of instruments includes one or more of three types of attributes and functions, these being fundamental, extension and instrument-specific. Fundamental attributes and functions are those which are generic or fundamental to the class of instruments, i.e., all or most instruments of the class have each of the fundamental attributes and functions. Accordingly, the class driver and each of the specific drivers are required to include each of the fundamental attributes and functions. Extension attributes and functions are those which are generic or common to a subset, but not all, of the instruments of the class. Extension attributes and functions are required to be in the class driver and are included in some specific drivers, but are not required in all specific drivers. Instrument-specific attributes and functions are those which are specific to only one or more instruments of the class. Instrument-specific attributes and functions are not included in the class driver, and are included in only the specific drivers corresponding to the one or more instruments which support the instrument-specific attributes and functions.

Capability groups are groups of related functions and attributes. There are two types of capability groups, these being the fundamental capabilities group and extension groups. Each class of instruments contains one fundamental capabilities group. The fundamental capabilities group contains all of the fundamental functions and fundamental attributes. Extension groups are groups of related extension functions and extension attributes. If a specific driver implements any of the functions or attributes of an extension group, the specific driver must implement all of the functions and attributes that the extension group contains.

The present invention provides a feature referred to as instrument interchangeability, meaning that once an application is created for an instrumentation system using a specific instrument of a first class, wherein the application was created using a class driver which is generic to the first class, the user can readily substitute other instruments of the first class without modifying the user application. Rather, the user is required only to change configuration information in the INI file to interchange instruments of a class.

The class driver of the present invention also performs instrument interchangeability checking when a function call is received to verify that an instrument is in an interchangeable state. Thus, when the class driver receives a function call which causes the instrument to perform a function based on a current configuration of the instrument, the class driver performs instrument interchangeability checking. In the preferred embodiment, instrument interchangeability checking includes first determining if fundamental attributes which will affect instrument behavior in the current configuration are in a user-specified state, i.e., the application program took explicit actions to set the states of the attributes. If one or more fundamental attributes which will affect instrument behavior in the current configuration are not in a user-specified state, the class driver records an error.

The class driver then determines which extension groups have extension attributes that have ever been in a user-specified state. If an extension group contains attributes which have ever been in a user-specified state and also contains one or more attributes that will affect instrument behavior but which are not currently in user-specified state, the class driver records an error.

The class driver also determines if one or more extension groups have never been in a user-specified state and are implemented in the specific driver. If all of the extension attributes of one or more extension groups have never been in a user-specified state and are implemented in the specific driver, the class driver sets all the extension attributes that are in the groups and that will affect instrument behavior to default values, thereby placing the instrument in an interchangeable state.

In order to ensure instrument interchangeability, the user preferably creates the initialization file to include default values of the instrument-specific attributes of the virtual instrument. Thus, when the user application makes a call to the initialization function in the class driver to control the instrument, the class driver sets the instrument-specific attributes to the default values according to the information in the initialization file. Thus the user can replace the instrument with a second instrument of the same class, wherein the replacement does not require any modifications to the user application, but rather only requires changing a portion of the initialization file to include different default values for the instrument-specific attributes.

The present invention thus provides an instrument driver software architecture which provides a number of features and benefits. The system includes an attribute model which provides improved performance over prior systems. The present invention also provides features such as state caching for improved performance, simulation features, development/production modes, instrument interchangeability, interchangeability checking and verification of replacement instruments. Therefore, the present invention comprises a system and method for controlling an instrumentation system. The present invention allows for greater flexibility and greater reusability of code as well as simplified driver and/or application development.

BRIEF DESCRIPTION OF THE DRAWINGS

A better understanding of the present invention can be obtained when the following detailed description of the preferred embodiment is considered in conjunction with the following drawings, in which:

FIG. 26 illustrates a user perspective of the IVI system; and

DETAILED DESCRIPTION OF THE PREFERRED EMBODIMENT

Incorporation by Reference

U.S. patent application Ser. No. 09/045,243 titled "Instrumentation System and Method Using Generic Instrument Drivers" filed Mar. 20, 1998 whose inventors are Scott Rust, Jon Bellin, and James Grey, is hereby incorporated by reference in its entirety as though fully set forth herein.

U.S. Pat. No. 5,724,272 (Ser. No. 08/238,480) titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety as though fully set forth herein, including the appendices therein. The above-referenced patent application discloses a system referred to as the Virtual Instrument Software Architecture (VISA), which is being formulated as IEEE standard 1226.5 and VXIPlug&Play specification VPP 4.1.

U.S. patent application Ser. No. 08/544,286 titled "System and Method for Creating Resources in an Instrumentation System" filed Oct. 17, 1995, whose inventors were Bob Mitchell, Hugo Andrade, Jogen Pathak, Samson DeKey, Abhay Shah, and Todd Brower, and which was assigned to National Instruments Corporation, is hereby incorporated by reference in its entirety as though fully set forth herein, including the appendix therein.

Figure 2A:
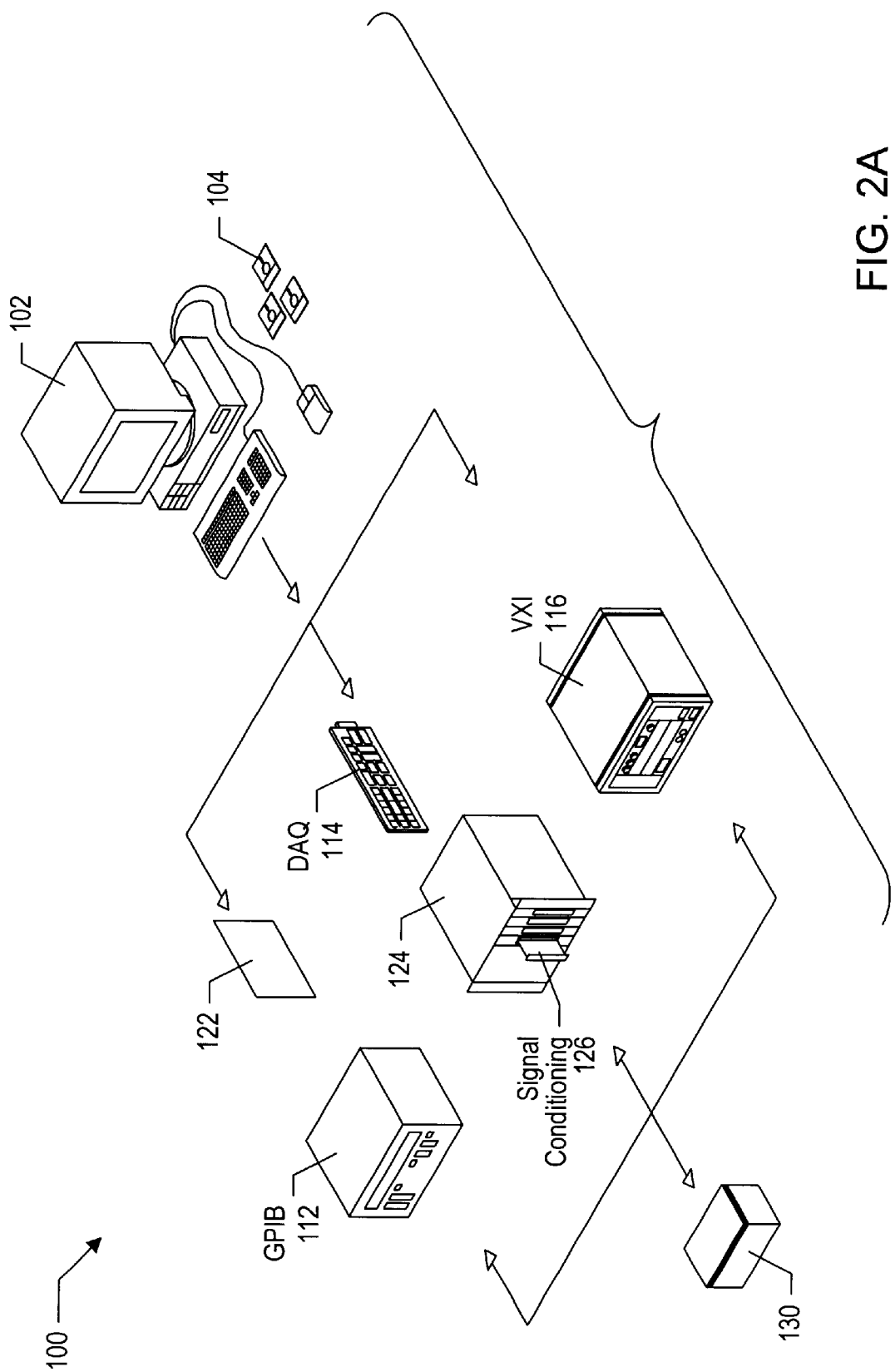
FIGS. 2A and 2B illustrate representative instrumentation control systems of the present invention including various I/O interface options.
Figure 2B:
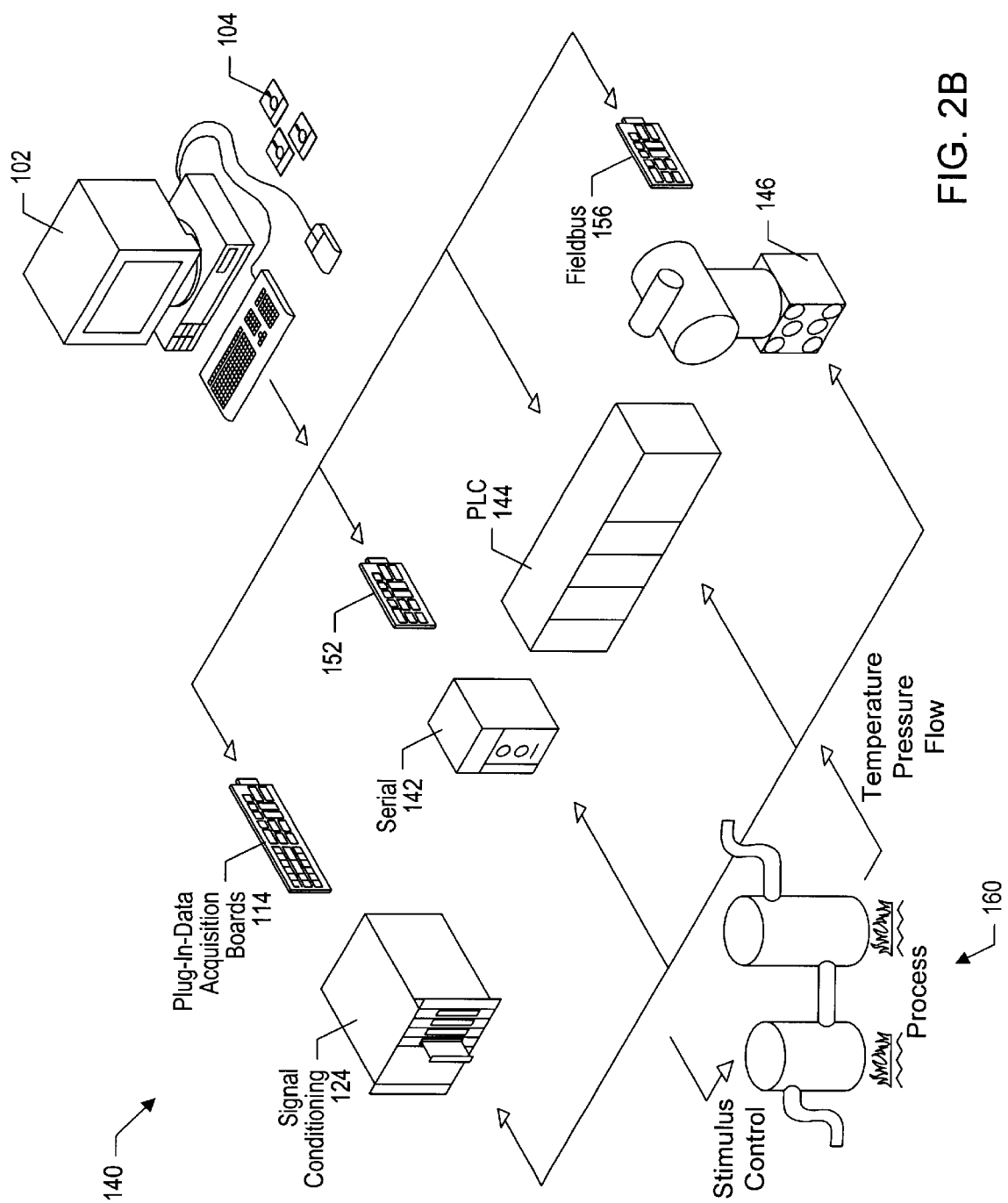

FIGS. 2A and 2B—Instrumentation and Industrial Automation Systems

Referring now to FIG. 2A, an instrumentation control system 100 is shown. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning eXtensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown) comprised in the computer 102.

The one or more instruments may also include PXI (PCI eXtensions for Instrumentation) instruments (not shown), which are preferably comprised in a PXI chassis (not shown) connected to the computer system. In addition, a serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 2B, an industrial automation or process control system 140 is shown. The industrial automation system 140 is similar to the instrumentation or test and measurement system 100 shown in FIG. 2A. Elements which are similar or identical to elements in FIG. 1 have the same reference numerals for convenience. The system 140 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 150. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or a proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 12 and 156 are shown external to computer 102 for illustrative purposes. In typical industrial automation systems a device will not be present of each interface type, and in fact many systems may only have one or more devices of a single interface type, such as only PLCs. The devices are coupled to the device or process 150.

In the present disclosure, the term "instrument" is used to refer to various types of instruments such as GPIB instruments, VXI instruments, PXI instruments and RS-232 instruments. The term "instrument" is also used to refer to a data acquisition (DAQ) board in a computer system and/or a computer system configured with a DAQ board. The term "instrument" is further intended to include industrial automation and process control devices. In addition, the term instrument also refers to "virtual instruments" (combinations of hardware and/or software instruments) executing on a computer system, including VISA resources. In addition, the term "instrumentation system" is used herein to refer to test and measurement systems as well as industrial automation, process control and modeling systems, among others.

Referring again to FIGS. 2A and 2B, the host computer 102 preferably includes a memory media, such as an installation media, e.g., CD-ROM, tape drive, or floppy disks 104. The host computer 102 also preferably includes a non-volatile media, such as a magnetic media, e.g., a hard drive, or optical storage, as well as system memory, such as DRAM, SRAM etc. The memory media preferably stores a programming development system for developing and executing programs to configure or control the instruments or perform instrumentation functions. The host programming development system is preferably a graphical programming system, e.g., LabVIEW, for developing and executing graphical programs.

The memory media also stores an instrument driver software architecture according to the present invention. As discussed below, the instrument driver software architecture preferably includes one or more class drivers, one or more specific instrument drivers, and an IVI (interchangeable virtual instrument) engine, as well as other software tools and utilities. The host CPU executing code and data from the system memory comprises a means for performing generic instrument driver functions according to the steps described below.

Although in the preferred embodiment the instrument driver software architecture is involved with controlling or communicating with instruments, it is noted that the present invention can be used for a plethora of applications and is not limited to instrumentation or industrial automation applications. In other words, FIGS. 2A and 2B are exemplary only, and the present invention may be used in any of various types of systems.

Computer System Block Diagram

Figure 1:
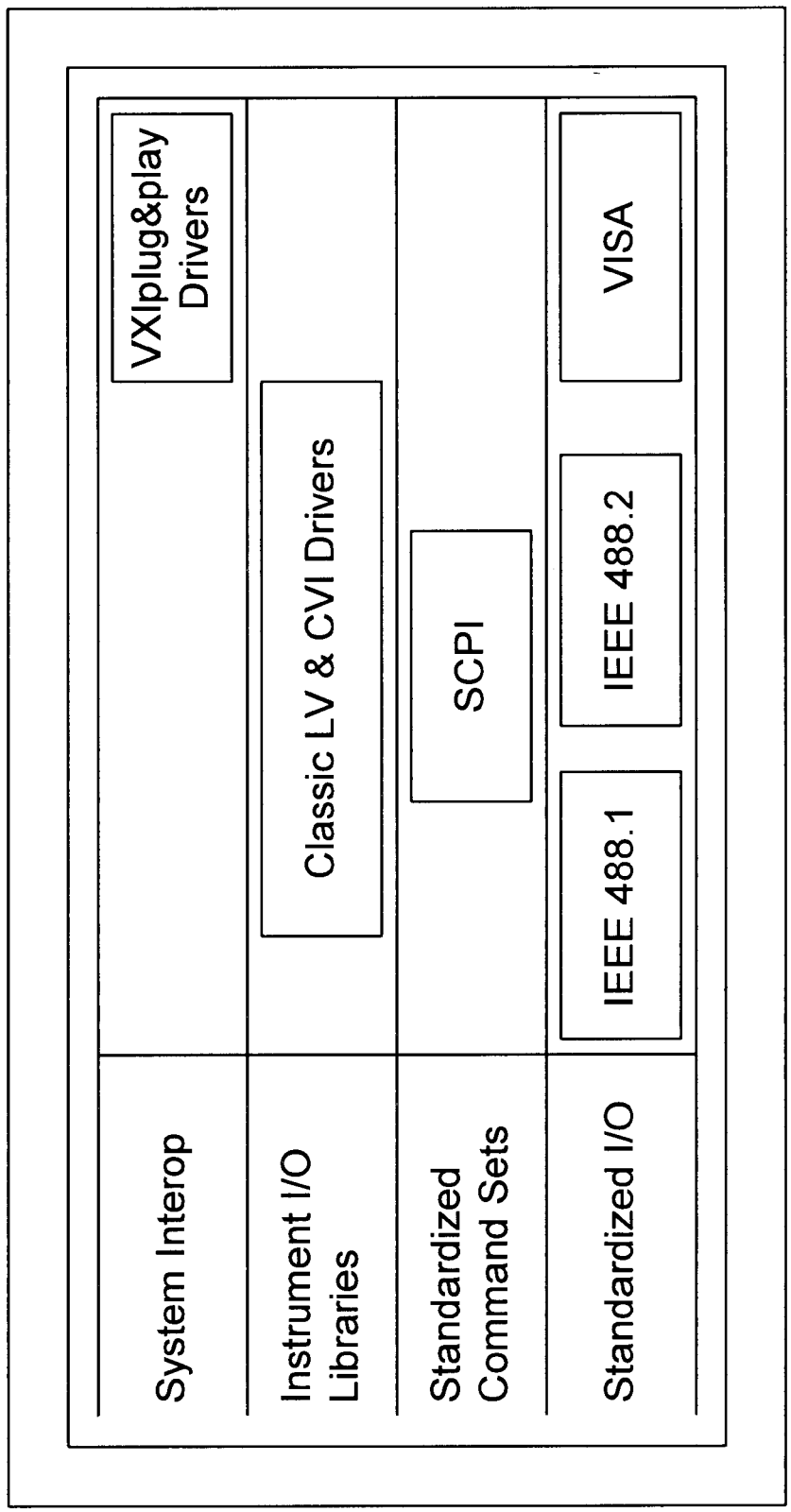
FIG. 1 illustrates the historical evolution of instrument drivers.
Figure 3:
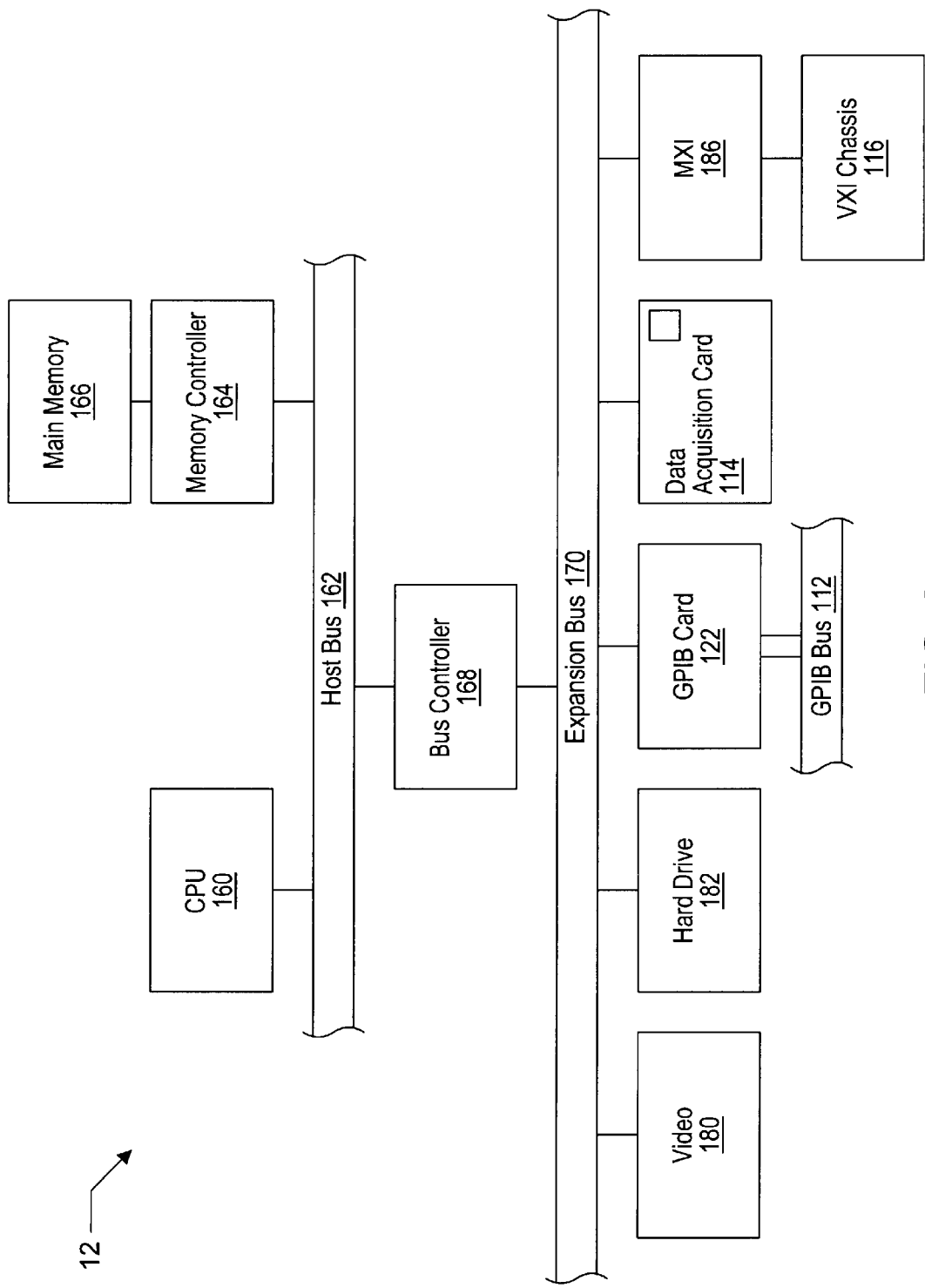
FIG. 3 is a block diagram of a computer system used to control an instrumentation system.

Referring now to FIG. 3, a block diagram of the computer system illustrated in FIGS. 1 and 2 is shown. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the operation of the present invention have been omitted for simplicity The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores a program development system, such as a graphical programming system, e.g., LabVIEW, or other types of development environments such as LabWindows\CVI, ComponentWorks, Visual Basic, etc. The main memory 166 also stores a generic instrument driver software architecture according to the present invention. The main memory 166 also stores operating system software as well as the software for operation of the computer system, as well known to those skilled in the art. The generic instrument driver software architecture will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1), a GPIB interface card 122 which provides a GPIB bus interface to the GPIB instrument 112 (of FIG. 1), and a VXI or MXI bus card 186 coupled to the VXI chassis 116 for receiving VXI instruments. The computer 102 further comprises a video display subsystem 180 and hard drive 182 coupled to the expansion bus 170.

Instrumentation Software Architecture (prior art)

Figure 4:
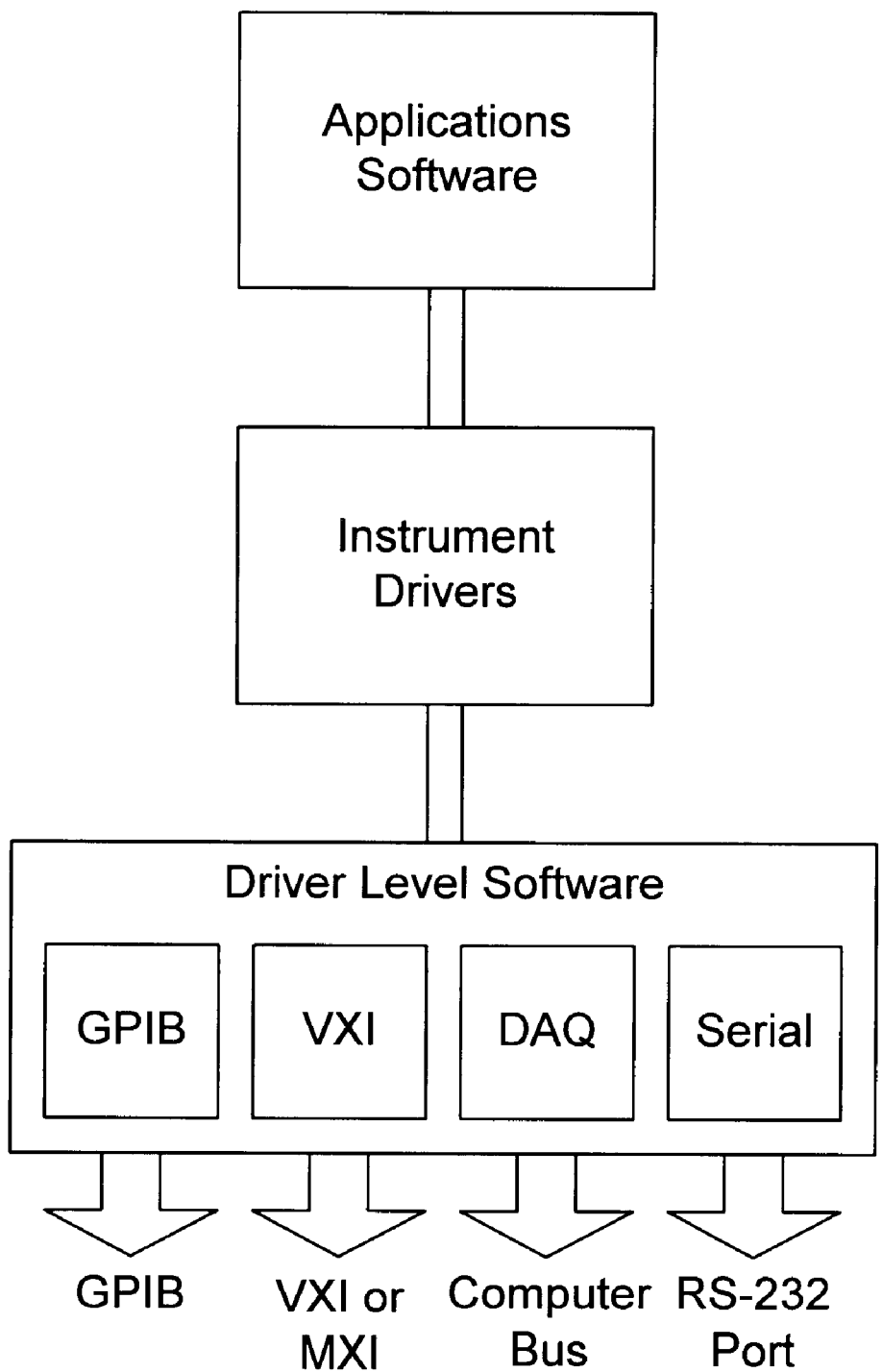
FIG. 4 illustrates the current software architecture for instrumentation systems.

Referring now to FIG. 4, a diagram illustrating a representative software architecture for an instrumentation system according to the prior art is shown. As discussed in the background section, the top level of the software architecture typically comprises an application program used for high level control of the virtual instrument.

The application program typically operates in conjunction with one or more instrument drivers to interface to actual physical instruments. The instrument drivers are designed to reduce a user's application development time by providing intuitive high level functions that relieve the user of complex low level instrument programming. In prior art systems, each specific instrument requires its own instrument driver with a different set of functions.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over the physical I/O connection between the computer and instruments.

Figure 5:
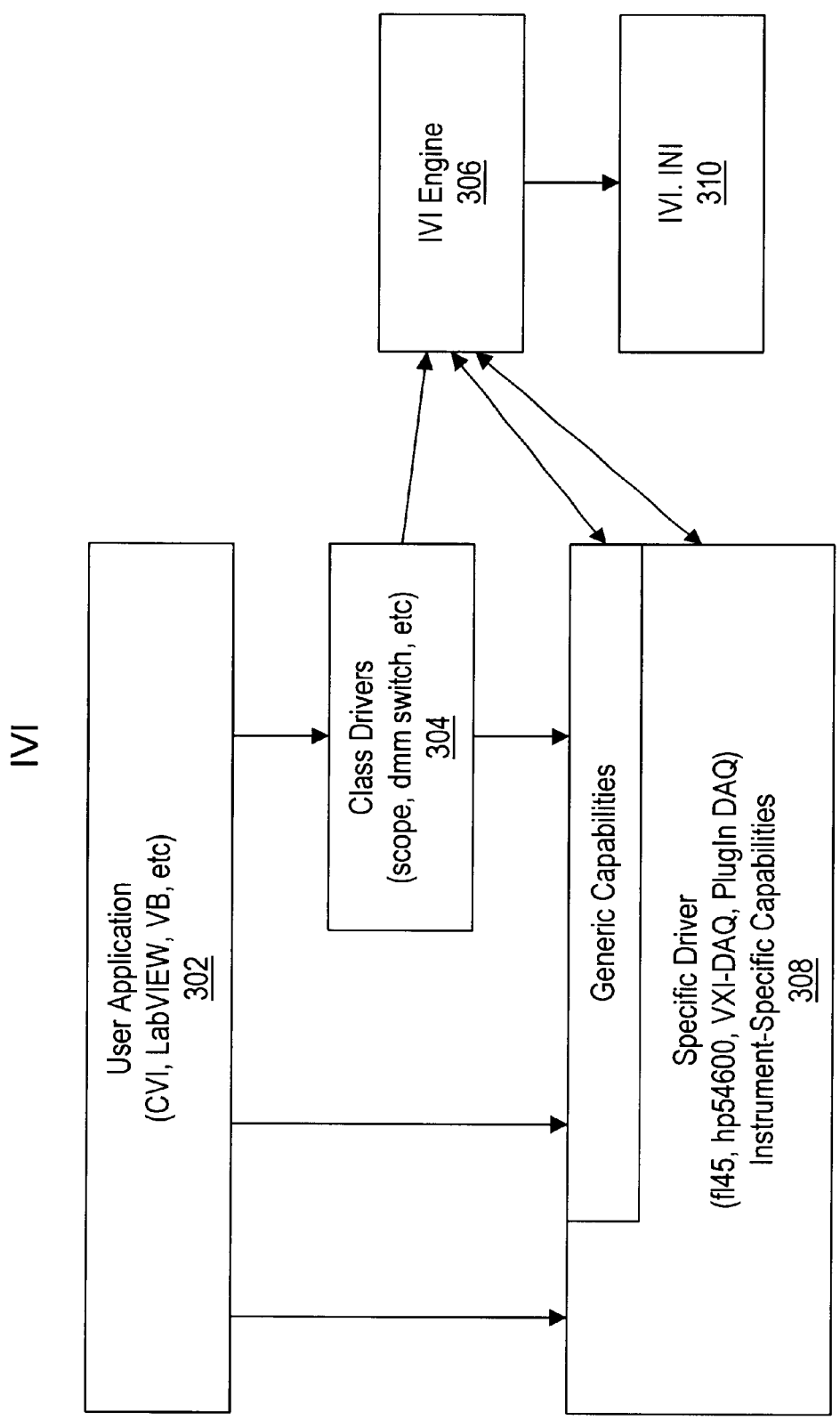
FIG. 5 illustrates the software architecture of the preferred embodiment of the present invention.

FIG. 5—Generic Instrument Driver System Architecture

The present invention comprises a system and method for controlling an instrumentation system using an improved instrument driver software architecture. The improved instrument driver software architecture is referred to as Interchangeable Virtual Instruments (IVI) or Intelligent Virtual Instruments (IVI). The instrument driver software architecture of the present invention provides generic or interchangeable instrument drivers. The phrase "generic instrument drivers" refers to instrument drivers which are generic to a specific class of instruments. In the present disclosure, an instrument driver which is generic to a specific class of instruments is referred to as a class driver. The instrument driver software architecture of the present invention also provides other features, such as an improved attribute model, improved simulation, state caching, improved range checking, instrument interchangeability checking, and deferred updates.

Referring now to FIG. 5, a diagram illustrating the software architecture of the preferred embodiment of the present invention is shown. As shown, the generic instrument driver software architecture of the preferred embodiment includes at least one user application 302, preferably one or more class drivers 304, one or more specific instrument drivers 308, an IVI (interchangeable virtual instrument) engine 306 and a configuration or initialization file 310, referred to as IVI.ini The user application includes calls to one or more of the class drivers 304 and/or the specific drivers 308. As shown, the specific instrument driver includes an instrument-specific capabilities portion as well as a generic or fundamental capabilities portion. The user application can interface directly to the instrument-specific capabilities portion, much like prior art systems where the application communications directly with an instrument driver specific to a particular instrument. As shown, the user application can also interface through the class driver 304 to the generic capabilities portion of the specific instrument driver. The user application can further interface directly to the generic capabilities portion of the specific instrument driver. When the user application interfaces through the class driver 304 to the generic capabilities portion of the specific instrument driver, the instrument interchangeability features of the present invention are realized.

Each of the one or more class drivers 304 is generic to a certain class of instruments. For example, the instrumentation system includes a class driver which is generic to DMMs (digital multimeters), a class driver 304 which is generic to oscilloscopes, a class driver which is generic to switches, a class driver generic to power supplies, a class driver generic to waveform generators, etc. The class driver is generic to instruments within the class, regardless of manufacturer and/or hardware interface type.

In one embodiment, the class driver 304 operates for any instrument, i.e., is generic to all instruments in the class. In the preferred embodiment, the class driver 304 operates for a majority of instruments within the class of instruments. More particularly, the class driver 304 is preferably designed for the most common application needs within the class, or for the fundamental capabilities of instruments within the class, including functions, attributes, and attribute values. In the preferred embodiment, the fundamental capabilities of the class driver 304 are designed to support more than 95% of the instruments of the respective class. The term "extensions" refers to less common capabilities of instruments within a class, i.e., capabilities which are supported by only a subset of the instruments within the class. One or more of these extension capabilities are implemented in the class driver 304 and are optionally supported by a specific driver 308. Extension groups are groups of related extension attributes and functions. Instrument-specific capabilities are capabilities which are specific to only one or more instruments of the class. Instrument-specific capabilities are preferably not included in the class driver, and are included in only the specific drivers corresponding to the one or more instruments which support the instrument-specific capabilities.

Therefore, each class of instruments includes one or more of three types of attributes and functions, these being fundamental, extension, and instrument-specific. Fundamental attributes and functions are those that are generic or fundamental to the class of instruments, i.e., all or most instruments of the class have each of the fundamental attributes and functions. Accordingly the class driver and each of the specific drivers are required to include each of the fundamental attributes and functions. Extension attributes and functions are those that are generic or common to a subset, but not all, of the instruments of the class. Extension attributes and functions are required to be in the class driver and are included in some specific drivers, but are not required in all specific drivers. Instrument-specific attributes and functions are those which are specific to only one or more instruments of the class. Instrument-specific attributes and functions are not included in the class driver, and are included in only the specific drivers corresponding to the one or more instruments which support the instrument-specific attributes and functions. The term "generic" attributes and functions is intended to include one or both of fundamental attributes and functions and extension attributes and functions.

Capability groups are groups of related functions and attributes. There are two types of capability groups, these being the fundamental capabilities group and extension groups. Each class of instruments contains one fundamental capabilities group. The fundamental capabilities group contains all of the fundamental functions and fundamental attributer. Extension groups are groups of related extension functions and extension attributes. If a specific driver implements any of the functions or attributes of an extension group, the specific driver must implement all of the functions and attributes that the extension group contains.

Each class driver includes a defined API (Application Programming Interface). Where instrument interchangeability is desired, the user uses the class driver 304 to write his/her application 302, i.e., the user creates an application 302 which makes calls to the class driver 304. The class driver 304 essentially operates as a router, i.e., the class driver includes a pass-through layer to the specific driver. The class driver 304 thus knows how to find functions in the specific instrument driver 308 required to perform the desired function. Each of the specific instrument drivers 308 are specific to a specific instrument. In other words, each of the specific instrument drivers 308 are specific to an instrument of a certain class, manufacturer, model and hardware interface type. Thus the system still requires specific drivers 308 for each instrument. If an instrumentation system only includes one or more instruments of a first class, the instrumentation system is only required to include the class driver corresponding to that first class, in addition to IVI-compliant specific drivers for each instrument in the system.

The class driver 304 initializes a virtual instrument based on a logical name. The class driver 304 also adds all class specified attributes. Attributes are marked as "Not Supported" if not implemented in the specific driver. The class driver 304 also simulates output parameter data for class functions when simulation is enabled.

When applications are written using the class driver, the user can swap instruments using a configuration utility, with no source code changes and no re-compilation. Thus the class driver provides instrument interchangeability.

As discussed above, the specific instrument driver 308 includes a generic capabilities portion and a specific driver portion for instrument-specific capabilities. The generic capabilities portion comprises capabilities which are generic or common to every specific instrument driver of that class. The specific instrument driver 308 contains all instrument driver source code, including fundamental capabilities or functions, extension capabilities, and driver specific capabilities. The specific instrument driver 308 includes driver functions such as initialization (init), configuration (config), and various other functions for communicating with and/or controlling the instrument. The specific instrument driver 308 also includes attribute callbacks and range tables. The specific instrument driver 308 also operates to publish/add all of its attributes to the IVI engine 306. It is noted that the specific driver 308 can be used independently of the class driver 304.

According to the present invention, the user and/or user application 302 is required to interface only to the class driver 304 when using common functionality. In other words, when creating a user application 302, the user is generally only required to have knowledge of the class driver 304, unless specific non-common functionality (referred to as instrument-specific capabilities) of a particular instrument is desired.

In the preferred embodiment, the class driver 304 incorporates references to the core functionality of the class of instruments, i.e., the generic capabilities portion. Thus a user application 302 is required to access a specific instrument driver 308 directly only when non-common functionality (instrument-specific capabilities) of a specific instrument is desired. In an alternate embodiment, the class driver 304 incorporates additional non-core capabilities (extension capabilities) of the class that exist only for certain specific instruments within the class. In other words, the class driver 304 incorporates functionality which is common to most instruments within the class, but not all. In this embodiment, if a certain function is not implemented by the respective instrument, the class driver 304 returns an error message.

The instrumentation system of the preferred embodiment preferably includes the initialization or configuration file (INI file) 310 which comprises information on each of the instruments or virtual instruments present in the instrumentation system. The term "virtual instrument" is used herein to refer to an instrument and its respective specific driver, i.e., a combination of hardware and software. The INI file 310 maps Logical Names used in a program to a Virtual Instrument section. The Virtual Instrument Section operates to link a hardware section and a driver section. The Virtual Instrument Section also sets driver modes, such as range checking, simulation, spying, interchangeability checking, and instrument status checking, using parameters called rangecheck, simulate, spy, interchangecheck, and queryInstrStatus. The INI file also defines Virtual Channel Names which map channel name aliases to instrument-specific channel names and specifies a default instrument setup for the virtual instrument.

For example, if the user application generically references a DMM as "DMM1", the configuration file stores information regarding which actual instrument and instrument driver in the system corresponds to DMM1. The configuration file stores information regarding the address of the instrument and the location of the instrument driver. This enables the system to load the specific driver and communicate with the instrument. An example INI file for a DMM is included in the present application. If the user desires to replace DMM1 with a different DMM, the user simply modifies the configuration file or INI file. The user is not required to recompile the program, but rather changing the configuration information in the INI file operates to replace the instrument.

As noted above, the instrumentation system of the preferred embodiment includes an IVI engine, also referred to as the IVI (Intelligent/Interchangeable Virtual Instrument) engine 306. As shown, the IVI Engine 306 communicates with each of the class drivers 304, the generic capabilities portion of the specific driver 308 and the instrument-specific capabilities portion of the specific driver 308. The IVI engine also couples to the initialization file referred to as IVI.INI 310. As shown, the IVI engine 306 and the specific driver 308 include bidirectional communication. The IVI engine 306 operates to create and manipulate IVI instrument driver objects. The IVI engine 306 also manages function pointers to the specific driver and calls driver-specific attribute callbacks. The IVI engine 306 further manages all instrument driver attributes and performs Set and Get attribute operations. The IVI engine 306 also performs state caching and attribute simulation operations.

When the user application 302 makes a call or invokes a method on the class driver 304, the class driver 304 accesses information in the IVI Engine 306. The class driver 304 uses services provided by the IVI engine 306 to access the respective function in the specific instrument driver 308 which performs the operation on the specific instrument. More specifically, when the class driver receives a function call, the IVI engine 306 provides a pointer to the class driver, wherein the pointer points to the respective function in the specific driver. In other words, all calls to the class driver 304 actually invoke the specific instrument driver 308 of the instrument being called. Thus the class driver 304 itself does not actually configure or "touch" the instrument, but rather preferably in every case the specific instrument driver 308 of the instrument is invoked to actually perform the configuration or operation. The IVI engine 306 thus operates with a respective class driver 304 to enable operation of the class driver 304 within the system. The IVI engine 306 is capable of operating with each of the class drivers 304 within the system. Thus the IVI engine 306 is generic to each of the class drivers 304 and provides services to each of the class drivers 304.

The user application 302 couples through the class driver 304 to the generic capabilities portion of the instrument driver 308. Thus the user application 302 invokes common or generic functionality of an instrument preferably using calls to the class driver 304. The user application 302 preferably accesses the generic capabilities portion of the instrument driver 308 through the class driver 304, and not directly. It is noted that the user application 302 can still access the generic capabilities directly, i.e., without invoking the class driver 304. However, this does not provide the replacement and re-usability benefits of the present invention. Rather, when the user application 302 is developed primarily or exclusively with the concept of a generic instrument, such as a generic DMM, using calls to the class driver 304, the user and/or user application 302 is not required to think in terms of the specific driver and/or the specific instrument. This greatly simplifies application development.

As shown, the user application 302 couples directly to the specific driver portion of the instrument driver 308 for instrument-specific capabilities. Thus the user application 302 can access non-core or non-common functionality, referred to as instrument-specific capabilities, of a particular instrument by making a call directly to the specific driver portion of the instrument driver 308. Thus instrument-specific functions, e.g., functions that only the respective specific instrument can perform, are still available for the user to directly access.

The specific driver 308 is operable to use services and/or functions in the IVI engine 306, such as set attribute and get attribute functions in the IVI engine 306. Likewise, the IVI engine 306 is operable to invoke callbacks in the specific driver 308 to perform its services and/or functions. The IVI engine 306 preferably includes a plurality of set attribute and get attribute functions, each for a respective data type. For example, the IVI engine 306 preferably includes set attribute and get attribute functions for data types such as int32, real 64, Booleans, strings, pointers, etc.

It is noted that prior art specific instrument drivers include functions which begin with the particular name of the instrument, such as FL45_function or HP34401_function. Accordingly, prior art user applications are generally required to uses the specific function names. Thus in a prior art system when it is desired to switch to a different instrument of the same class, thus user is at least required to change the program to now reference the correct driver. According to the present invention, the user application simply references generic instrument functions, and thus the user application can be used with different instruments of the same class.

Instrument Attributes

According to the present invention, an instrument is partitioned or broken up into various settings or attributes. The attributes are used to define the configuration or state of the instrument, and are also used to represent internal IVI options. More specifically, an instrument includes settings which reflect the state of the instrument. The specific driver includes attributes which model the settings of the instrument. A "virtual instrument" includes the instrument as well as one or more of the specific driver and the class driver. A virtual instrument includes attributes, including the attributes or settings of the instrument as well as the attributes of the specific driver. In the preferred embodiment, calls to get and set attributes in the specific driver are used to program the instrument, or more generally are used to program the virtual instrument.

A user application reads an attribute value to determine the current state of the resource, for example, how the resource is processing an operation, or how the resource should operate when something occurs. A user application sets an attribute to change the way in which the resource operates. The manipulation of attributes, i.e., setting/getting attributes, is enabled by the IVI engine 306. The user application 302 invokes set and get attribute functions in the class driver 304 or specific driver 308. When the class driver or specific driver receives a call to the set or get attribute functions, the class driver or the specific driver invokes the set or get attribute function in the IVI engine 306. The IVI engine invokes callbacks in the specific driver 308. As discussed further below, attributes provide simulation, caching and deferred update features, among others.

Each Attribute has the following: ID, flags, callback function pointers, a range table pointer, and an invalidation list. The ID is a defined constant which is the name of the attribute.

The flags of an attribute include the following:
NOT_READABLE
NOT_WRITABLE
NOT_USER_READABLE
NOT_USER_WRITABLE
NEVER_CACHE
ALWAYS_CACHE
NO_DEFERRED_UPDATE
DONT_RETURN_DEFERRED_VALUE
WAIT_FOR_OPC_BEFORE_READS
WAIT_FOR_OPC_AFTER_WRITES
NOT_SUPPORTED
FLUSH_ON_WRITE
MULTI_CHANNEL
COERCEABLE_ONLY_BY_INSTR
USE_CALLBACKS_FOR_SIMULATION
DON'T_CHECK_STATUS Each attribute includes callback function pointers which define how operations are performed on the attribute, including Read, Write, Check, RangeTable, Coerce, Compare, etc. The Read and Write callback function pointer references a function which defines how to read or write this attribute for the instrument. The Check callback function pointer references a function which verifies that a value is valid for the attribute. The RangeTable callback function pointer references a function which obtains the correct range table for the attribute. The Coerce callback function pointer references a function which coerces a value that the user application specified to a value that the instrument accepts or the value to which the instrument itself would coerce the application-specified value. The Compare callback function pointer references a function which compares a cached value that was previously obtained by a read from the instrument with the value the application program is attempting to write to the instrument.

The range table pointer holds the address of the range table for the attribute. The range table expresses all possible values for the attribute. The range table also contains the command strings or register values that the driver sends to the instrument to set a particular value. Based on a range table, the IVI engine can perform range checking and coercion operations for the attribute. The IVI engine performs these operations by providing default check and coerce callbacks. Thus, the specific driver is not required to include callback functions for this purpose.

The invalidation list defines the attributes to invalidate when this attribute is written. In general, whenever the user sets an attribute, this can cause the state of another attribute to become unknown. Thus, each attribute includes an invalidation list which specifies all the attributes whose cached values becomes invalid when the respective attribute is set.

Figure 6A:
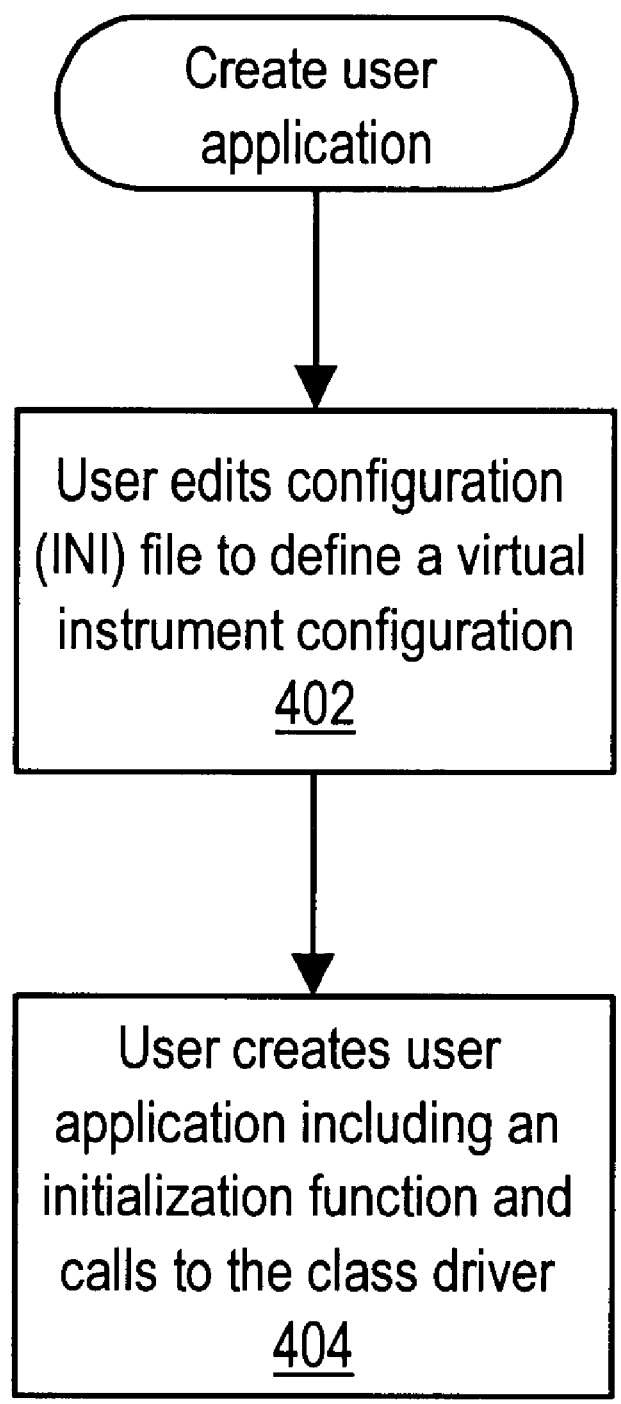
FIG. 6A is a flowchart diagram illustrating user creation of a user application.

FIG. 6A—Creating a User Application

FIG. 6A is a simple flowchart diagram which illustrates creation of a user application 302. As shown, in step 402 the user or developer edits or modifies an IVI.INI file. In step 402 the user creates a logical name that is used in the user's program when the program calls the INIT function on the class driver. In step 402 the user or developer also specifies information in a virtual instrument section in the IVI.INI file for the respective instrument. The logical name identifies which specific driver to load and the address of the instrument that the program will communicate with. The logical name maps to the virtual instrument section in the IVI.INI file, which includes information on a virtual instrument. The virtual instrument is a combination of software, e.g., an instrument driver for the specific instrument, and hardware, the specific instrument that is being controlled or communicated with.

The virtual instrument section in the INI file includes tag names which refer to a hardware section later in the INI file and a driver tag that refers to a driver section later in the INI file. The hardware section specifies the VISA resource descriptor or address used to talk to the instrument. The driver section lists the module path, i.e., the file name and path on the computer to access the specific instrument driver. The driver section also includes the prefix that is used by the functions in the respective instrument driver. The IVI.INI file includes this information so that, when the user application is executed, the IVI engine can locate and load the correct specific driver, determine the functions that can be called on the specific instrument driver, obtain function pointers to the functions, and can assemble the function names correctly.

The virtual instrument section entry in the INI file also includes other information, including parameters for different modes of operation, such as enabling or disabling of state caching, simulation, interchangeability checking, spying, and range checking, among others. The virtual instrument section entry in the INI file also includes a virtual channel name list. The virtual channel name list comprises a list of virtual channel names that can be used in the user application and specifies how the virtual channel names map to specific channel names that the specific driver understands.

The virtual instrument section entry in the INI file also includes a default setup entry which references an optional section in the INI file called the default setup section. The default setup section lists names of attributes and a default value for each of the attributes. The default setup section is used later by the class driver to set a default state for the instrument.

In step 404 the user creates a user application. The user application first includes an initialization function which operates to initialize the software and the instrument being controlled. The initialization function call includes a parameter where the user passes in a logical name to identify the specific instrument that the user desires to initialize. The logical name was previously configured in step 402.

The user application also includes calls to the generic class driver. For example, if the class of instruments is "DMM", the user application includes generic DMM configure, DMM measure, etc., calls. The user application may also include "Get Attribute" and "Set Attribute" calls which operate to get and set attributes on the instrument. The user application further may include calls made directly to the specific driver, such as calls to access instrument-specific capabilities which are not included in the class driver.

Figure 6B:
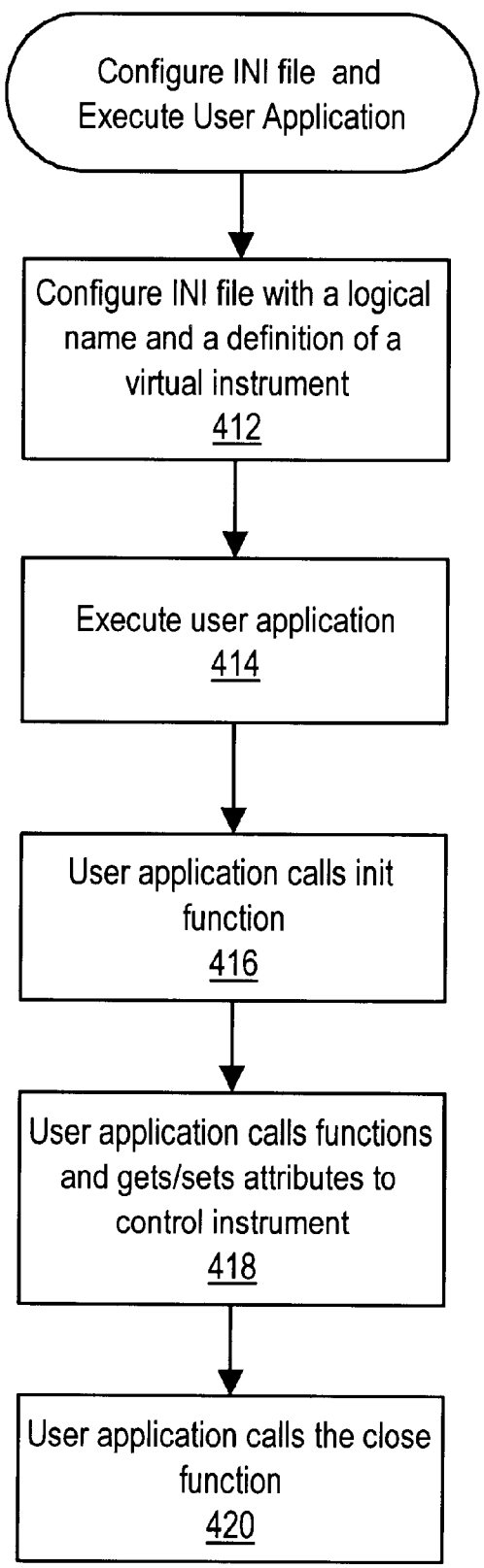
FIG. 6B is a flowchart diagram illustrating configuration and execution of a user application.

FIG. 6B—Execution of a User Application

FIG. 6B is a flowchart diagram illustrating operation of a user configuring an INI file with a configuration for a virtual instrument and then executing a user application according to the preferred embodiment of the present invention.

As shown, in step 412 the user configures the IVI.INI file with a logical name and a definition of a virtual instrument. As discussed above, the logical name refers to a virtual instrument. The virtual instrument comprises the actual physical instrument, i.e., one or more instruments, as well as the corresponding specific driver for that instrument. The virtual instrument definition includes information such as which instrument driver corresponds to the instrument, the identification of the instrument, and mode information, such as whether state caching, instrument interchangeability checking, and other features are enabled or disabled.

In step 414 the user application is executed. In general, the first function call in a user application is an init call. In step 416 the user application calls the init function. The operation of the init function is discussed in further detail with respect to FIGS. 7A–7D. In step 418 the user application calls functions and gets and sets attributes to control the instrument. In other words, in step 418 the body of the user application is executed to perform the desired application for which the user application is intended, such as performing a desired test and measurement, among others.

In general the last call in the user application is the close call. In step 420 the user application calls the close function.

FIG. 7—Executing the Initialization Function in the User Application

FIGS. 7A–7D are a flowchart diagram which illustrates execution of an initialization function call in the user application 302. Here it is presumed that a class driver 304 has been created which includes functions and attributes. The functions and attributes in the class driver represent the generic capabilities of the class of instruments for which the class driver is intended. It is also presumed that the user has received or developed a specific instrument driver 308 which was written using the IVI engine 306 and developed in accordance with the specification of a given class, i.e., is an IVI compliant specific instrument driver.

The specific instrument driver 308 was developed using the API of the class driver 304. Thus the function names that exist in the class driver 304 are similar to the function names in the generic capability section of the specific driver 308. In the preferred embodiment, the functions are identical with the exception of the prefix, wherein the prefix is a unique identifier for the instrument driver. In addition, the parameters, attributes, and the values accepted for those parameters and attributes are identical between the class driver 304 and the specific driver 308. The user application 302 makes calls to the functions in the class driver 304, and also operates to get or set attributes in the class driver 304.

As shown, in step 422 the user application calls an initialization function in the class driver 304. Step 422 corresponds to step 416 of FIG. 6B, and the remaining steps of FIGS. 7A–7D involve execution of the init function. As noted above, the user application includes calls to a driver initialization function (init) in the class driver 304 which creates or instantiates the driver and returns a handle. The user application can either initialize the class driver or the specific driver. Where the generic instrument driver of the present invention is used or desired, the user application includes an initialization command to initialize the class driver.

The init call uses a logical name which represents a virtual instrument, i.e, represents the instrument being called, the instrument specific driver 308, as well as related configuration information. The logical name is a reference to a virtual instrument section in the IVI.ini file.

In step 424 the class driver 304 receives the initialization command. In response to receiving the initialization function call in step 424, in step 426 the class driver 304 makes a call to the IVI engine 306. In step 426 the class driver 304 provides the logical name received from the user application 302 for the instrument being called or initialized to the IVI engine 306. The class driver 304 also provides an array of all the function names that the class driver 304 defines and that might be present in the specific driver 308. Therefore, in a later step (step 432), the IVI engine 306 knows which function pointers to find in the specific driver 308 when the specific driver 308 is loaded. The class driver 304 thus effectively informs the IVI engine 306 that the class driver 304 is attempting to initialize the particular instrument.

In response to receiving the initialization function call and the instrument logical name in step 426, in step 428 the IVI engine 306 uses the logical name to reference into the IVI.ini file to retrieve the information associated with the logical name. This operates to retrieve all the information that is held in the IVI.ini file into memory. As discussed below, the IVI engine 306 uses this information to perform various operations in later steps. For example, in step 430 based on the specific driver module path, i.e., where the specific driver module 308 is located, the IVI engine 306 loads the specific driver 308 into memory and then examines the driver 308 to obtain all of the function pointer entry points for the functions that the class driver 306 indicated might be present in the driver 308 when the class driver 306 passed in the array of function names. Thus, in step 428 the IVI engine 306 utilizes the logical name to reference into the IVI.ini file and obtain the necessary information corresponding to the logical name and store it in memory.

In step 430 the IVI engine 306 determines where the specific instrument driver 308 is located for the instrument being initialized and operates to load the specific instrument driver 308. In step 432 the IVI engine 306 examines the specific driver and attempts to find functions that correspond to each function name in the array of function names that the class driver passed to the IVI engine. The IVI engine contains an array of function pointers. Each element in the array corresponds to the same element in the array of function names. When the IVI engine finds a function in the specific driver with the same name as one of the names in the array of function names, the IVI engine sets the corresponding element in the function pointer array to the actual address of the function in the specific driver.

In step 434 the IVI engine 306 provides a pointer to the IviInit function of the specific driver 308 to the class driver and returns control to the class driver. More specifically, in step 434 the class driver 304 invokes a function in the IVI engine 306 to retrieve the pointer to the IviInit function in the specific driver 308. The IVI engine 306 executes this function to return the pointer to the class driver 304. It is noted that the specific driver includes a special function called IviInit, which the class driver calls to initialize the specific driver. If the end user initializes the specific driver directly (i.e., does not use the class driver), the end user calls the regular init function.

In step 436 the class driver 304 calls the IviInit function of the specific driver 308. In response to the IviInit function of the specific driver 308 being called, in step 438 the specific driver 308 calls a function in the IVI engine 306 called "build channel table". In the build channel table function call, the specific driver 308 passes to the IVI engine 306 the names of all of the instrument-specific channel names of which the specific driver 308 is aware.

In response to the build channel name function call, the IVI engine 306 processes the channel string information that was retrieved earlier from the IVI.ini file and matches the virtual channel names that the user supplied with the instrument-specific channel names that the specific driver supplied. Thus, when the user application 302 later references a channel by virtual channel name, the virtual channel name can be mapped to the correct specific channel name. It is noted that if the user initializes the instrument with the class driver, the user can develop the user application 302 with either virtual channel names or specific channel names. If the user initializes the specific driver directly, the user can develop the user application 302 with only the specific channel names.

In step 442 the specific driver sets the values of various standard IVI attributes. In the preferred embodiment, the specific driver sets the values of the following attributes:

IVI_ATTR_OPC_CALLBACK
IVI_ATTR_CHECK_STATUS_CALLBACK
IVI_ATTR_SUPPORTS_WR_BUF_OPER_MODE
IVI_ATTR_DRIVER_MAJOR_VERSION
IVI_ATTR_DRIVER_MINOR_VERSION
IVI_ATTR_DRIVER_REVISION

In step 444, for every attribute included in the specific driver 308, the specific driver 308 performs an add attribute function. This involves the specific driver 308 making a call to the IVI engine to add all of its attributes. A first plurality of attributes are defined by the class and hence are compliant with the class driver. A second one or more attributes may be instrument-specific and hence are not defined in the class driver 304.

When the specific driver 308 invokes or calls the add attribute function in the IVI engine 306, the specific driver 308 passes all of the attribute parameters to the add attribute function. These attribute parameters include the attribute's ID, the attribute's name, the attribute's flags, the addresses of major callbacks, and the address of the attribute's range table.

The specific driver 308 thus publishes all of its attributes to the IVI engine 306. The IVI engine 306 thus receives all of the attributes and callbacks associated with the specific instrument driver 308 being initialized, and the IVI engine 306 knows how to call back into the specific driver 308 to access, i.e., read/write, respective attributes.

After the specific driver 308 has added all of its attributes to the IVI engine 306 in step 444, in step 446 the specific driver adds Check, Coerce, and RangeTable callbacks, as necessary. Thus the specific driver 308 may call other auxiliary functions to further specify an attribute. For example, an attribute can have minor callbacks such as the Check callback, Coerce callback, or RangeTable callback. In step 446 the specific driver 308 may call a function to install one or more of these callbacks or specify extra information about an attribute.

After the specific driver creates all of its attributes, in step 447 the specific driver creates invalidation lists for the attributes. The IVI engine exports a function called "Add Attribute Invalidation". The specific driver invokes the Add Attribute Invalidation function for each attribute whose state changes when a particular attribute is written.

After step 447, the specific driver 308 may perform other operations. For example, two parameters are passed in the INIT function, these being IDQUERY and RESET. If the IDQUERY parameter is set to true, in step 448 the specific driver 308 performs an IDQUERY. The IDQUERY involves the specific driver 308 requesting the instrument to provide information on the type and kind of instrument to ensure that the specific driver 308 is talking to the correct type of instrument. If the RESET parameter is set to true, then in step 450 the specific driver 308 directs the instrument to performs its own internal reset. It is noted that steps 448 and 450 are optional and are only performed if the respective parameters are set to true and simulation is disabled.

After steps 448 and 450, in step 452 the specific instrument driver 308 then performs a default configuration on the instrument to set the instrument to a state required for the remainder of the instrument driver to operate. This might involve configuring the instrument so that the response to a query is returned with headers on or off, long or short form, etc.

After all of the instrument driver initialization operations have been performed, in step 454 (FIG. 7D) the specific driver 308 then returns control back to the class driver 304. In step 455, the class driver calls the add attribute function in the IVI engine to add all extension attributes not supported by the specific driver. In step 456 the class driver 304 calls a function in the IVI engine 306 to process the default setup section from the IVI.INI files.

Figure 21A:
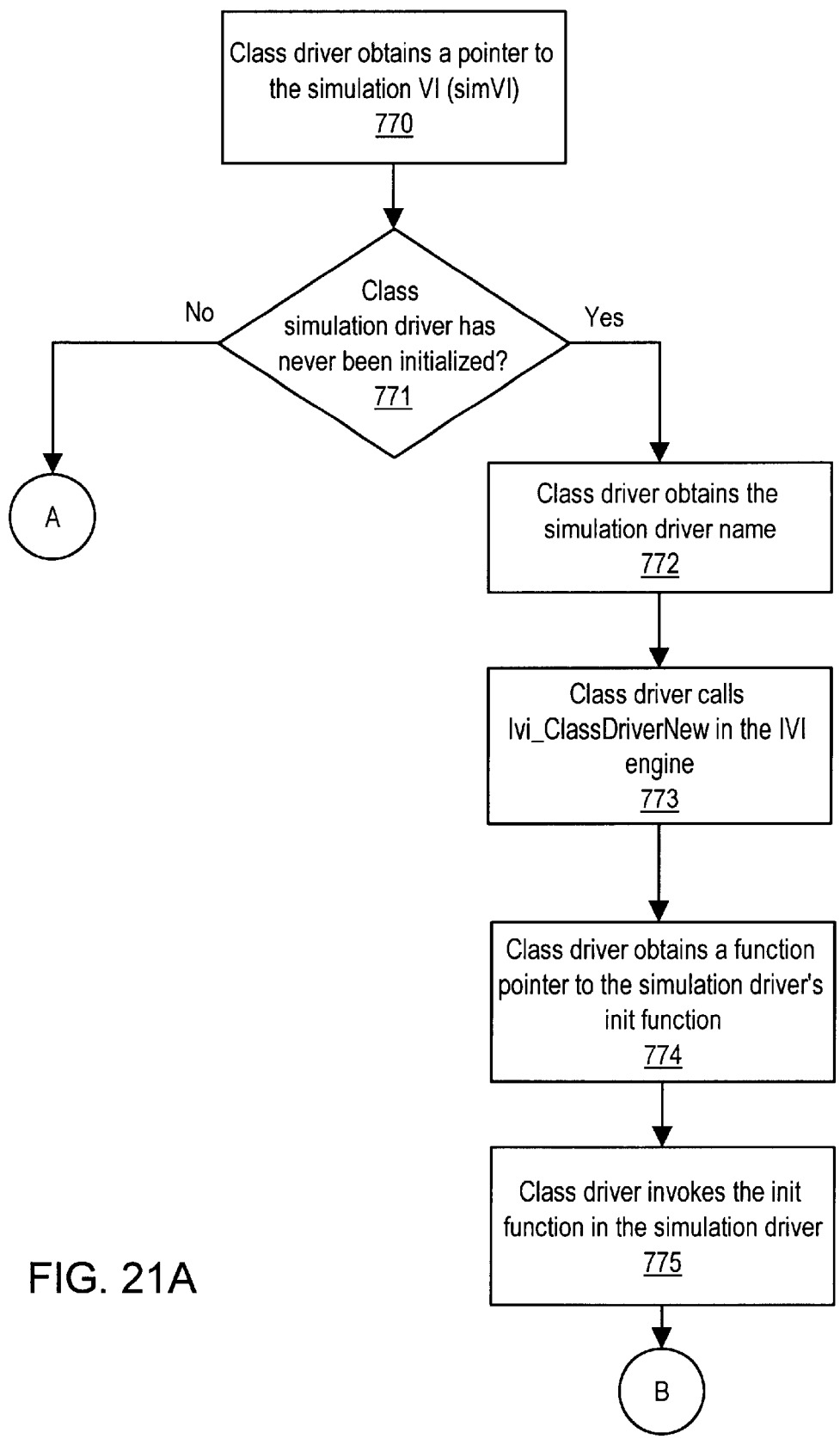
FIGS. 21A and 21B illustrate a class driver obtaining a pointer to a simulation VI.
Figure 21B:
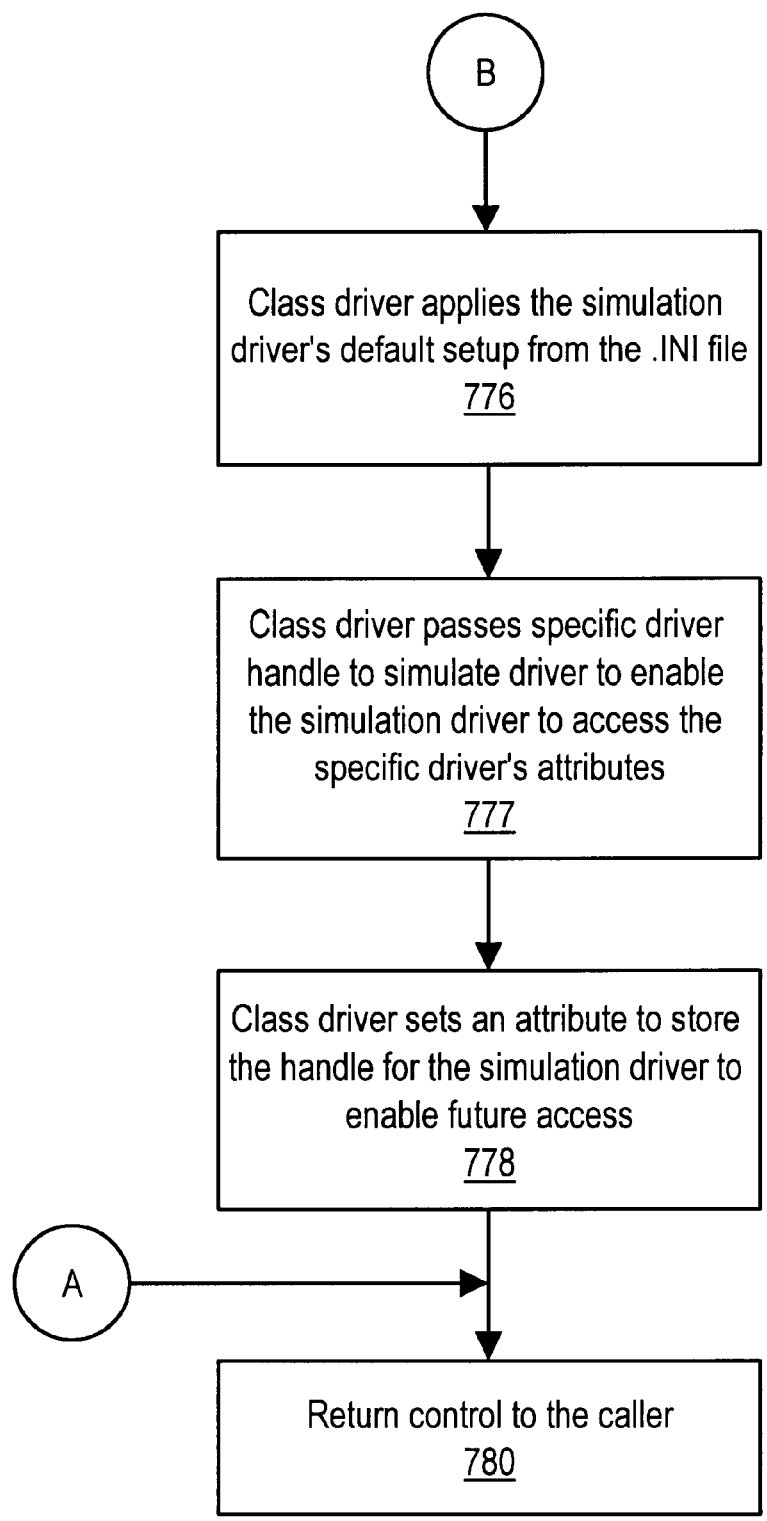

If simulation is enabled in the class driver as determined in step 458, in step 460 the class driver stores a handle to the class simulation driver in an attribute. This is discussed in more detail with respect to FIGS. 21A–B. After step 460, in step 462 the class driver 304 returns a handle and returns control to the user application. If simulation is not enabled in step 458, in step 462 the class driver 304 returns a handle and returns control to the user application.

After step 462 the initialization function call originally made by the user application has been completely executed. From this point on, whenever the user application 302 calls a function in the class driver, the function call includes the handle that is returned from the init function to specify which instrument is being communicated with. It is noted that, if the specific driver 308 includes functions that are not comprised in the generic capabilities portion of the specific driver 308, i.e., are instrument-specific, this handle is used to call those functions as well.

Thus, according to the present invention, the initialization function in the class driver is called to initialize the instrument driver once, and then the user application 302 can access generic capabilities through the class driver 304 and instrument-specific capabilities by calling the specific driver functions directly. Each of these calls uses the handle returned in step 454.

As an example of the initialization operation, presume that the user application calls the init function in step 422 with the logical name "DMM1". The class driver 304 receives the logical name in step 424 and directs the IVI engine 306 to open up DMM1 in step 426. The class driver 304 also provides an array of function names in step 426 that it expects the instrument driver 308 to have. The IVI engine 306 examines the table in the IVI.ini file in step 428, determines the location of DMM1, and loads the instrument driver for DMM1 in step 430. The IVI engine 306 also builds a list of function pointers to the functions in the specific driver 308 in step 432. The IVI engine 306 then provides to the class driver 304 a pointer to the IviInit function in the specific instrument driver 308 in step 434. The class driver then calls the IviInit function in step 436.

The specific driver 308 then directs the IVI engine to construct a channel table in steps 438 and 440 and in step 442 directs the IVI engine 306 to add all of the specific driver attributes. The specific driver 308 may then perform other operations before returning control to the class driver 304 in step 454. The class driver 304 then performs a default setup in step 452 before returning a handle to the user application in step 462.

User Application Controlling the Instrument

Once the specific driver and/or the instrumentation system has been initialized, the user application can communicate with or control the instrument in various ways.

As shown in FIG. 5, the user application can call functions directly in the specific instrument driver 308, in a similar manner to prior art operation. The user application 302 can call functions in the specific driver 308 which comprise instrument-specific capabilities. These instrument-specific functions are preferably not in the class driver 304. In the preferred embodiment of the invention, the user application 302 is required to call the instrument-specific functions directly in the specific driver 308, since these functions do not reside in the class driver 304.

According to the present invention, for generic functions, i.e., fundamental and extension functions which are generic to the class and are located in the class driver 304, the user application 302 preferably calls these functions in the class driver 304. This provides the instrument interchangeability features of the present invention. As discussed below with reference to FIG. 8, when the user application 302 calls generic functions in the class driver 304, the class driver 304 references the IVI engine 306 to obtain a pointer to the function in the specific driver 308, and then uses the pointer to call the function in the specific driver 308. As discussed below with reference to FIGS. 9–12, the user application 302 can also get and/or set attributes of the instrument through the class driver 304.

The user application 302 can also call functions in the generic capabilities section of the specific driver 308 directly, using the API of the class driver 304. In other words, since the function names in the generic capabilities section of the specific driver 308 are substantially the same as the function names in the class driver 304 (except for the function prefix), the user application can call the generic function names in the specific driver 308 directly. This method does not provide the instrument interchangeability feature of the present invention.

It is further noted that the user application can make both generic calls to the class driver and generic and/or specific calls to the specific driver after the single initialization is performed in FIGS. 7A–7D. The initialization returns a handle to the user application, and the user application can use this handle to make calls either to the class driver or to the specific driver. Thus, separate init functions are not required.

Figure 8A:
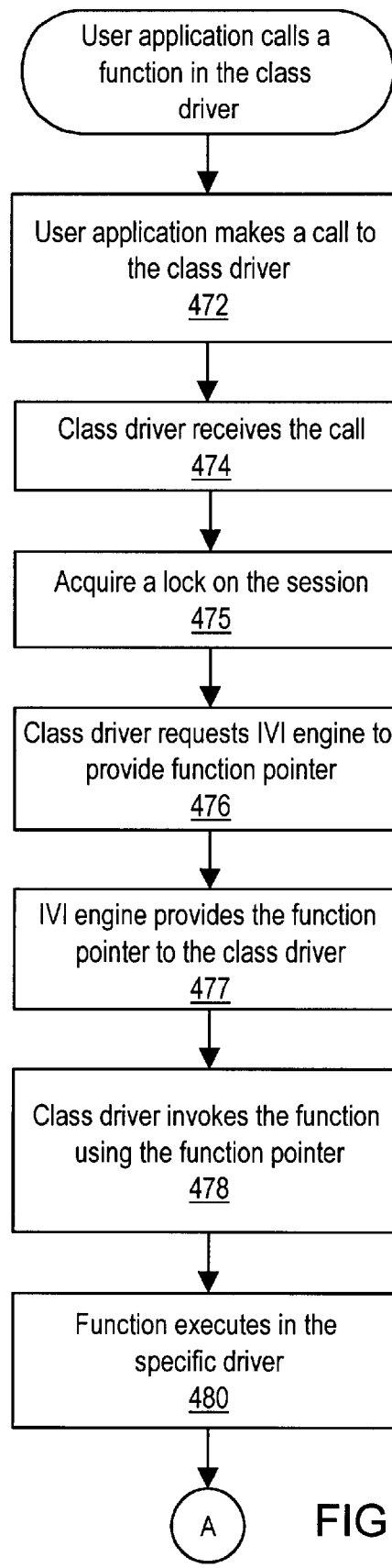
FIG. 8 is a flowchart diagram illustrating execution of functions in the specific driver.
Figure 8B:
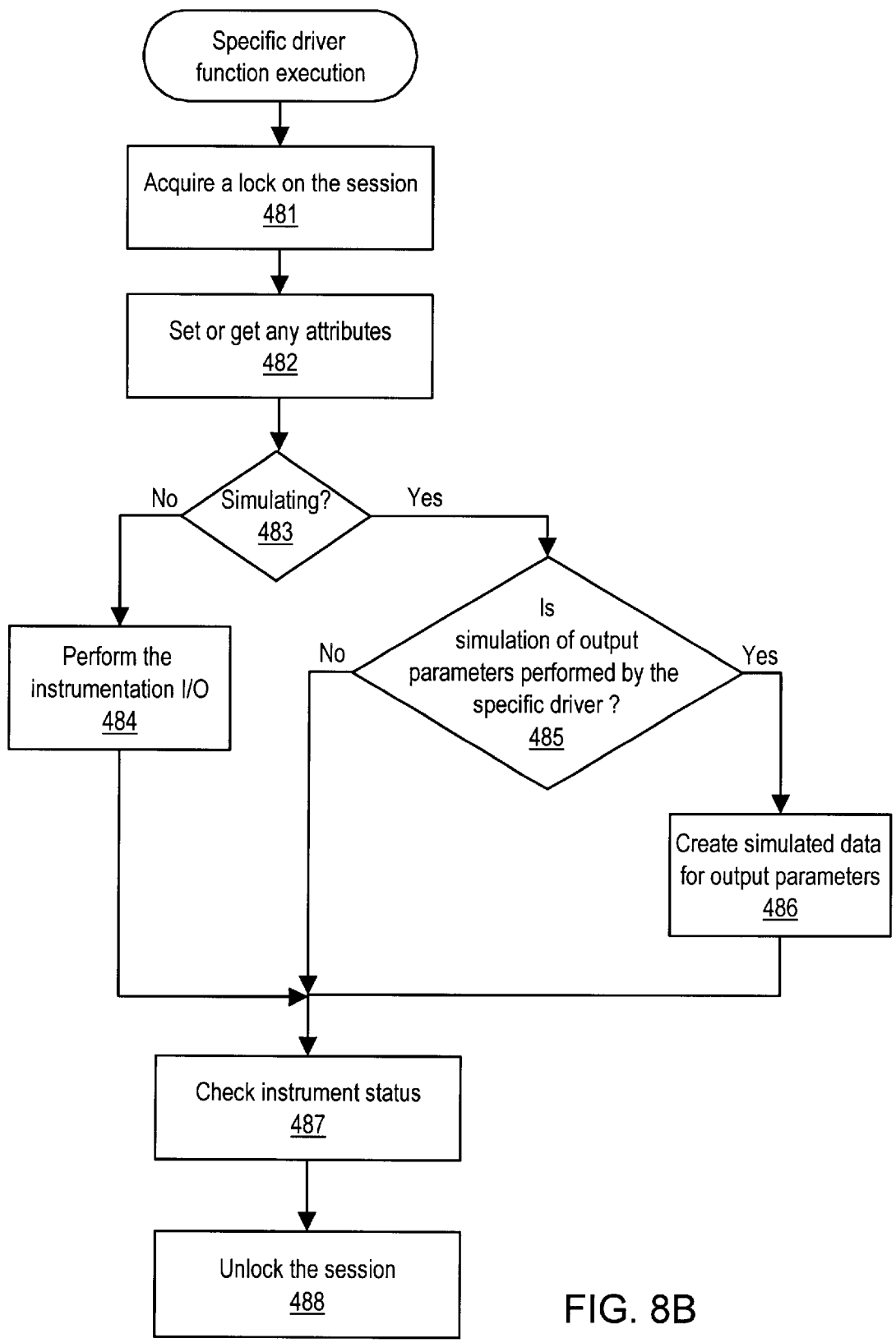
Figure 8C:
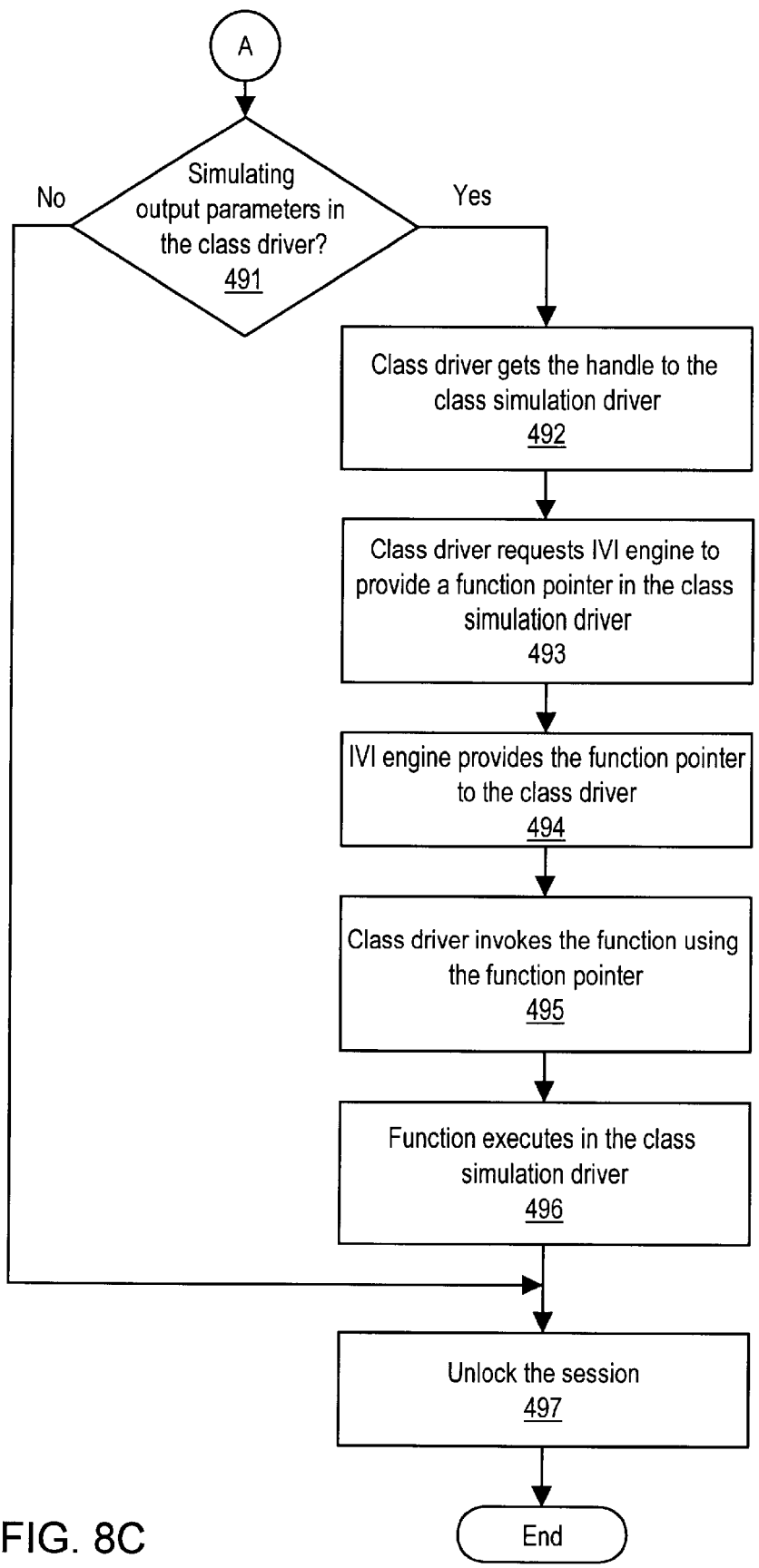

FIGS. 8A–8C—User Application Makes a Function Call to the Class Driver

FIG. 8 is a flowchart diagram illustrating the user application making a function call to the class driver 304. As shown, in step 472 the user application makes a call to the class driver 304. In step 474 the class driver 304 receives the call. This call preferably comprises a function call to a function comprised in the class driver.

In step 475 the class driver locks the instrument driver session. In step 476 the class driver 304 requests the IVI engine to provide a function pointer which points to the actual function in the specific driver. In step 477 the IVI engine provides the function pointer to the class driver 304. In step 478 the class driver invokes the function in the specific driver 308 using the function pointer received from the IVI engine 306.

In step 480 the specific driver executes the function to control and/or communicate with the instrument. It is noted that the function executed by the specific driver may include calls to functions in the IVI engine to get and/or set attributes. Thus the function in the specific driver invokes the get and/or set attribute callbacks in the IVI Engine, which in turn operates to get and/or set attributes in the specific driver. The operation of step 480 is discussed with reference to FIG. 8B FIG. 8B is a flowchart diagram illustrating the specific driver executing a function in response to a call made to the class driver 304, or in response to a call made directly to the specific driver. In other words, FIG. 8B illustrates step 480 of FIG. 8A. FIG. 8B further illustrates calling of functions in the specific driver with simulation enabled.

As shown, in step 481 the function acquires a lock, preferably by calling Ivi_LockSession. It is noted that locking does not occur during the initialization process, but occurs at all levels, i.e., execution of the class driver, specific driver, and IVI engine, during normal function calls.

In step 482 the function sets or gets any attributes. This happens regardless of whether or not simulation is being performed. In step 483 the function determines if simulation is enabled or being performed, preferably by calling !Ivi_Simulating(vi). If simulation is not being performed, the function performs the instrument I/O in step 484 and advances to step 487.

If simulation is being performed as determined in step 483, then in step 485 the function determines if the simulation of output parameters is being performed by the specific driver by calling Ivi_UseSpecificSimulation(vi). If simulation of output parameters is being performed by the specific driver, then in step 486 the function creates simulated data for output parameters. If simulation of output parameters is not being performed by the specific driver, i.e., simulation is being performed by the class driver, then operation proceeds directly to step 487.

It is noted that if the function only accesses the instrument via Set and Get Attribute functions in step 482, step 486 is not required to be performed, i.e., the "if/elseif" block in the following code is not required. If no simulation is necessary in step 486, i.e., there are no output parameters to the function, or all instrument access is achieved via set and get attribute functions, the "else if" block below is not required.

In step 487 the function checks instrument status by calling a Utility function in the specific driver preferably called FunctionPrefix_CheckStatus (vi). This is typically a wrapper function for the CheckStatusCallback shown in FIGS. 25A and 25B.

In step 488 the function unlocks the session and returns control to the caller, and operation completes FIG. 8C is a flowchart diagram illustrating the remainder of the flowchart of FIG. 8A, i.e., illustrating operation after step 480 of FIG. 8A. As shown, after step 480 completes, which is described in the flowchart of FIG. 8B, then operation returns to the class driver in step 491.

In step 491 the class driver determines if the class driver is performing the simulation. If the class driver is not performing the simulation, then operation proceeds to step 497. It is noted that if simulation is enabled but the class driver is not performing the simulation, the specific driver will have determined in step 485 that simulation of output parameters is being performed by the specific driver, and step 486 will be executed. In this case, since the specific driver has created simulated output parameters in step 486, the class driver is not required to perform simulation.

If the class driver determines that the class driver is performing the simulation, then operation proceeds to step 492. The class driver will determine that the class driver is performing the simulation in step 491 if simulation is enabled and the specific driver determined in step 485 that simulation of output parameters is not performed by the specific driver.

In step 492 the class driver 304 gets the handle to the class simulation driver. The class simulation driver is a driver that accompanies the class driver 304 and whose purpose is to simulate operation of the class driver. In step 493 the class driver 304 requests the IVI engine to provide a function pointer which points to the function in the class simulation driver. In step 494 the IVI engine provides the function pointer to the class driver 304. In step 495 the class driver invokes the function in the specific driver 308 using the function pointer received from the IVI engine 306. In step 496 the function executes in the class simulation driver to simulate the function operation, i.e., to simulate control and/or communication with the instrument.

General Specific Driver Function Flow

The general structure of instrument driver functions is as follows. The function includes a local variable named "error", of type ViStatus and initialized to VI_SUCCESS. This variable is used to record error/status information for the function. The function includes a label named "Error:". When an error is encountered, the error variable is set and the function jumps to this error block. The function includes a return statement at the end of the function which returns the value of error. The function preferably has no other return statements.

The above structure is used to implement a consistent function clean-up and error handling strategy. All function clean-up and error handling is localized to the error block. If an error is encountered, the program jumps to the error block, handles the error, and performs any necessary function clean-up operations (such as freeing malloc'ed data). If no error is encountered the program flow falls through the error block and still performs clean-up actions.

The following illustrates the appearance of the shell for a typical instrument driver function body.

```
/*********************************************************************/
/* Function: GeneralDriverFunctionTemplate                          */
/* Purpose: This function is used as a template to implement new instrument   */
/*       specific driver functions.                                 */
/*********************************************************************/
ViStatus_VI_FUNC FunctionPrefix_GeneralDriverFunctionTemplate (ViSession vi)
{
    ViStatus error = VI_SUCCESS;
    checkErr (Ivi_LockSession (vi, VI_NULL));
/* Call Set and Get Attribute functions whether simulating or not    */
    if (!Ivi_Simulating(vi))        /* called this only when locked    */
    {
        ViSession io = Ivi_IOSession(vi);/* called this only when locked */
        /* Do actual instrument I/O only if not simulating. Example:   */
        /*                                                             */
        /*    viCheckErr (viPrintf (io, "CMD"));                       */
        /* If you access the instrument via Set and Get Attribute in this */
        /* function, delete this "if/elseif" block.                    */
    }
    else if (Ivi_UseSpecificSimulation(vi))/* call this only when locked */
    {
        /* Simulate data for function output parameters here.          */
        /*                                                             */
        /* If no simulation is necessary (i.e. there are no output parameters */
        /* to the function, or all instrument access is acheived via Set and  */
```

```
        /* Get Attribute), delete this "else if" block.              */
        }
    checkErr (FunctionPrefix_CheckStatus (vi));
Error:
    Ivi_UnlockSession (vi, VI_NULL);
    return error;
    }
```

Figure 9:
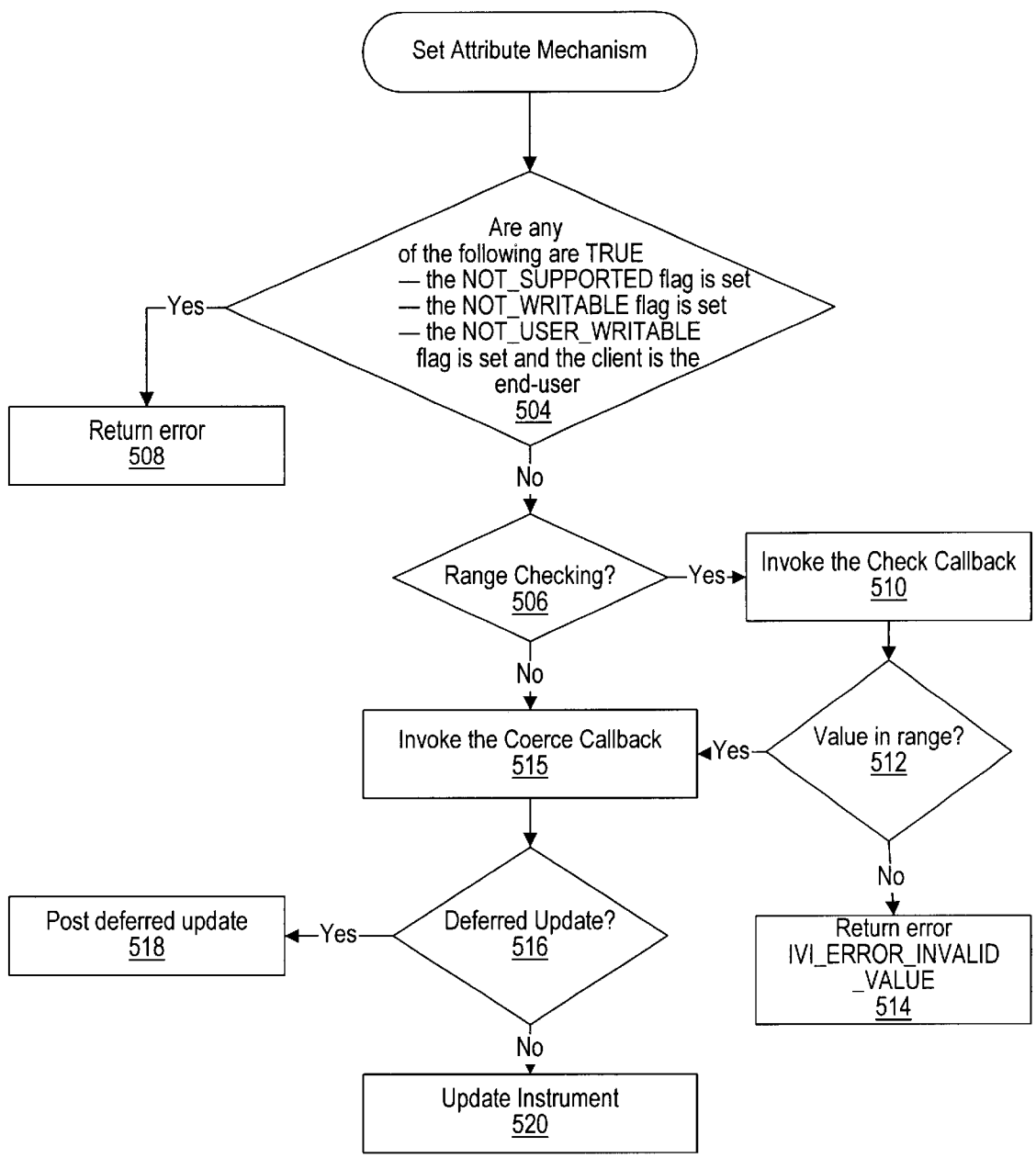
FIG. 9 illustrates the Set Attribute Mechanism.

FIG. 9—Set Attribute Mechanism

FIG. 9 is a flowchart diagram illustrating operation of the set attribute mechanism, i.e., operation when the user application sets an attribute in the specific driver 308 to affect the operation of the instrument.

In the preferred embodiment, the class driver 304, the generic capabilities portion of the specific driver 308 and the IVI engine 306 each includes set attribute functions which are operable to set attributes on the specific driver. It is preferred that the user application 302 call the set attribute function in the class driver 304 or alternatively call the set attribute function in the generic capabilities portion of the specific driver 308. As discussed above, when the user application 302 makes calls to the class driver 304, the user application receives the benefits of instrument interchangeability.

When the user application 302 calls the set attribute function either in the class driver 304 or the generic capabilities portion of the specific driver 308, this operates to invoke the set attribute function in the IVI engine 306. Thus, calls to the set attribute function either in the class driver 304 or the generic capabilities portion of the specific driver 308 simply pass through to the set attribute function in the IVI engine 306. It is noted that the set attribute function in the IVI engine 306 is generic or common for each of the respective class drivers 304 and each of the various types of specific drivers 308. Thus, the set attribute function in the IVI engine 306 is effectively implemented once in the IVI engine 306, instead of written multiple times for each of the specific drivers 308 and each of the class drivers 304.

In addition, the set attribute function includes program instructions for performing certain operations, and also invokes other functions, referred to as callback functions, for other functionality, such as the Check callback, Coerce callback, Compare callback, etc. In the present application, the set attribute function performing a function, or being operable to perform a function, such as examining, coercing, comparing, etc., is intended to include the set attribute function including program instructions for performing the operation as well as the set attribute function invoking a function, such as a callback function, to perform the operation. For example, the set attribute function coercing a value includes the set attribute function having program instructions for coercing the value as well as the set attribute function invoking a coerce callback function to coerce the value.

Once the set attribute function in the IVI engine 306 is invoked, in step 504 the set attribute function in the IVI engine 306 first checks various attribute flags. This check is represented by the following code:

/*Check Attribute Flags*/
if (NOT_SUPPORTED||NOT_WRITABLE||(NOT_USER_WRITABLE && client=END_USER)) return error;

The set attribute function determines if the respective attribute the caller is attempting to set is not supported or not writable, and if either is true the function returns an error in step 508.

The set attribute function in the IVI engine 306 also determines if the attribute is not user writable and the client is the end user. This check is made to enable the developer to implement hidden attributes that are used by the specific driver that the user is not able to set or get. Attributes can be not user readable, not user writable or both. Hidden attributes are both not user readable and not user writable. Thus, if the user application 302 is the client and the attribute is not user writable, then the function returns an error in step 508.

It is noted that the reason the user application 302 preferably calls the set attribute function in the class driver 304 or the generic capabilities portion of the specific driver 308 is so that the set attribute function in the IVI engine 306 can properly determine whether the client is the end user. When the user application 302 calls the set attribute function in the class driver 304 or the generic capabilities portion of the specific driver 308, the set attribute function in the IVI engine 306 determines that the client is the end user and does not allow access to these hidden attributes. If the user application calls the set attribute function in the IVI engine 306 directly, the user application 302 is able to access certain hidden or protected attributes.

After the set attribute function has checked the attribute flags in step 504, in step 506 the set attribute function determines if range checking is enabled. If range checking is enabled, the set attribute function then invokes a check callback function in step 510. The check callback function may reside in either the IVI engine 306 or the specific driver 308. The check callback function operates in step 510 to ensure that the value to which the attribute will be set is within a valid range as previously defined in the specific driver 308.

If the specific driver 308 supplies a range table callback or a range table for an attribute in steps 444 or 446, then the IVI engine 306 uses the range table returned by the range table callback or the range table associated with the attribute to determine if the value lies within a valid range. In this case, the check callback in the IVI engine 306 is used. If a range table is not sufficient to specify the complete range of values that an attribute value can fall within, then the check callback probably resides within the specific driver 308. The purpose of the check callback is to determine whether the value to which the user application is attempting to set an attribute is within an allowable range.

In step 512 the set attribute function determines if the value is in range. If the value is out of range, the set attribute function returns the IVI_ERROR_INVALID_VALUE error code in step 514.

If the set attribute function determines that range checking is disabled in step 506 or the set attribute function determines that the value is in range in step 512, the operation proceeds to step 515.

If the attribute has a coerce callback, the set attribute function invokes the coerce callback in step 515. The coerce callback operates to coerce the user specified value to a correct or optimal value for the instrument. The coerce callback may reside in either the IVI engine 306 or the specific driver 308.

If the specific driver 308 supplies a range table callback or the address of a coerced range table for an attribute in steps 444 or 446, then the IVI engine 306 uses the range table returned by the range table callback or identified by the range table address to coerce the user specified value.

If the IVI engine 306 uses the callbacks that reside within the IVI engine itself, those callbacks operate on range tables. A range table has a type which can be either discrete, ranged or coerced. When a specific driver adds an attribute and provides a range table of type coerced with the attribute, then by default the IVI engine 306 instantiates the coerce callback that resides within the IVI engine 306 as the coerce callback for that attribute. It is also noted that the specific driver 308 can either not provide a range table or specify a coerce callback within the specific driver 308.

After the coerce callback is executed, or after the check callback is performed if a coerce callback is not executed, then in step 516 the set attribute function in the IVI engine 306 determines if the deferred update option attribute is set. If the deferred update attribute is not set, then an update instrument method is performed to update the attribute on the instrument in step 520. The update instrument method is discussed with reference to FIG. 10.

If the deferred update parameter is set, then a deferral number is assigned to the set operation to schedule the update at a later time in step 518. If this is the first time an attribute has been called after the deferred update has been turned on, the deferral number is set to 1, if this is the second attribute to be set, the deferral number is set to 2, etc. Thus, later on when an IVI update function is called in the IVI engine 306, the IVI engine 306 traverses the list and updates all the attributes in the order they were set. If the deferred update attribute is set to true when the set attribute function in the IVI engine is called and a deferred update is already pending for that attribute, the set attribute function returns an error.

Figure 10A:
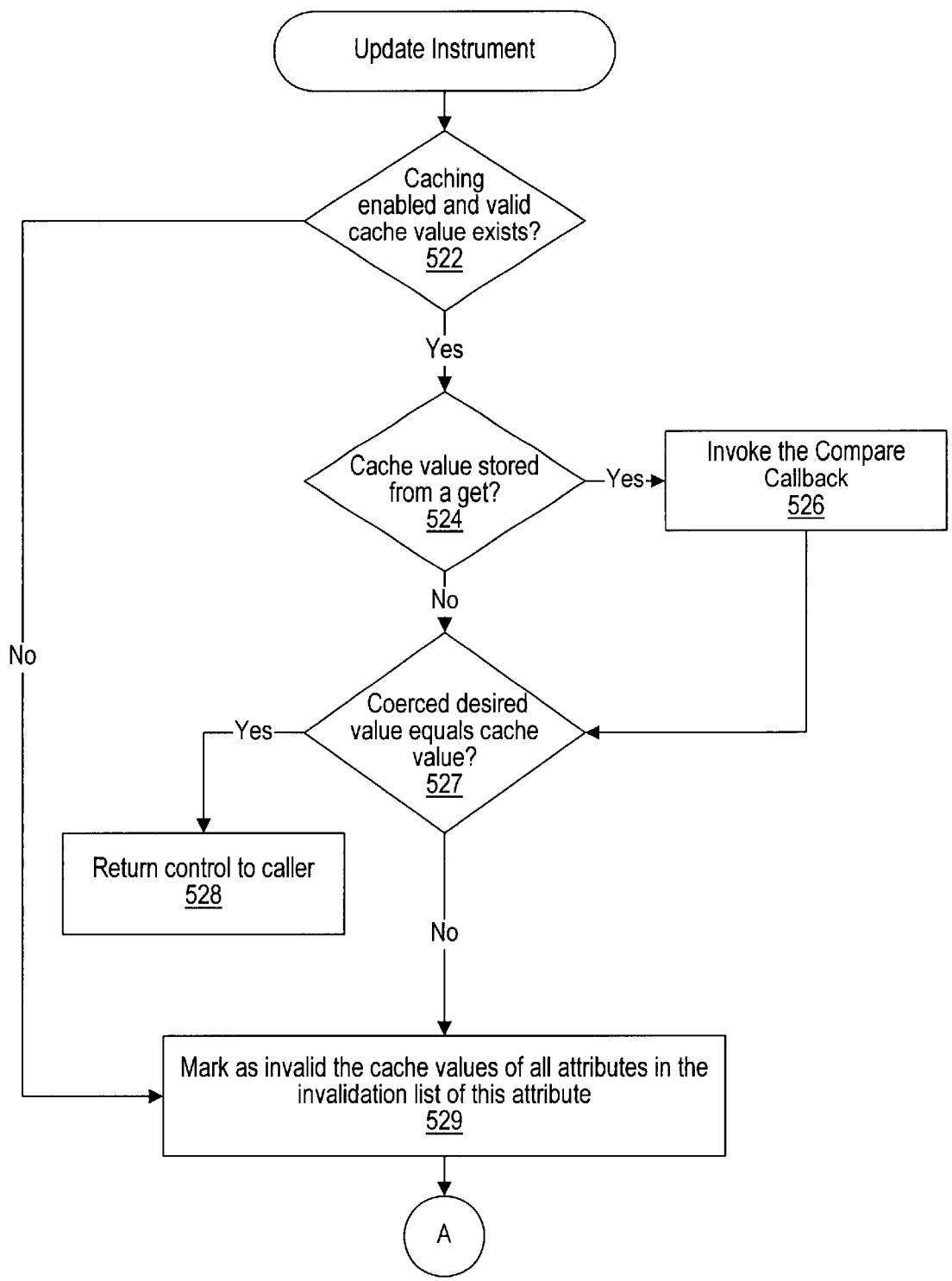
FIGS. 10–10B illustrate the Update Instrument mechanism in the Set Attribute mechanism of FIG. 9.
Figure 10B:
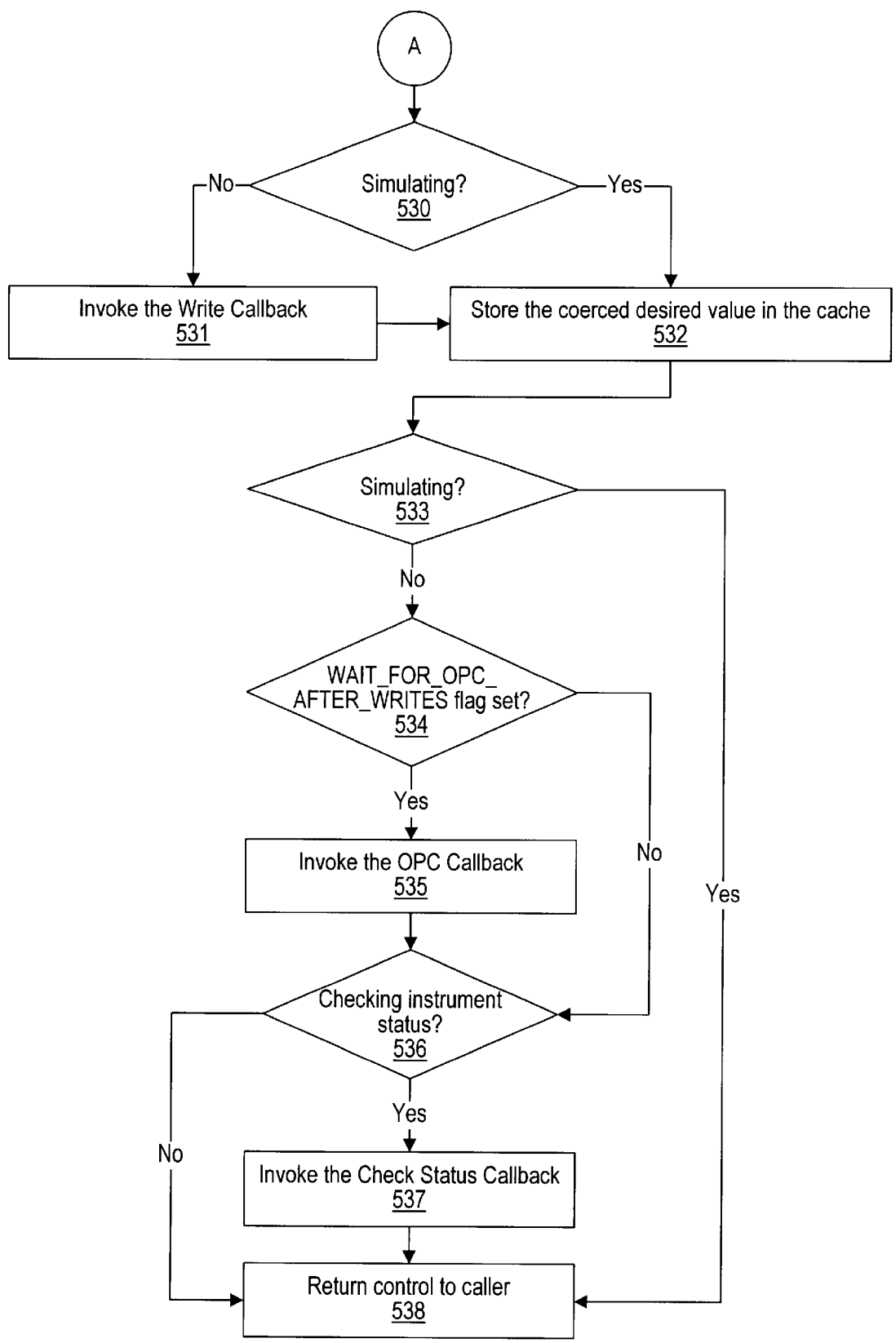

FIGS. 10A–B: Update Instrument

FIG. 10 is a flowchart diagram illustrating updating of an instrument. As shown, the set attribute function in the IVI engine 306 first determines in step 522 if caching is enabled for attributes and a valid cache value exists for the attribute. If the caching mode is enabled and a valid cache value exists for the attribute, the IVI engine 306 then examines the cached value of the attribute to determine if the cached value was stored as a result of a get or set function in step 524.

In the preferred embodiment, each attribute includes a parameter that indicates if a valid cache value exists. A valid cache value might not exist because no value was ever read from or written to the instrument or because the IVI engine explicitly invalidated the cache value as a result of processing an invalidation list for another attribute.

In the preferred embodiment, each cached attribute value includes a parameter which indicates what action, i.e., either get or set, caused the value to be cached. If a get attribute call caused the value to be cached, this refers to the value last read. If a set attribute function caused the attribute value to be cached, this refers to a value last written. Thus, both a get attribute and a set attribute function call causes an attribute value to be cached in the system memory, and the respective function which causes this caching to occur is stored as a parameter and used in this step.

If the parameter indicates that the value was cached due to a get attribute function, i.e., the cached value is the value that was last read from the instrument, then the set attribute function determines if the value last read, i.e., the value stored in the cache, is equal to the value to which the user is attempting to set the attribute. To do so, a compare callback is invoked to perform a comparison of the cached value with the value to which the user application is attempting to set the value in step 526. The compare callback function preferably resides in the IVI engine 306.

A compare callback function is used because the computer system and the instrument may use different floating point precisions. Since the computer's processor may hold floating point numbers in different precision than the instruments processor, these values could be slightly different yet still equal. Thus, the purpose of the compare callback is to perform a comparison which is beyond an exact match, i.e., which takes into account the differences in floating point precision between the computer processor and the instrument processor. The compare callback function thus determines that the values are identical even if there are slight differences in the precision between the two values. It is noted that, if the floating point precision of the computer processor and the instrument processor are the same, then a simple compare can be performed.

When the specific driver adds a floating point attribute, the specific driver specifies a comparison precision in addition to specifying callbacks and a range table. The comparison precision is the number of digits that are significant for the comparison operation. The default compare callback that the IVI engine 306 provides uses the comparison precision that the specific driver 308 specifies to perform the comparison operation.

If the cached value of the attribute is determined to be equal to the value to which the user application is attempting to set the attribute in step 527, then the operation returns control to the caller in step 28. This provides a substantial savings in bus transactions because bus transactions are not required to set attribute values to values at which they are already set as determined by the cached value.

If the parameter indicates that the value was cached due to a set attribute function, i.e., the cached value is the value that was last written to the instrument, then the set attribute function compares the cached value with the desired value of the attribute in step 527, i.e., the value to which the attribute is being set. Here it is noted that a compare callback is not necessary, since the cached value was written by the computer and thus has the same floating point precision.

If caching is disabled or the cached value is different than the value to which the user application is attempting to set the attribute, then in step 529 the method marks as invalid the cache values of all attributes in the invalidation list of this attribute.

After step 529, in step 530 the set attribute function determines if a simulation feature is enabled. If the simulation feature is enabled, then the cache value is set to the coerced desired value in step 532.

If simulation is not enabled then the write callback function is invoked in step 531 to actually write the attribute value to the instrument. The write callback function preferably resides in the specific driver 308. After the write callback function executes in step 531, in step 532 the written value is stored in the cache in system memory.

If simulation is enabled as determined in step 533, the operation returns control to the caller in step 538. Thus, if simulation is enabled, the value is only updated in the cache, and is not actually written out to the instrument.

If simulation is not enabled as determined in step 533, then in step 534 the set attribute function determines if it must wait for operation complete. WaitForOPCAfterWrites (wait for operation complete after writes) is a flag that is specified per attribute, and this flag is set when the add attribute function is called in the specific driver 308. If the WaitForOPCAfterWrites flag is set to true, the IVI engine 306 then invokes the Operation Complete callback that resides in the specific driver in step 535. The purpose of this function is to wait until the instrument is ready to process the next command.

If check instrument status is enabled in step 536, then the check status function is invoked in step 537. The check status callback resides in the specific driver 308. If the check status callback determines that the instrument has encountered an error, the check status callback returns the error, IVI_ERROR_INSTR_SPECIFIC. After step 537, the operation returns control to the caller in step 538.

Figure 11A:
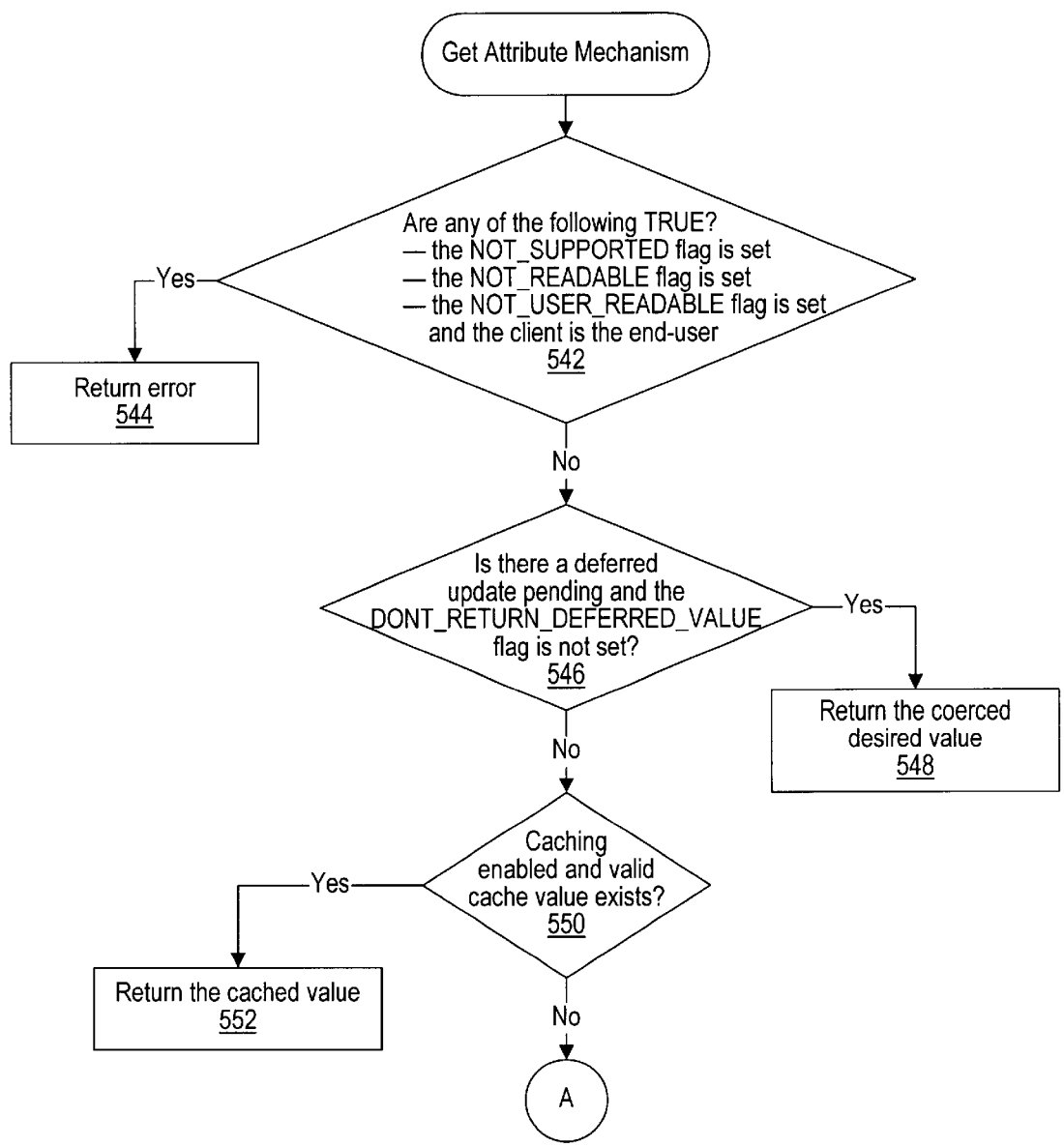
FIGS. 11A–11B illustrate the Get Attribute Mechanism.
Figure 11B:
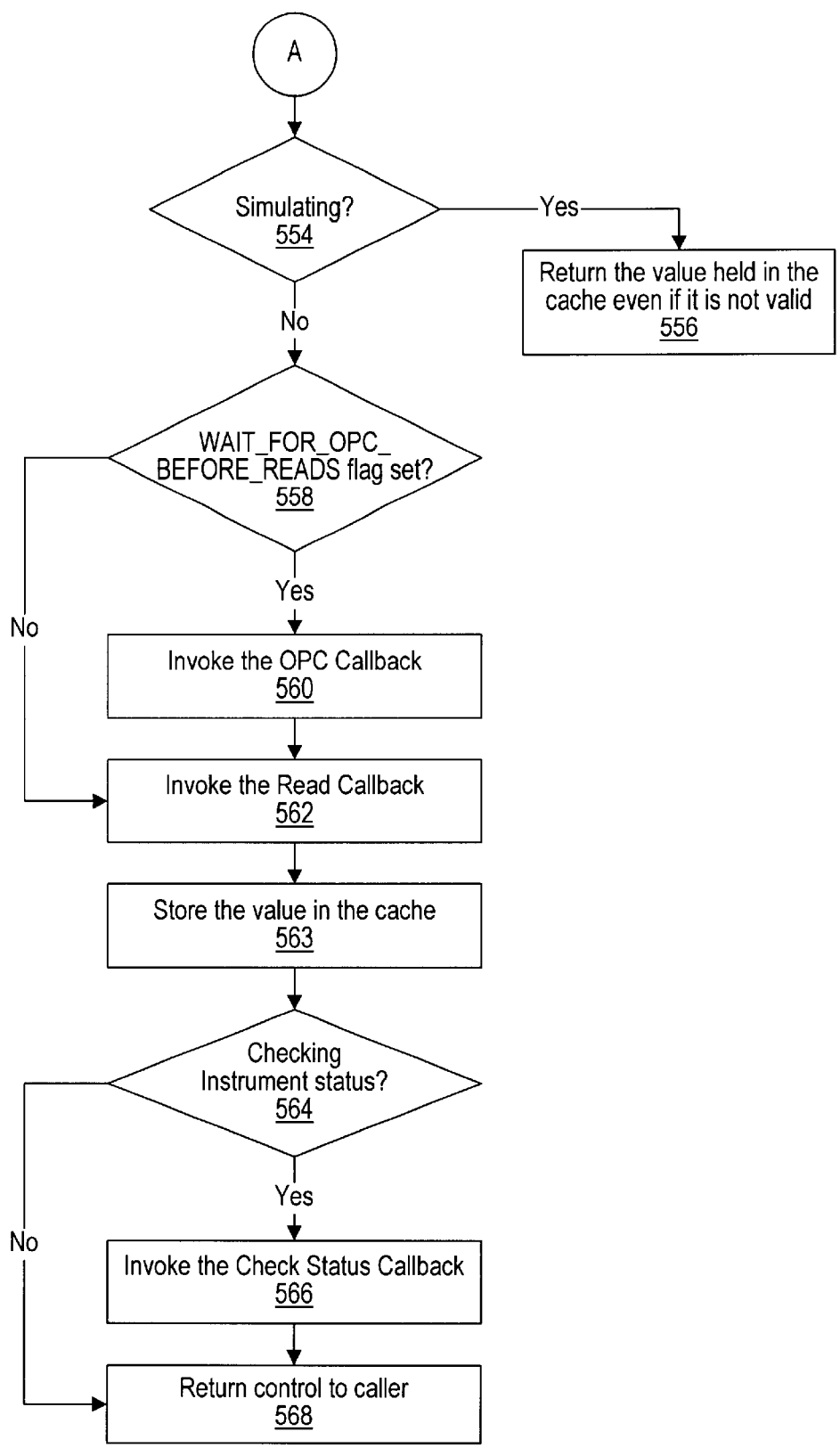

FIGS. 11A–11B—Get Attribute Flowchart

FIGS. 11A–B are flowchart diagrams illustrating operation of the get attribute mechanism, i.e., operation when the user application gets an attribute in the specific driver 308 to determine the state of the instrument.

In the preferred embodiment, the class driver 304, the generic capabilities portion of the specific driver 308 and the IVI engine 306 each include a get attribute function which is operable to get attributes from the instrument. It is preferred that the user application 302 call the get attribute function in the class driver 304 or alternatively call the get attribute function in the generic capabilities portion of the specific driver 308.

As discussed above, when the user application 302 makes calls to the class driver 304, the user application receives the benefits of instrument interchangeability. When the user application 302 calls the get attribute function either in the class driver 304 or the generic capabilities portion of the specific driver 308, this operates to invoke the get attribute function in the IVI engine 306. It is noted that the get attribute function in the IVI engine 306 is generic or common for each of the respective class drivers 304 and each of the various types of specific drivers 308. Thus, the get attribute function in the IVI engine 306 is effectively implemented once in the IVI engine 306, instead of written multiple times for each of the specific drivers 308 and each of the class drivers 304.

Once the get attribute function in the IVI engine 306 is invoked, in step 542 the get attribute function in the IVI engine 306 first checks various attribute flags. This check is represented by the following code:

/*Check Attribute Flags*/
if (NOT_SUPPORTED||NOT_READABLE||(NOT_USER_READABLE && client=END_USER))
    return error;

The get attribute function determines if the respective attribute is either not supported or not readable, and if either is true the function returns an error in step 544.

The get attribute function in the IVI engine 306 also determines if the attribute is not user readable and the client is the end user. This check is made to enable the developer to implement hidden attributes that are used by the specific driver that the user is not able to set or get. Attributes can be not user readable, not user writable or both. Hidden attributes are both not user readable and not user writable. Thus, if the user application 302 is the client and the attribute is not user readable, then the function returns an error in step 544.

It is noted that the reason the user application 302 preferably calls the get attribute function in the class driver 304 or the generic capabilities portion of the specific driver 308 is so that the get attribute function in the IVI engine 306 can properly determine whether the client is the end user.

When the user application 302 calls the get attribute function in the class driver 304 or the generic capabilities portion of the specific driver 308, the get attribute function in the IVI engine 306 determines that the client is the end user and does not allow access to these hidden attributes. If the user application calls the get attribute function in the IVI engine 306 directly, the user application 302 is able to access certain hidden or protected attributes.

After the get attribute function has checked the attribute flags in step 542, in step 546 the get attribute function determines if a deferred update is pending and if a flag is set to return requested values.

If the deferred update option was enabled in a set attribute function, then the get attribute function determines if an update is pending. If the update is pending, the get attribute function examines the return requested values flag. If the flag return requested values is set to true, then the get attribute mechanism returns the deferred coerced value in step 548. The deferred coerced value is the deferred value that resulted from the coerced callback operation of the set attribute mechanism. Thus, if the update pending flag is set, then the get attribute function examines the return requested values flag to determine whether it should return the actual value of the instrument or the coerced value that is pending to be written to the instrument.

In step 550 the get attribute function determines if caching is enabled. If caching is enabled and a valid cache value exists, this cache value is returned in step 552, and operation completes. If caching is not enabled or a valid cache value does not exist, then in step 554 the get attribute function determines if simulation is enabled. If simulation is enabled, then the get attribute function returns the cached value regardless of whether or not it is valid in step 556. If simulation is not enabled, then operation proceeds to step 558.

In step 558 the get attribute function determines if it must wait for operation to complete before it reads the instrument setting. WaitForOPCBeforeReads (wait for operation complete before reads) is a flag that is specified per attribute, and this flag is set when the specific driver adds attributes. If the WaitForOPCBeforeReads flag is set to true, the IVI engine 306 then invokes the Operation Complete callback that resides in the specific driver 308 in step 560. The purpose of this function is to wait until the instrument is ready to process the next command. After the Operation Complete callback executes, the read callback function is performed in step 562 to actually obtain the desired attribute from the instrument. In step 563 the method stores the read value in the cache in computer system memory If check instrument status is enabled in step 564, then the check status function is invoked in step 566. The check status callback resides in the specific driver 308. If the check status callback determines that the instrument has encountered an error, the check status callback returns the error, IVI_ERROR_INSTR_SPECIFIC.

The operation returns control to the caller in step 568.

Figure 12:
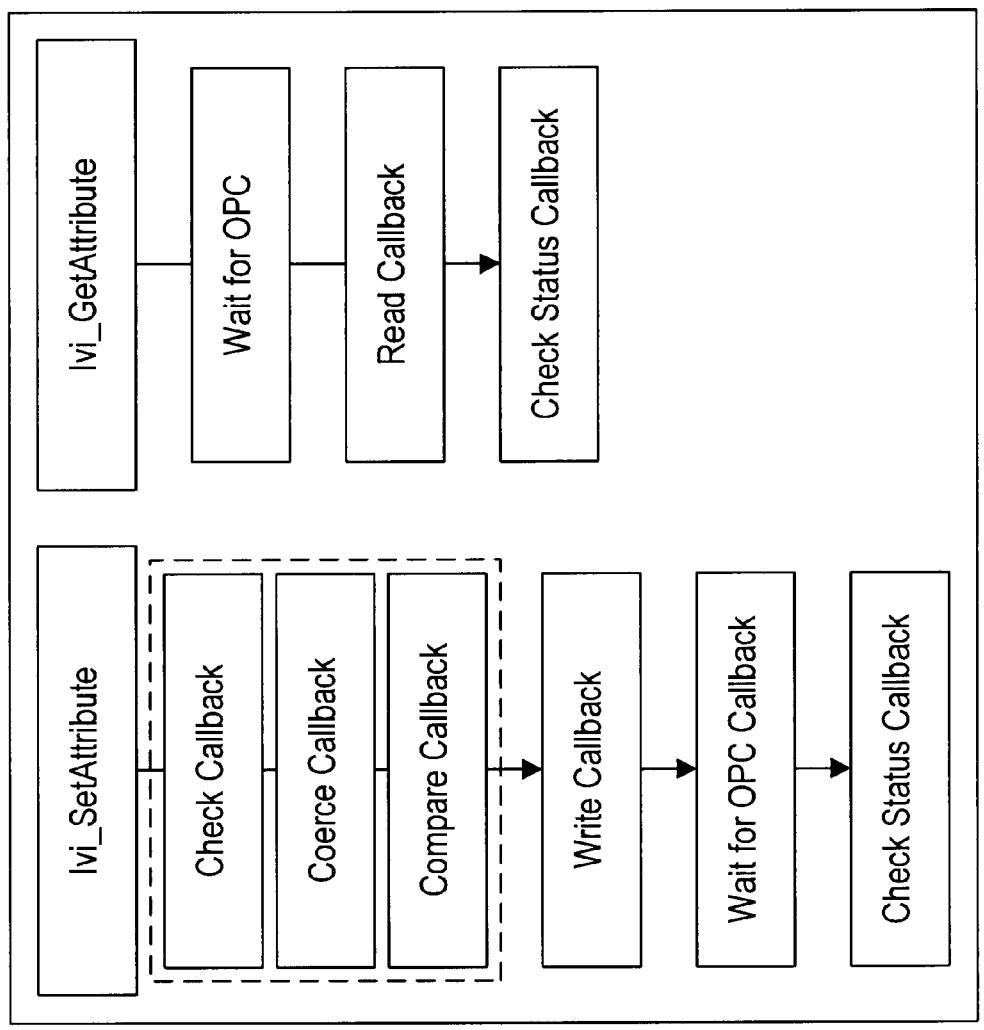
FIG. 12 illustrates the attribute/callback relationship.

FIG. 12—Attribute Callback Relationship

FIG. 12 illustrates the attribute callback relationship. More particularly, FIG. 12 illustrates the relationship between the set attribute function, referred to as Ivi_SetAttribute, and the get attribute function, referred to as Ivi_GetAttribute, and their respective callbacks. As shown, the set attribute function invokes the check callback, the coerce callback, and the compare callback functions, as well as the write callback function. The set attribute function also invokes the Wait for OPC callback function and the check status callback function. The get attribute function invokes the Wait for OPC callback function, the read callback function, and the check status callback function.

Figure 13:
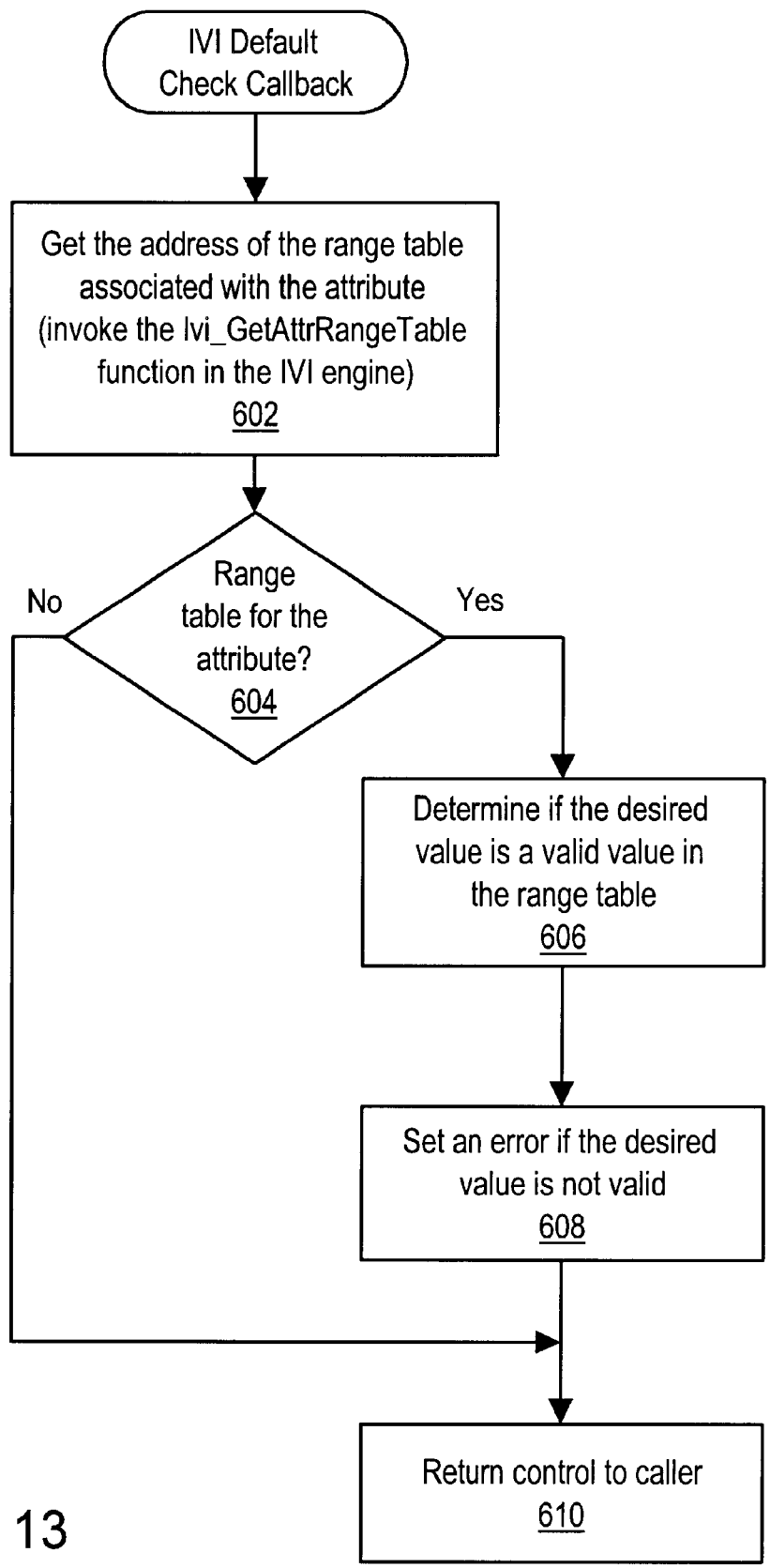
FIG. 13 is a flowchart diagram illustrating the IVI Default Check Callback.

FIG. 13—IVI Default Check Callback

FIG. 13 is a flowchart diagram illustrating the IVI default Check callback according to the preferred embodiment of the invention.

As shown, when the Check callback is called or invoked, in step 602 the Check callback gets the address of the range table associated with the attribute. This is preferably done by invoking the Ivi_GetAttrRangeTable function in the IVI Engine 306. The Ivi_GetAttrRangeTable function is discussed with reference to FIG. 14.

In step 604 the Check callback determines if there is a rangeTable for the attribute. The Ivi_GetAttrRangeTable function returns the address of the rangeTable, or returns a null value if the rangeTable does not exist. If the Ivi_GetAttrRangeTable function returns a valid address of the rangeTable, then in step 606 the Check callback determines if the desiredValue, i.e., the user to which the user is trying to set the attribute, is a valid value in the range table. In the preferred embodiment, helper functions are available in the IVI Engine 306 which perform step 606. In step 608 the Check callback sets an error if the desiredValue is not valid.

After step 608, or if a rangeTable for the attribute does not exist as determined in step 604, in step 610 the Check callback returns control to the caller.

Ivi GetAttrRangeTable Function

Figure 14:
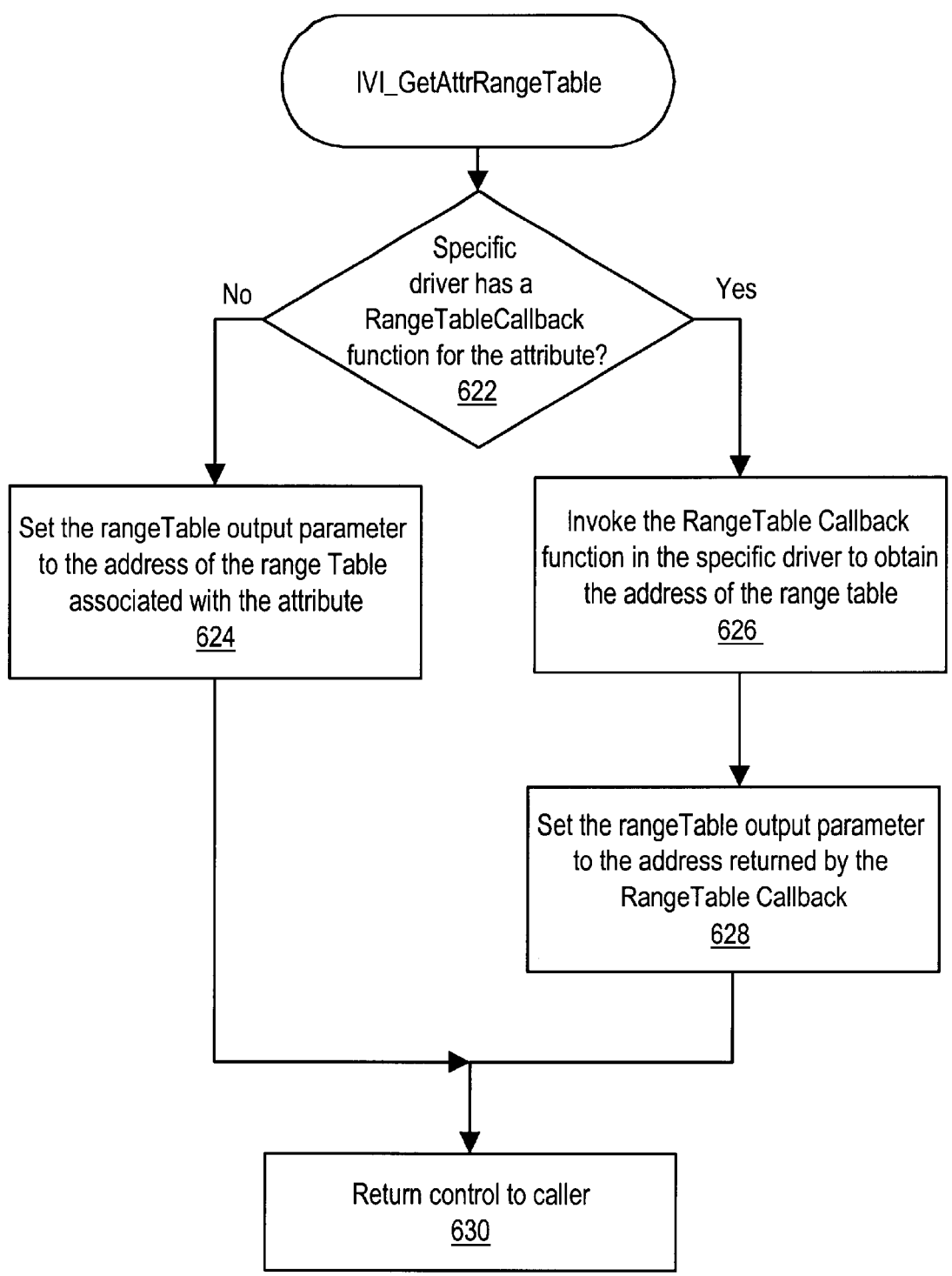
FIG. 14 is a flowchart diagram illustrating the IVI_Get AttrRangeTable callback.

FIG. 14 is a flowchart diagram illustrating the IVI_GetAttrRangeTable function according to the preferred embodiment of the invention. As shown, when the Ivi_GetAttrRangeTable function is called or invoked, in step 622 the function determines if the specific driver has specified a RangeTableCallback function for the attribute. In general, the specific driver specifies a RangeTableCallback function for certain attributes when the rangeTable needs to change based on the state of the instrument.

If the specific driver has specified a RangeTableCallback function for the respective attribute, then in step 626 the Ivi GetAttrRangeTable function invokes the RangeTableCallback function in the specific driver to obtain the address of the range table. This callback determines the correct range table based on the current configuration and returns its address. After step 626, in step 628 the Ivi_GetAttrRangeTable function sets the rangeTable output parameter to the address returned by the RangeTablecallback. In step 630 the IVI_GetAttrRangeTable function returns control to the caller.

If the re is not a getRangeTableCallback associated with the attribute as determined in step 622, then in step 624 the Ivi_GetAttrRangeTable function sets the rangeTable output parameter to the address of the rangeTable associated with the attribute. The rangeTable associated with an attribute is commonly specified when the attribute is added by the specific driver in the initialization process. It is noted that this value is NULL (0) if a rangeTable does not exist. After step 624, in step 630 the function returns control to the caller.

IVI Default Coere Callback

Figure 15:
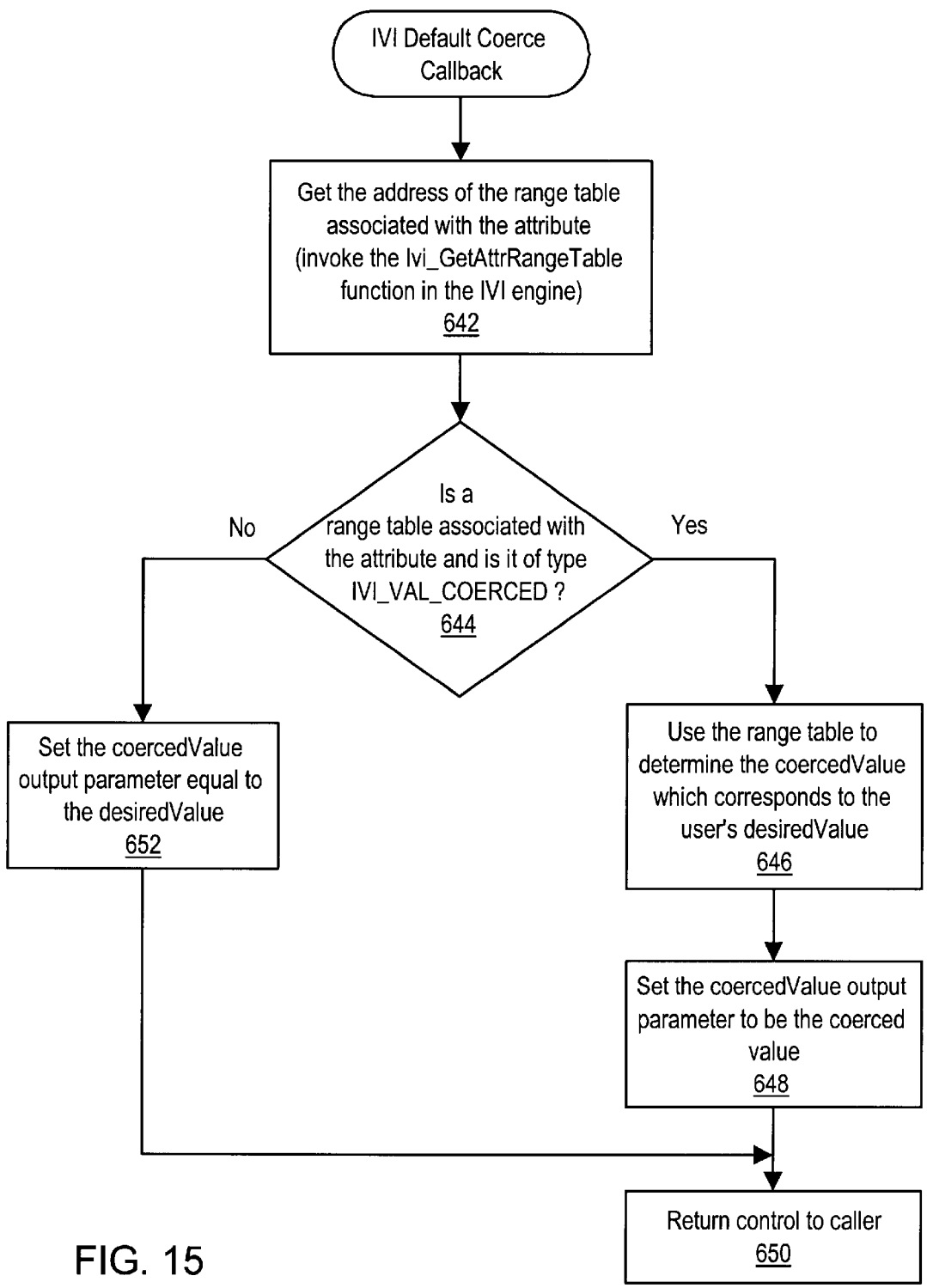
FIG. 15 is a flowchart diagram illustrating the IVI Default Coerce Callback.

FIG. 15 is a flowchart diagram illustrating the IVI Default Coerce Callback function according to the preferred embodiment of the invention. As shown, when the Coerce Callback is called or invoked, in step 642 the Coerce Callback gets the address of the range table associated with the attribute. This is preferably done by invoking the Ivi_GetAttrRangeTable function in the IVI Engine 306. The Ivi_GetAttrRangeTable function was discussed above with reference to FIG. 14.

In step 644 the Coerce Callback determines if there is a rangeTable associated with the attribute, and the rangeTable is of type IVI_VAL_COERCED. If there is a rangeTable associated with the attribute, and the rangeTable is of type IVI_VAL_COERCED as determined in step 644, then in step 646 the Coerce Callback uses the rangeTable to determine the coercedValue that corresponds to the user's desiredValue. In the preferred embodiment, helper functions are available in the IVI Engine 306 which perform step 646. In step 648 the Coerce Callback sets the corecedValue output parameter to the be the coercedValue. In step 650 the Coerce Callback returns control to the caller.

If there is not a rangeTable associated with the attribute or the rangeTable is not of type IVI_VAL_COERCED as determined in step 644, then in step 652 the Coerce Callback sets the coercedValue output parameter equal to the desiredValue. The Coerce Callback then advances to step 650 to return control to the caller.

Figure 16:
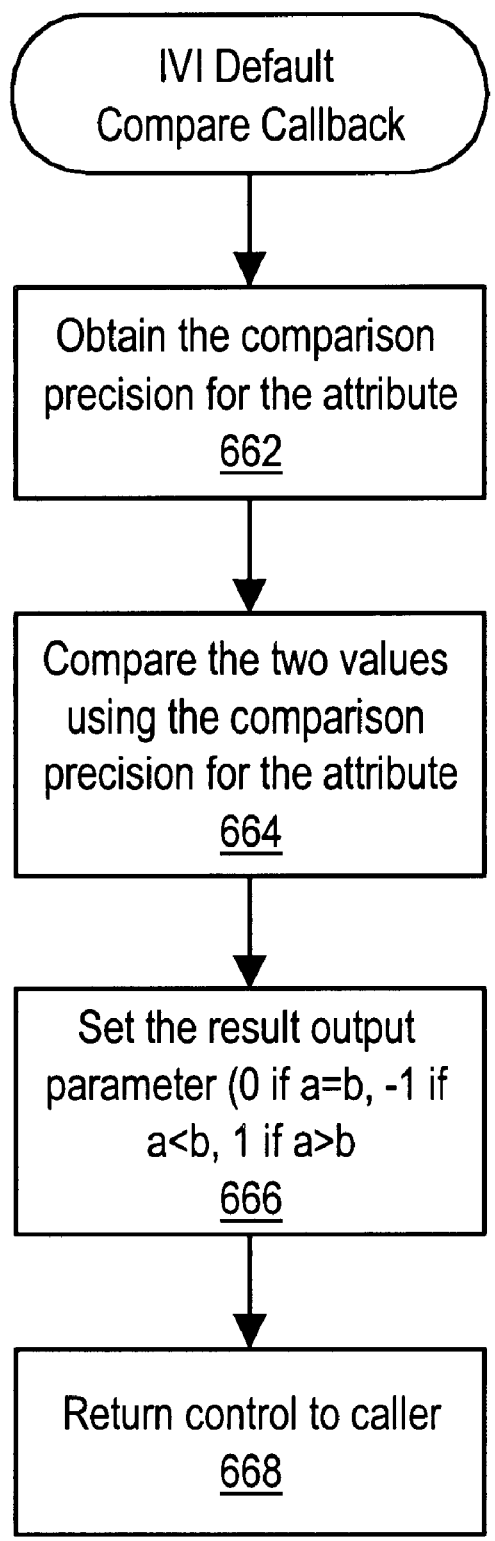
FIG. 16 is a flowchart diagram illustrating the IVI Default Compare Callback.

FIG. 16: Compare Callback

FIG. 16 is a flowchart diagram illustrating the IVI Default Compare Callback function according to the preferred embodiment of the inventions. As shown, when the Compare Callback is called or invoked, in step 662 the Compare Callback obtains the comparison precision associated with the attribute. This is preferably done by invoking the Ivi_GetAttrComparePrecision function in the IVI Engine 306.

In step 664 the Compare Callback compares the two parameters that were passed to the Compare Callback using the comparison precision. The parameters are, for example, named "a" and "b". In step 666 the Compare Callback sets the result output parameter based on the result of the comparison. Setting the result to 0 means that the "a" value is equal to the "b" value. Setting the result to −1 means that the "a" value is less than the "b" value. Setting the result to 1 means that the "a" value is greater than the "b" value. In other words, the value produced is as follows: (0 if a=b, −1 if a<b, 1 if a>b). In step 668 the Compare Callback returns control to the caller.

Figure 17:
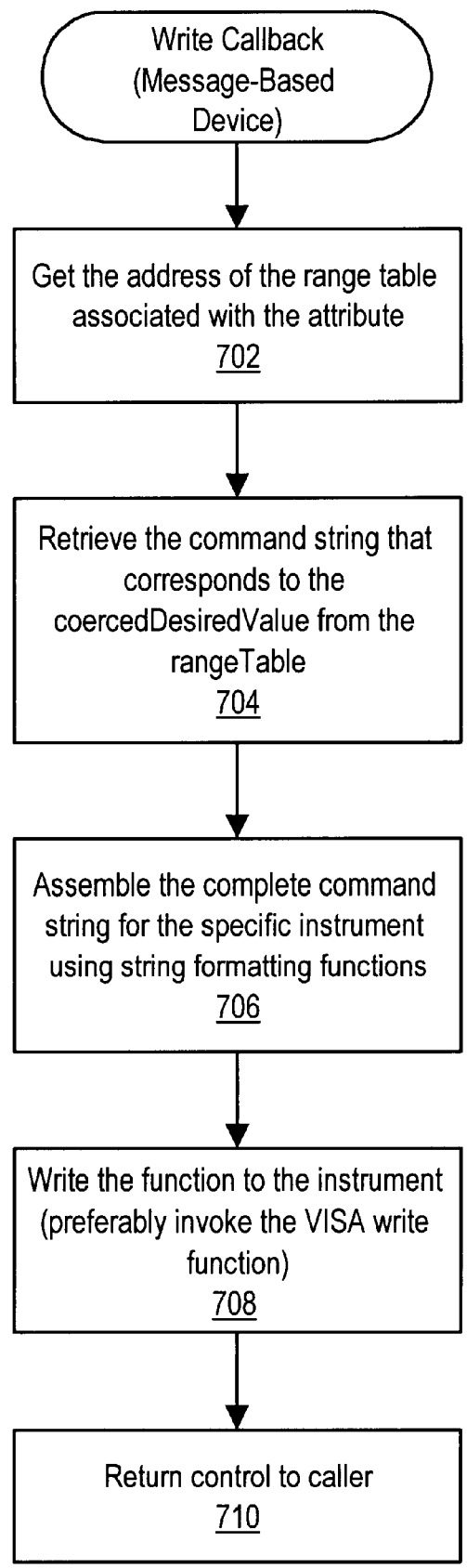
FIG. 17 is a flowchart diagram illustrating an example of the Write Callback for a Message-Based Device.
Figure 18:
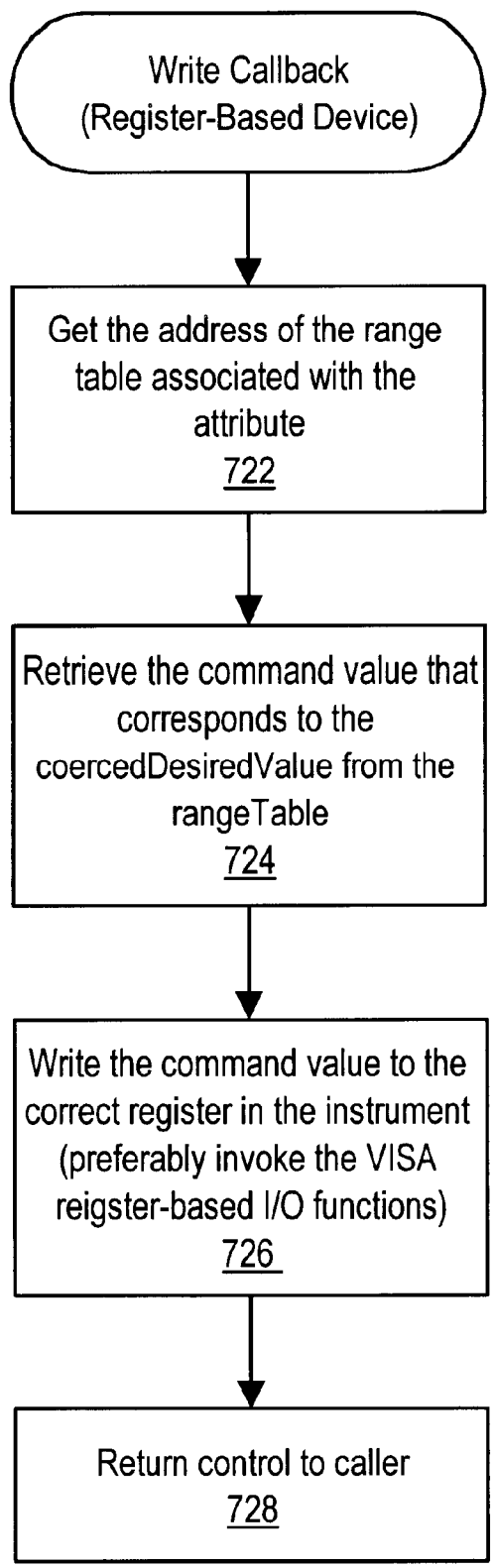
FIG. 18 is a flowchart diagram illustrating an example of the Write Callback for a Register-Based Device.

FIGS. 17 and 18: Write Callback

The Write Callback comprises code inside the specific driver that writes the value of an attribute to a specific instrument by creating the correct command syntax for the specific instrument. The command syntax could be a message-based command for a message-based instrument, or could be implemented by accessing registers within a register-based device. The following are examples of typical implementations of the Write Callback found in specific drivers for a message-based device and a register-based device. It is noted that specific drivers can implement Write Callbacks in various ways.

FIG. 17—Write Callback for a Message-Based Device

FIG. 17 is a flowchart diagram illustrating a typical implementation of a Write Callback for a message-based device. In step 702 the Write Callback gets the address of the range table associated with the attribute. If the rangeTable is static, i.e., never changes, the callback may have the address "hard-coded". Otherwise, the specific driver invokes the Ivi_GetAttrRangeTable function in the IVI Engine 306.

In step 704 the Write Callback retrieves the command string from the rangeTable that corresponds to the coercedDesiredValue. Helper functions in the IVI Engine are preferably used to perform step 704.

In step 706 the Write Callback assembles the complete command string for the specific instrument using string formatting functions. In step 706 it is important that the Write Callback assembles a complete command with all necessary headers and terminators. This is discussed further in the section on Deferred Updates.

The reason it is important for the Write Callback to build a complete command string including headers and terminators is because the Write Callback may be invoked by the Deferred Update process, and the result of that operation may be sent to a buffer along with other Write operations. Thus the command string itself has to make sense when it is sent by itself to the instrument as well as when it is sent as part of a larger command string containing multiple changes to settings in the instrument.

In step 708 the Write Callback writes the command to the instrument, preferably by invoking the write function in VISA. In step 710 the Write Callback returns control to the caller.

FIG. 18—Write Callback for a Register-Based Device

FIG. 18 is a flowchart diagram illustrating a typical implementation of a Write Callback for a register-based device. In step 722 the Write Callback gets the address of the range table associated with the attribute. As with step 702 above, if the rangeTable is static, i.e., never changes, the callback may have the address "hard-coded". Otherwise, the specific driver invokes the Ivi_GetAttrRangeTable function in the IVI Engine 306.

In step 724 the Write Callback retrieves the command value from the rangeTable that corresponds to the coercedDesiredValue. Helper functions in the IVI Engine are preferably used to perform step 724.

In step 726 the Write Callback writes the command value to the correct register in the instrument, preferably by invoking the register-based I/O functions in VISA. In step 728 the Write Callback returns control to the caller.

Figure 19:
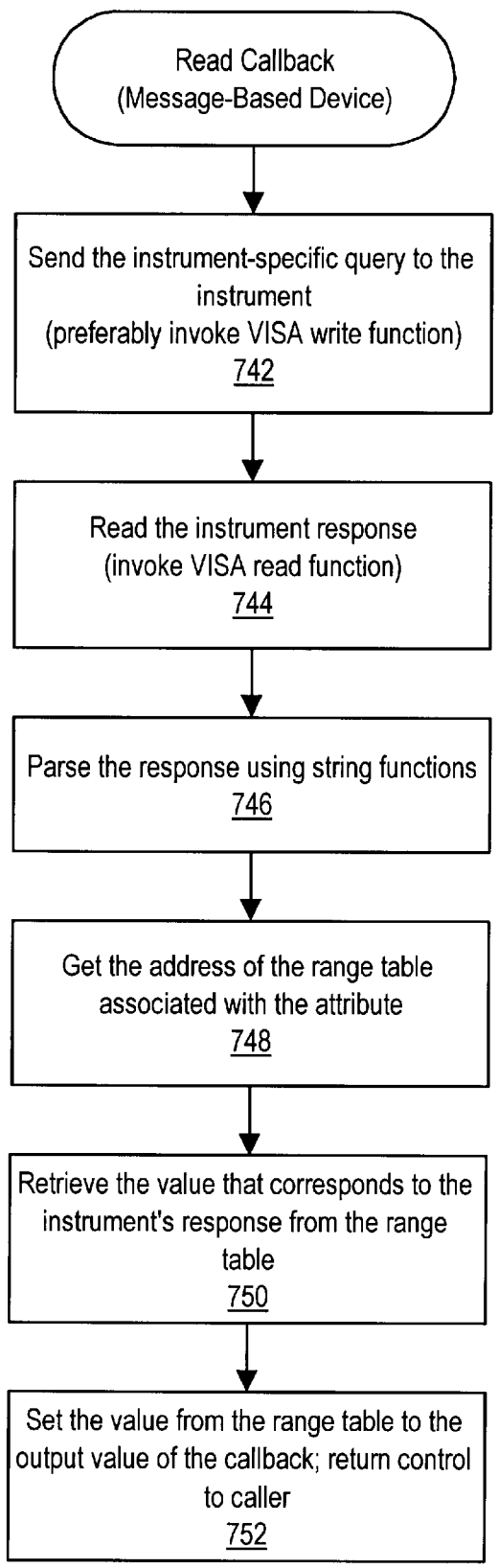
FIG. 19 is a flowchart diagram illustrating an example of the Read Callback for a Message-Based Device.
Figure 20:
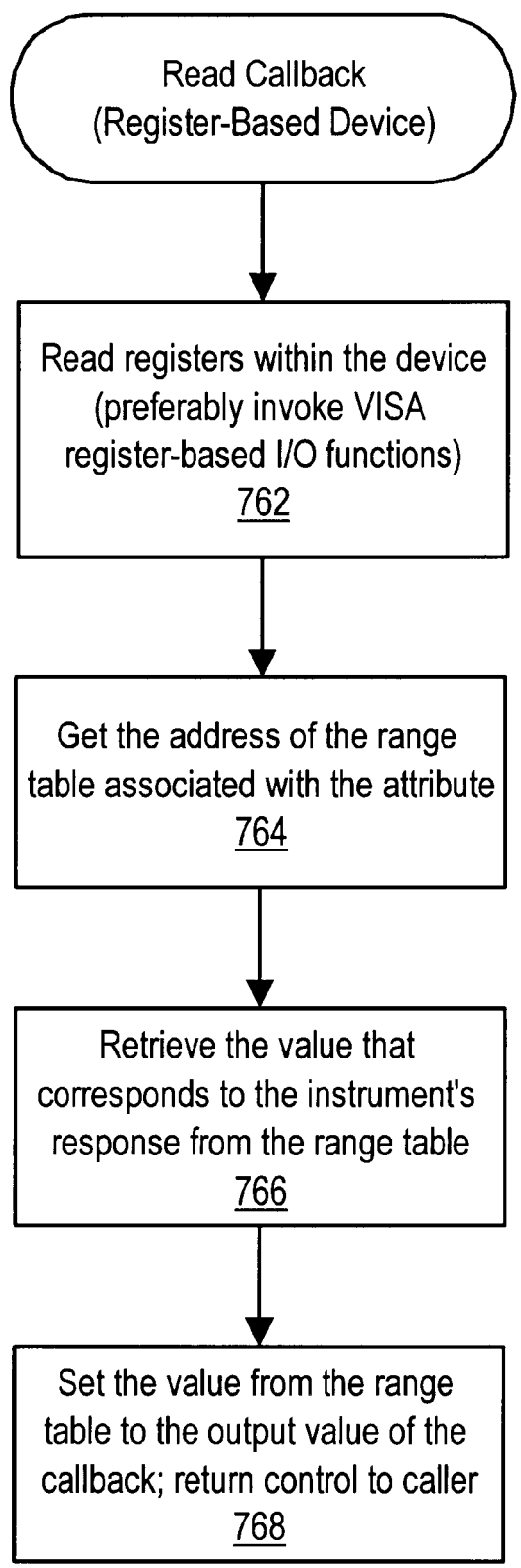
FIG. 20 is a flowchart diagram illustrating an example of the Read Callback for a Register-Based Device.

FIGS. 19 and 20: Read Callback

The Read Callback comprises code inside the specific driver that reads the value of an attribute from a specific instrument by creating the correct command syntax for the specific instrument. As with the Write Callback above, the command syntax could be a message-based command for a message-based instrument, or could be implemented by accessing registers within a register-based device. The following are examples of typical implementations of the Read Callback found in specific drivers for a message-based device and a register-based device. It is noted that specific drivers can implement Read Callbacks in various ways.

FIG. 19—Read Callback for a Message-Based Device

FIG. 19 is a flowchart diagram illustrating a typical implementation of a Read Callback for a message-based device. In step 742 the Read Callback sends the instrument specific query to the instrument, preferably by invoking the VISA write function. In step 744 the Read Callback invokes the VISA read function to read the instrument's response. In step 746 the Read Callback parses the response using string functions.

In step 748 the Read Callback obtains the address of the range table associated with attribute. As with steps 702 and 722 above, if the rangeTable is static, i.e., never changes, the callback may have the address "hard-coded". Otherwise, the specific driver invokes the Ivi_GetAttrRangeTable function in the IVI Engine 306.

In step 750 the Read Callback retrieves the value that corresponds to the instrument's response from the range table. This converts the instruments response to one of the values defined for the attribute in the driver. This allows the driver to cache values in the computer's terms so that it can perform a cache comparison. Helper functions in the IVI Engine are preferably used to perform step 750. In step 752 the Read Callback sets the output value of the callback function to the value from the rangeTable, and the Read Callback then returns control to the caller.

FIG. 20—Read Callback for a Register-Based Device

FIG. 20 is a flowchart diagram illustrating a typical implementation of a Read Callback for a register-based device. In step 762 the Read Callback invokes the VISA register-based I/O functions to read registers within the device.

In step 764 the Read Callback obtains the address of the range table associated with the attribute. As with steps 702, 722, and 748 above, if the range table is static, i.e., never changes, the callback may have the address "hard-coded". Otherwise, the specific driver invokes the Ivi_GetAttrRangeTable function in the IVI Engine 306.

In step 766 the Read Callback retrieves the value that corresponds to the instrument's register value from the rangeTable. Helper functions in the IVI Engine are preferably used to perform step 766. In step 768 the Read Callback sets the output value of the callback function to the value from the rangeTable, and returns control to the caller.

Range Table Callback

The Range Table Callback comprises code inside the specific driver that returns the address of a rangeTable for a particular attribute based on the current settings of the instrument. As discussed above with respect to FIG. 15, the Range Table Callback is invoked in the Ivi_GetAttrRangeTable function if the specific driver has specified a RangeTableCallback function for the attribute. The Range Table Callback is optional and is only needed when the rangeTable needs to change based on the state of the instrument.

This callback is typically implemented in two ways. The first case is when the set of possible range tables is known and fairly small. In this case, all of the range tables are statically declared in the specific driver 308, and the callback selects the correct range table based on the settings of other attributes. The Range Table Callback then returns the address of the selected rangeTable. The second case is when the set of possible rangeTables is not known. This is typically the case when the entries in the range are calculated based on the values of other attributes. In this case the range table is dynamically created and entries in the rangeTable are calculated by the Range Table Callback.

Check Status Callback

The Check Status Callback comprises code inside the specific driver that queries the instrument status. If the instrument encounters an error, the function returns the error IVI_ERROR_INSTRUMENT_SPECIFIC.

Wait for OPC Callback

The Wait for OPC Callback comprises code inside the specific driver that return control to the caller only when the instrument is idle and ready to receive commands. This is important for handling synchronization between attributes.

FIG. 21—Obtain Handle to Simulation Driver—Ivi GetSimulationDriverVi

Figure 7A:
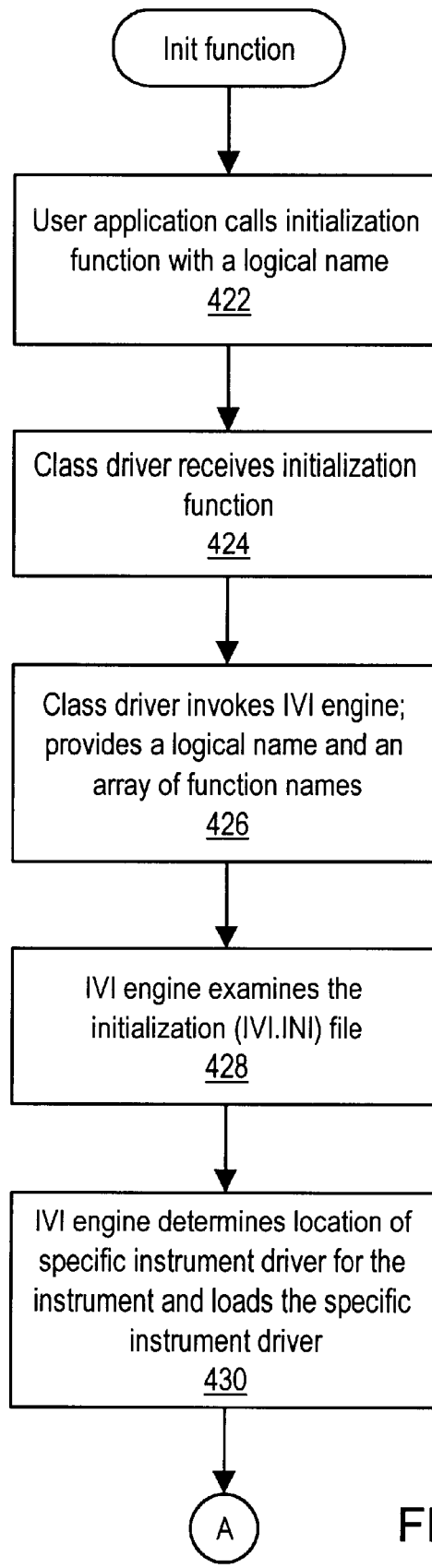
FIGS. 7A–7D are a flowchart diagram illustrating execution of an initialization function in the user application.
Figure 7B:
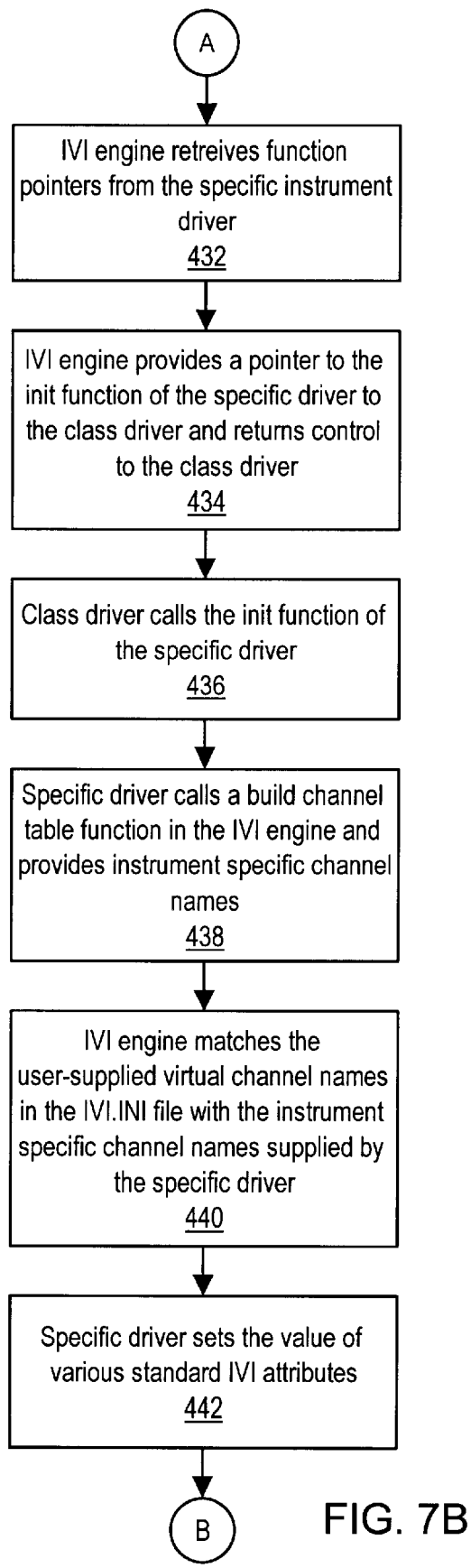
Figure 7C:
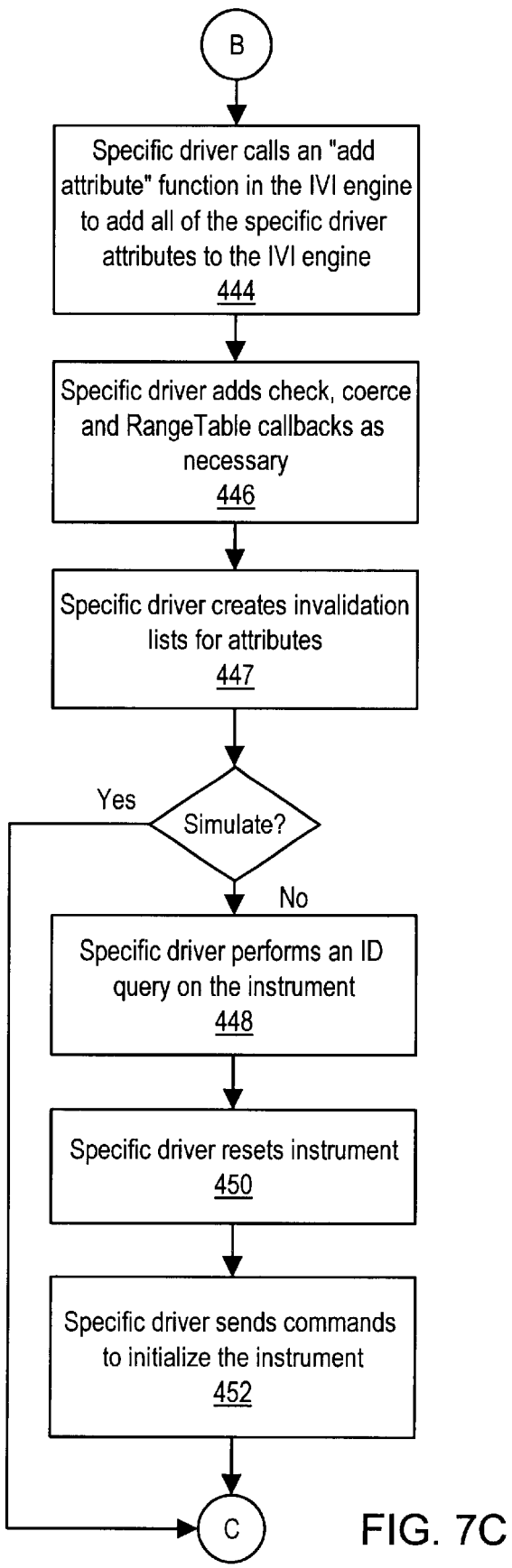
Figure 7D:
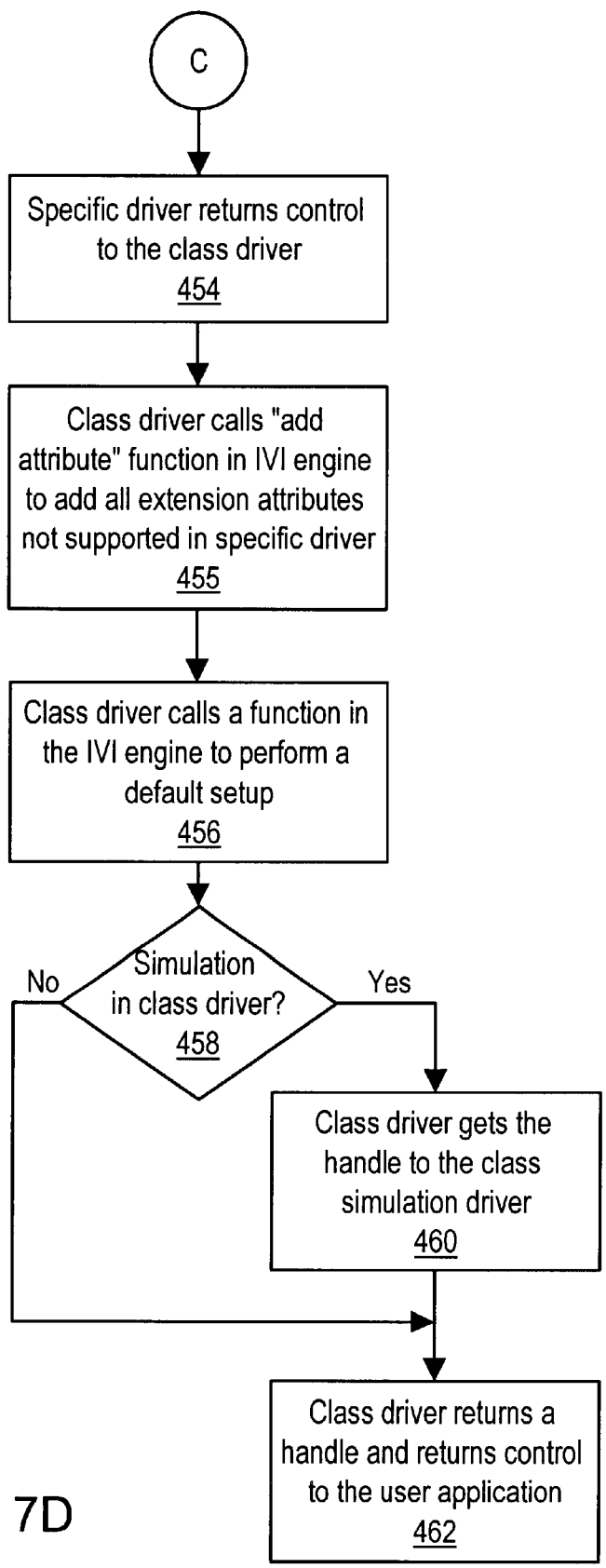

FIG. 21 is a flowchart diagram illustrating operation of step 460 of FIG. 7D, i.e., the class driver obtaining a handle to the class simulation driver. As shown, in step 770 the class driver obtains a reference to the simulation VI, referred to as simVi, preferably by calling Ivi_GetAttibuteViSession on IVI_ATTR_SIMULATE_VI. If the class simulation driver has been initialized as determined in step 771, i.e., a valid simVi is returned, then operation proceeds to step 780. In step 780, control is returned to the caller.

If the class simulation driver has never been initialized as determined in step 771, i.e., simVi is VI_NULL, then operation proceeds to step 772. In step 772 the class driver obtains the simulation driver VInstr name by calling a function in the IVI Engine called Ivi_GetSimulationVInstrName. This function examines the IVI.ini file, first by examining the VInstr section, and if the name is not found, the function examines the Class driver section. If the simulation driver name is not found, the function returns an empty string.

If the simulation driver VInstr name string is empty, the class driver sets it to the default simulation driver VInstr name for the class.

In step 773 the class driver calls Ivi_ClassDriverNew in the IVI Engine to create an IVI session for the simulation driver and load the simulation driver.

In step 774 the class driver invokes a function in the IVI Engine to obtain the function pointer to the simulation driver's init function. In step 775 the class driver invokes the init function in the simulation driver. In step 776 the class driver applies the simulation driver's default setup from the IVI.ini file, preferably by invoking the Ivi_ApplyDefaultSetup function in the IVI engine. In step 777 the class driver calls a function in the simulation driver to enable the simulation driver to access the specific driver's attributes, preferably by passing the handle for the specific instrument driver. In step 778 the class driver sets an attribute, preferably IVI_ATTR_SIMULATE_VI, in the class driver to the handle for the simulation driver, thus enabling future access to the simulation driver. In step 780 the class driver returns control to the caller.

Instrument Interchangeability

The present invention provides an instrument interchangeability feature which allows simplified replacement or interchangeability of instruments without altering the user application, class driver, or the specific driver. In the preferred embodiment, the user is only required to change a logical name reference to a different instrument in the IVI.INI file in order to replace or exchange instruments of a common class.

Figure 22:
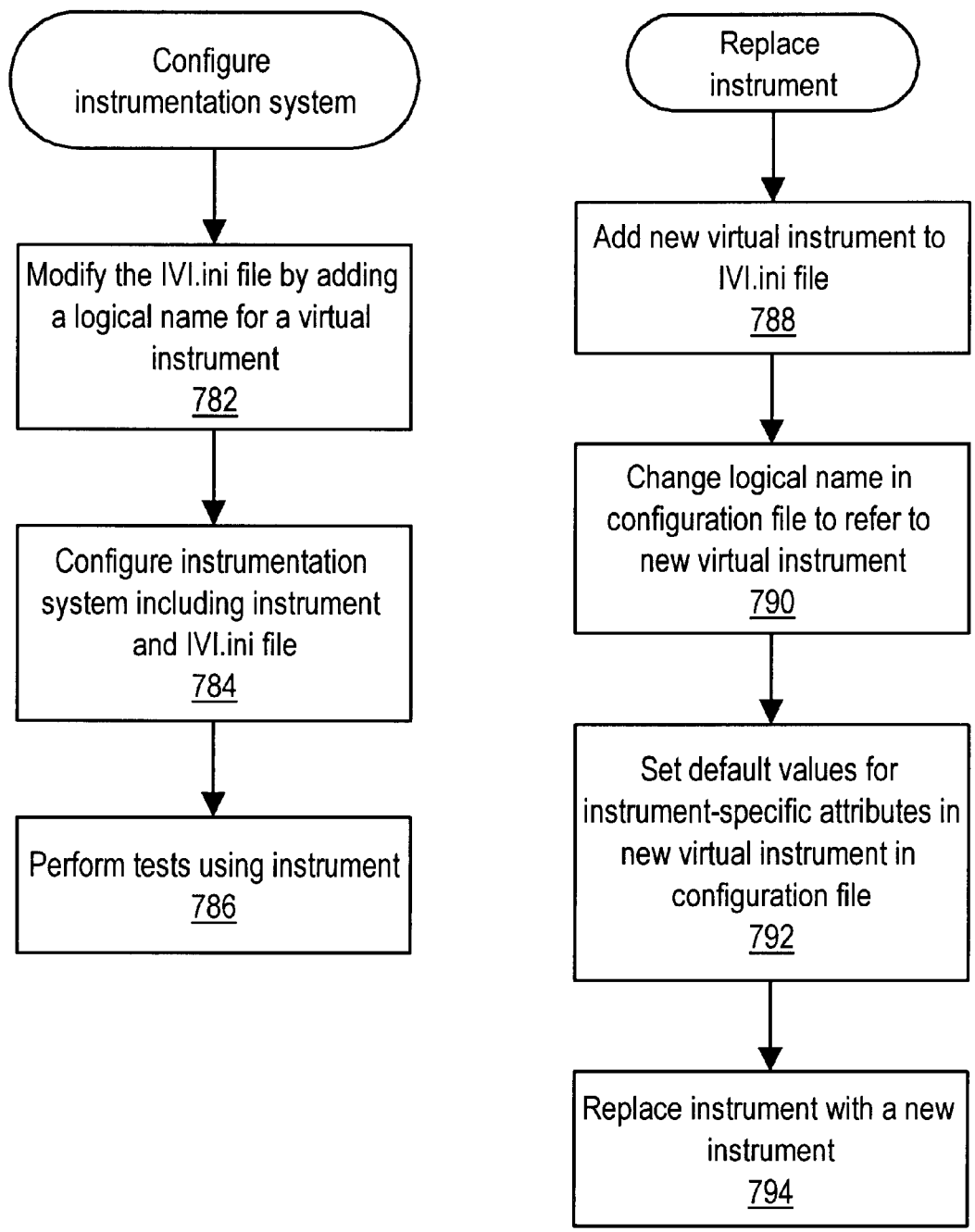
FIG. 22 is a flowchart diagram illustrating instrument interchangeability.

FIG. 22 is a flowchart diagram illustrating the instrument interchangeability of the present invention. As shown, in step 782 the developer modifies the IVI.ini file by adding a logical name for the virtual instrument. In step 784 the developer configures the instrumentation system including the instrument and the IVI.ini file. In step 786 the user or developer performs tests using the instrument.

If the instrument later malfunctions, or for other reasons the user desires to replace the instrument with another instrument of that same class, then the operation proceeds as follows. As shown, in order to replace an instrument with another instrument of the same class, the user preferably changes information in the IVI.ini file. According to the present invention, the user is only required to change information in the IVI.ini file, and is not required to change the user application or the class driver. The user is also required to install the specific driver for the new instrument.

As shown, in step 788 the user adds a new virtual instrument section for the replacement instrument. The new virtual instrument section refers to a hardware section that identifies the address of the replacement instrument and a driver section that identifies the path name of the specific driver for the replacement instrument. In step 790 the user changes the logical name in the IVI.ini file or configuration file to refer to the new virtual instrument. In step 792 the user sets default values for instrument-specific attributes in the new virtual instrument section of the IviInit file. In step 794 the user physically replaces the instrument with a new instrument, and also installs the corresponding new specific instrument driver corresponding to the new instrument.

Thus, as mentioned above, in order to replace an instrument with another instrument of that same class, the user is not required to modify the user application or the class driver, but merely replaces the instrument and its corresponding instrument driver, and makes minor modifications to the IVI.ini file. This greatly simplifies operation and allows true instrument interchangeability in an instrumentation system.

Figure 23:
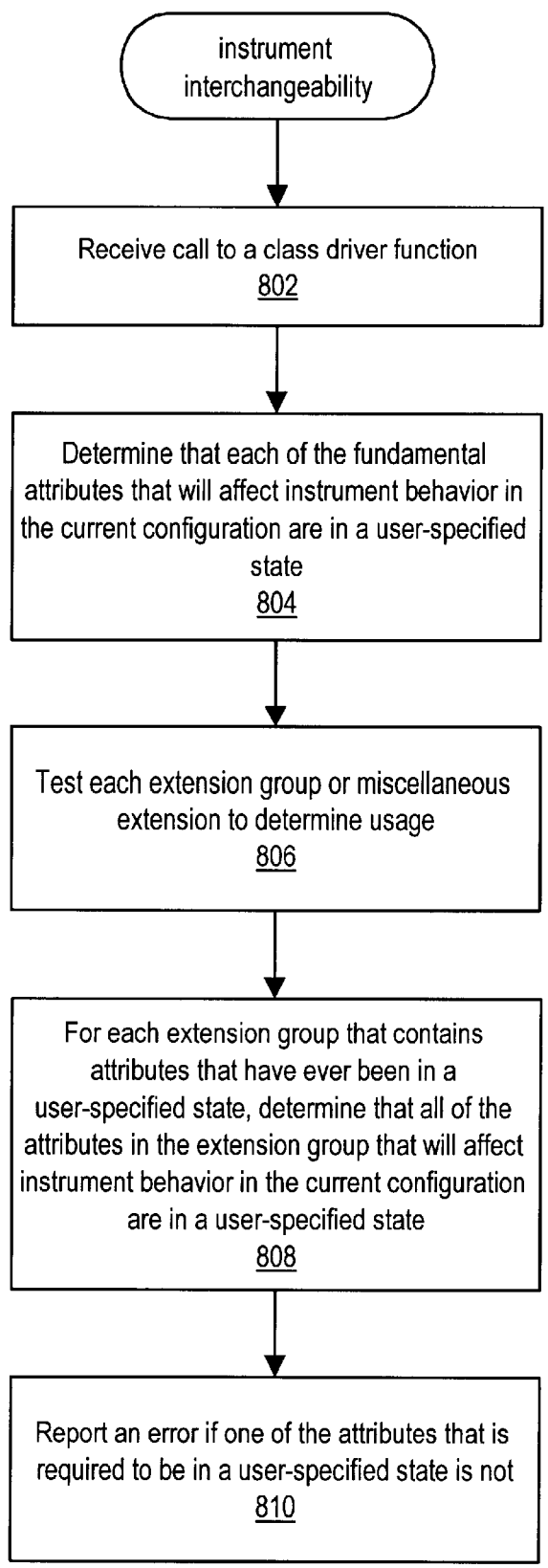
FIG. 23 is a flowchart diagram illustrating instrument interchangeability checking.

FIG. 23—Interchangeability Checking

The Class driver provides an instrument interchangeability checking feature according to the present invention. The class specification specifies the rules for interchangeability checking and when it occurs. Typically, interchangeability checking occurs when the user calls a class driver function that causes the instrument to perform an operation based on a current configuration of the instrument. In other words, since the operation depends on the current configuration of the instrument, interchangeability checking is necessary to ensure that proper operation of the instrument occurs, i.e., the instrument needs to be in an interchangeable state at this point because the instrument will be taking a measurement or outputting a stimulus. For the IviDmm class fundamental capabilities, for example, these functions include Read and Initiate.

One purpose of interchangeability checking is essentially to ensure that everything required to specify instrument behavior the user invokes is in a user-specified state and is not relying on a default instrument state. This is because the default state of various instruments in a class can differ, and thus the user-specified state is necessary to ensure that it is possible to replace the instrument with a new one.

FIG. 23 is a flowchart diagram illustrating operation of instrument interchangeability according to the present invention. As shown, in step 802 the user application makes a call to a class driver function. In other words, the user application makes a call to a function in the class driver.

In step 804 the class driver determines that each of the fundamental attributes that will affect instrument behavior in the current configuration are in a user specified state. Thus, in step 804 the class driver determines which of the fundamental attributes will affect instrument behavior in the current instrument configuration. The class driver then determines if these attributes are in a user specified state. It is noted that some of the attributes may not be required to be in a user-specified state because the user-specified value for another attribute ensures that the attribute does not have an affect on instrument behavior. Thus, where a first fundamental attribute has a user specified value, and a second fundamental attribute does not affect instrument behavior when the first fundamental attribute has the user-specified value, the class driver intelligently recognizes this and does not determine if the second fundamental attribute is in the user-specified state in response to determining that the first fundamental attribute has the user-specified value.

In step 806 the class driver tests each extension group or miscellaneous extension to determine usage, i.e., to determine if any of the attributes in these extension groups have ever been in a user-specified state.

For each extension group for which one or more attributes have ever been in a user-specified state, the class driver then checks that all of the attributes that are a part of the respective extension group and that will affect instrument behavior in the current configuration are in a user-specified state. It is noted that some of the attributes of a specific extension may not be required to be in a user-specified state because the user-specified value for another attribute that is a part of an extension group ensures that the attribute does not have an effect on instrument behavior. Thus, where a first extension attribute has a user-specified value, and a second extension attribute does not affect instrument behavior when the first extension attribute has the user-specified value, the class driver intelligently recognizes this and does not determine if the second extension attribute is in the user-specified state in response to determining that the first extension attribute has the user specified value.

In step 810, if one of the attributes that is required to be in a user-specified state is not in the user-specified state, then the class driver records the interchangeability problem.

In the preferred embodiment, the class driver is operable to use functions and/or flags in the IVI Engine 306 in performing steps 804, 806 and 808.

Figure 24:
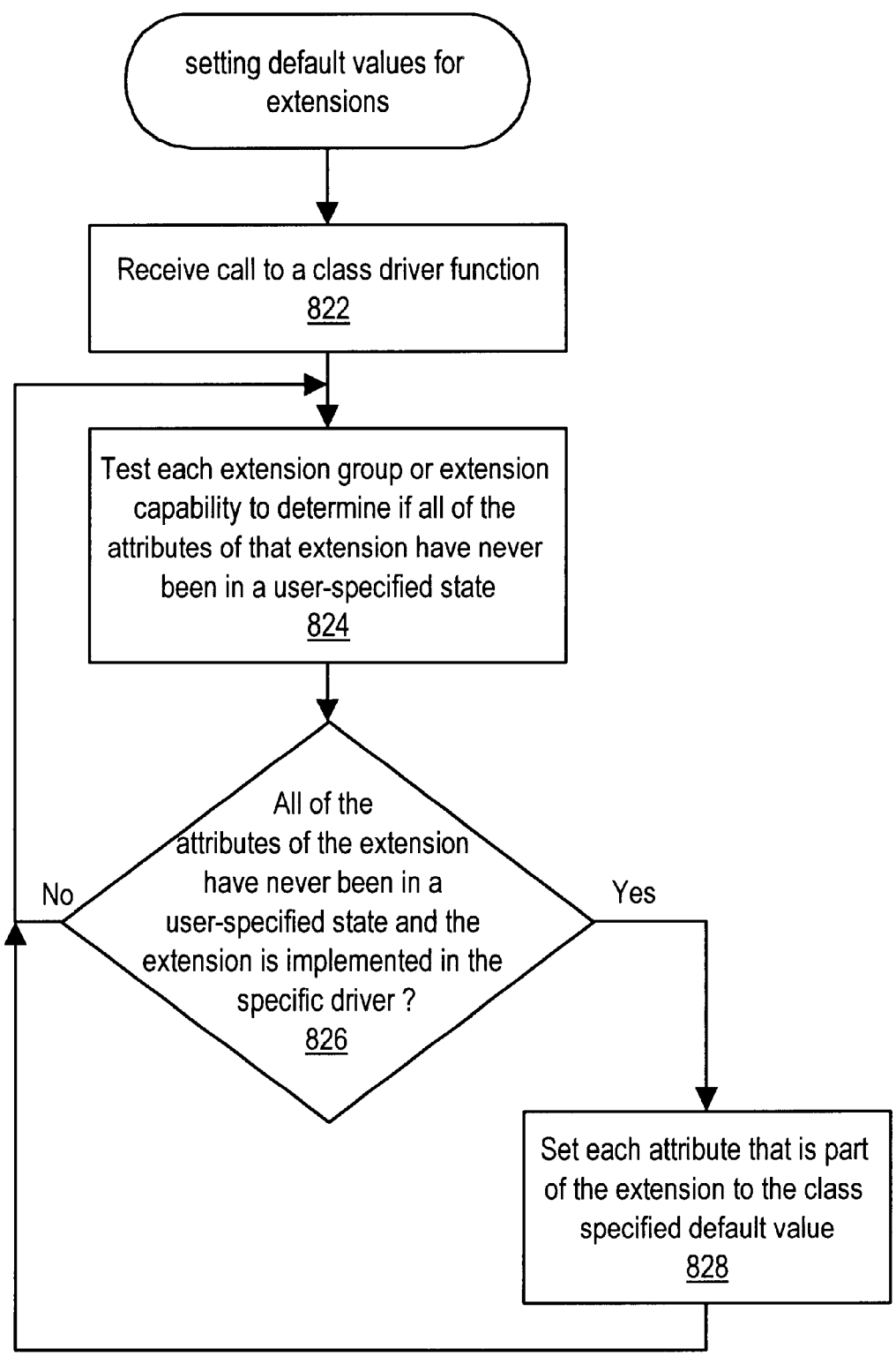
FIG. 24 is a flowchart diagram illustrating setting of extension attributes to class-specified default values.

FIG. 24—Setting Default Values for Extensions

Default values for extension attributes are defined by the particular instrument class and are implemented by the class driver. Additionally, the class specifies when these default values will be set by the class driver. Typically, this is when the user calls a class driver function that causes the instrument to do something based on a current configuration. In other words, the instrument needs to be in an interchangeable state at this point because the instrument is about to take a measurement or output a stimulus. From the IviDmm class fundamental capabilities, for example, these functions are Read and Initiate.

This feature enables the user to not be required to set the state of class extension attributes if they are not required for his/her application. The user can use instruments that implement the unused extension as well as ones that do not. This provides the user a wider selection of instruments to use in his application. The default values specified by the class are typically selected so that when the default values are set, the extension group has no effect on instrument behavior.

FIG. 24 is a flowchart diagram illustrating operation of setting default values for extension according to the present invention. As shown, in step 822 the class driver receives a call to a class driver function. In other words, in step 822 the user application makes a call to a function in the class driver.

In step 824 the class driver tests each extension group or miscellaneous extension to see if any of the attributes in an extension group have ever been in a user-specified state. It is noted that the class driver makes calls to and/or uses flags in the IVI Engine to perform step 824.

If an extension group has no attributes that have ever been in a user-specified state and the extension is implemented in the specific driver as determined in step 826, in step 828 the class driver sets the each attribute that is a part of the extension to the class specified default value. It is noted that some of the attributes of a specific extension may not require a default value because the default value for another attribute that is a part of an extension group ensures that the attribute does not affect instrument behavior.

Figure 25A:
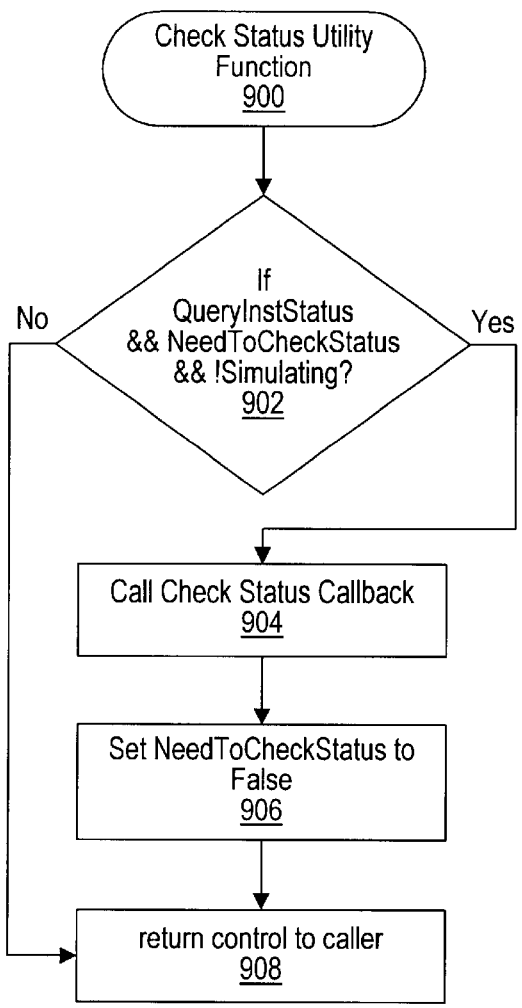
FIGS. 25A and 25B are flowchart diagrams of the check status utility function and the check status callback function.
Figure 25B:
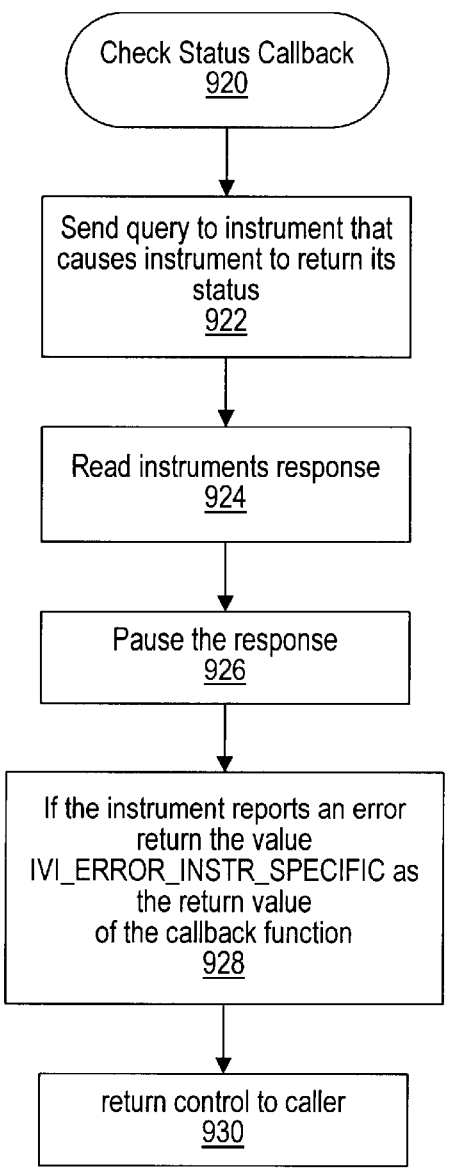

FIGS. 25A–B: Specific Driver Calls the Check Status Utility Functions

FIG. 25 is a flowchart diagram illustrating the check status utility function that is called in step 487. As shown in step 902 the check status utility function determines if all of the following conditions are true:

Simulating is disabled

Instrument Status Checking is enabled

The "NeedToCheckStatus" flag is TRUE

It is noted that both the IVI Engine 306 and the Specific Driver 308 manipulate the "NeedToCheckStatus" flag. The IVI Engine 306 sets the "NeedToCheckStatus" flag to TRUE before it invokes a write or read callback. The IVI Engine 306 sets the NeedToCheckStatus" flag to FALSE after it invokes the check status callback.

The Specific Driver 308 sets the "NeedToCheckStatus" flag to TRUE before it accesses the instrument in a function other than a write, read, or check status callback. The Specific Driver 308 sets the "NeedToCheckStatus" flag to FALSE after it invokes the check status callback in step 906.

If any of the above conditions are NOT true, the operation proceeds to step 908 and returns control to the caller. If all of the above conditions are true, the check status utility function invokes the check status callback function in step 904.

In Step 922 the check status callback function sends a query to the instrument that causes the instrument to return its status. In step 924 the check status callback reads the response from the instrument and parses the response in step 926. In Step 928 the check status callback examines the response and determines if the instrument has encountered an error. If the instrument has encountered an error the check status utility function sets IVI_ERROR_INSTR_SPECIFIC as the return value of the function. The check status callback returns control to the caller in step 930.

After the check status callback returns control to the check status utility function, the check status utility function sets the "NeedToCheckStatus" flag to FALSE. In step 908, the check status utility function returns control to the caller.

Default Instrument Setup (ini file)

As noted above, the present invention includes an INI or configuration file for specifying information regarding a virtual instrument. Using the IVI.INI file, the user can specify the list of attributes (by name) and a value to which they should be set. These setting are processed by the class driver after the specific driver's IviInit function has been called in the initialization process (step 456; FIG. 7D). Thus the user has the ability to set the state of at least a subset of the instrument's attributes external to the user application. This is useful because the user can set instrument-specific attributes of the specific driver outside of a user application in which the user is trying to use only features of the class to maximize interchangeability. This is also necessary to make some instruments behave interchangeably.

Verification of Replacement Instruments

The present invention includes an improved method for verification of replacement instruments.

Turn Spying to VI_TRUE for the VInstr that the user desires to replace;

Launch NI-Spy application, select to spy on the IVI Class that the VInstr is compliant with, deselect all other APIs, and turn capturing mode on.

Run the test application that makes calls to the Class driver to access the VInstr Save the resulting trace from NI-SPY.

Run the trace through an IVI code generator that creates a sample program for the new VInstr.

Run the resulting program on the new VInstr with simulation turned either on or off.

If no error is reported, then the new instrument should be able to replace the old instrument in that application.

An alternate method to perform verification of replacement instruments is to run the application in simulation mode with the new specific driver.

Production vs. Development Modes

The specific driver includes attributes which model attributes or settings of the instrument. These attributes include attributes referred to as development/production attributes, including the following: state caching, interchangeability checking, range checking, instrument status checking, and coercion recording. As described above, the system includes an initialization file which stores attribute values for the virtual instrument. The IVI engine is operable to examine the initialization file and configure the attributes in the specific driver with attribute settings from the INI file.

According to the present invention, the initialization (INI) file is operable to be configured with these development/production attributes in a development mode during development of the user application. The initialization (INI) file is operable to be configured with these development/production attributes in a production mode during production of the user application.

In other words, during development and testing of the system, the user can configure the INI file with certain attributes in a mode which is more desirable for testing and development. For example, the user can set the state caching attribute to be disabled, and can enable interchangeability checking, range checking, instrument status checking, and coercion recording for debugging purposes. After development has been completed, the user can configure the INI file with these attributes in a mode which provides increased performance, such as enabling state caching, and disabling interchangeability checking, range checking, instrument status checking, and coercion recording.

The development/performance attributes involved here include the following attributes:
IVI_ATTR_CACHE
IVI_ATTR_RANGE_CHECK
IVI_ATTR_INTERCHANGE_CHECK
IVI_ATTR_QUERY_INSTR_STATUS
IVI_ATTR_SPY
IVI_ATTR_RECORD_COERCIONS FIG. 26—User Perspective FIG. 26 illustrates the user perspective of the IVI software architecture of the present invention. As shown, the user application 302 can directly access an IVI-compliant specific driver to communicate with or control an instrument. As noted above, this does not provide the instrument interchangeability benefits of the present invention. The user application 302 can also interface to a class driver, such as a DMM class driver, to communicate with or control an instrument. As discussed above, interfacing to the class driver includes calling functions or invoking methods in the class driver, or getting/setting attributes in the class driver. Also, where a class driver exists, the user application 302 can interface through the class driver, e.g., a scope class driver, or interface directly with the specific driver.

Range Tables

Range tables can have various types, depending on the attribute, including discrete, ranged, and coerced. Range tables for attributes of type discrete specify discrete values that the attribute can have. Range tables for attributes of type ranged specify various ranges for the attribute, e.g., 0 to 10, 10 to 15, 15 to 20. Range tables for attributes of type coerced specify a plurality of ranges as well as coerced values.

The range table allows the user or developer to specify information about an instrument. This information includes the type of table as described above. Range tables also include a table of values. For type discrete, the range table comprises the discrete values. For attributes of type range, the range table includes the minimum and maximum values for one or more ranges. For attributes of type coerced, the range table includes the minimum and maximum values for one or more ranges and also includes the coerced value for each range. The range table defines the ranges of values that the instrument will accept.

Coercion is used primarily for two purposes. One purpose of coercion is so that the specific driver can accurately match the state of the instrument. For example, if a value is written and is cached, and the value is coerced by the instrument, the coercion ensures that the coerced value is stored in the cache. Thus the system can avoid writing a different value to the instrument which the instrument would coerce to the same setting that the instrument is already in. A second purpose for coercion is for instrument interchangeability. This arises when different instruments are of the same class and support the same attributes, but have different discrete values. In this case, if user applications that called the class functions were required to pass in values that exactly matched the discrete value of the particular specific driver they were using underneath the class driver, their programs would not be interchangeable. An error would occur if a user application started using a specific driver with a different set of discrete values. Therefore, in the preferred embodiment, specific drivers accept a range of values and then map them to their particular discrete values, preferably in such a way that an equal or better operation is obtained.

It is also noted that coercion occurs after range checking, and thus coercion is not related to range checking. In the preferred embodiment, coercion and range checking both use the range table during operation.

The IVI engine has default check and coerce callbacks which are automatically installed when an attribute has a range table address or RangeTable callback. Thus, if the specific driver provides a range table to the IVI engine, the IVI engine can use the default callbacks to automatically perform the checking and coercion operations. The IVI engine also includes helper functions to manipulate range tables, including functions to validate a value, get the minimum and maximum values for a table as a whole, and get a range table entry that contains a particular value or command string or that is at a particular index in the list of entries in the table.

The following is an example range table:

```
static const IviRangeTable resolutionTable =
    {
        IVI_VAL_COERCED,      /* table type   */
        VI_TRUE,              /* Attribute has min */
        VI_TRUE,              /* Attribute has max */
        VI_NULL,              /* Custom string info */
        3,                    /* num table entries */
        {/* Minimum, Maximum, CoercedVal, CmdString */
            {0.0,     3.5,      3.5,       "F"},
            {3.5,     4.5,      4.5,       "M"},
            {4.5,     5.0,      5.0,       "S"},
        }
    };
```

IVI.ini file

The following is an example IVI.ini file:
Example IVI.INI File
[IviLogicalNames]
Scope1="VInstr->TekTDSC"
[Class->IviScope]
Description="IVI Digital Oscilloscope Class Driver"
SimulationVInstr="VInstr->NISimOsc"
[VInstr->TekTDSC]
Description="Tektronix TDS 754A/C"
Driver="Driver->TekTDSC"
Hardware="Hardware->TekTDSC"
Simulate=False
UseSpecificSimulation=False
RangeCheck=False QueryInstrStatus=False
Cache=True
Spy=True
RecordCoercions=False
InterchangeCheck=False
DefaultSetup="DefaultSetup->TekTDS C"
VirtualChannelNames="a=ch1,b=ch2"
ChannelListSelector=" "
[Driver->TekTDSC]
Description="Tektronix TDS 754A/C Driver"
ModulePath="tktds754.dll"
ChannelList=" "
Prefix="tktds754"
[Hardware->TekTDSC]
Description="Tektronix TDS 754A Digital Oscilloscope"
ResourceDesc="GPIB::2::INSTR"
[DefaultSetup->TekTDSC]
CHANNEL_ENABLED=True Deferred Updates When a high-level driver function in the Specific Driver 308 makes multiple calls to the Ivi_SetAttribute functions in the IVI Engine 306, it can postpone the actual transmission of the new attribute values to the instrument. It can later trigger all of the updates to occur at once. This capability is called deferring updates.

Typically, it is not necessary to defer updates. Deferring updates can be useful in cases where the overhead of initiating instrument I/O is very high. By deferring the updates, the Specific Driver 308 can buffer multiple instrument commands into one I/O action.

The Specific Driver 308 defers attribute updates by setting the IVI_ATTR_DEFER_UPDATE attribute to TRUE and then calling any of the Ivi_SetAttribute functions one or more times. The Specific Driver 308 calls the Ivi_Update function in the IVI Engine 306 to process the deferred updates. Ivi_Update function performs the updates in the same order in which the Specific Driver 308 called the Ivi_SetAttribute functions. Generally, deferral of updates is a capability for instrument driver developers, not users. Functions in the Specific Driver 308 that the User Application 302 can call must never leave IVI_ATTR_DEFER_UPDATE in the enabled state. The User Application 302 can defer updates in an application program, but only when using the Prefix_SetAttribute functions in the Specific Driver 308.

When one of the Ivi_SetAttribute functions is called on a particular attribute, it checks the state of the IVI_ATTR_DEFER_UPDATE attribute and the state of the IVI_VAL_NO_DEFERRED_UPDATE flag for the attribute that is being set. If IVI_ATTR_DEFER_UPDATE is enabled and the IVI_VAL_NO_DEFERRED_UPDATE flag is 0, the Ivi_SetAttribute function performs only the following actions:

Checks that the attribute is writable.
Checks the validity of the specified value.
Coerces the value, if appropriate.
Posts a deferred update.

The Ivi_AttributeUpdateIsPending function in the IVI Engine 306 returns whether an attribute has a deferred update pending on a particular channel.

The Ivi_Update function performs all of the deferred updates for the session in the order in which the calls to the Ivi_SetAttribute functions occurred. Depending on the I/O method the Specific Driver 308 uses to communicate with the instrument, the Specific Driver 308 might have to configure some I/O buffering capabilities at certain points during the processing of the updates. The Ivi_Update function handles this by calling the buffered I/O callback for the session with various messages during the update process. By default, the IVI Engine 306 installs Ivi_DefaultBufferedIOCallback as the buffered I/O callback. Ivi_DefaultBufferedIOCallback works for instrument drivers that use VISA I/O. The Specific Driver 308 can change or remove the buffered I/O callback by setting the IVI_ATTR_BUFFERED_IO_CALLBACK attribute.

Before it processes any deferred updates, IVI_Update invokes the buffered I/O callback with the IVI_MSG_START_UPDATE message. Ivi_DefaultBufferedIOCallback responds to this message by configuring the VISA I/O session so that it does not send END after each VISA write call and so that it flushes the write buffer only when it is full.

For each deferred update, Ivi_Update performs the following actions:

1. Compares the new value with the current cache value of the attribute. If the cache value is a value that the IVI Engine 306 obtained by querying the instrument and the attribute has a compare callback, Ivi_Update invokes the compare callback. Otherwise, it makes the comparison based on strict equality.
2. If the new value is not equal to the cache value or the cache value is invalid, Ivi_Update invokes the write callback for the attribute. The write callback might perform I/O to send the data to the instrument.
3. If the IVI_VAL_WAIT_FOR_OPC_AFTER_WRITES flag is set for the attribute, Ivi_Update invokes the operation complete (OPC) callback the Specific Driver 308 provides for the session. Before the Ivipdate function does so, it calls the buffered I/O callback with the IVI_MSG_FLUSH message. Ivi_DefaultBufferedIOCallback responds to this message by flushing the VISA I/O buffer.
4. If the IVI_VAL_FLUSH_ON_WRITE flag is set for the attribute and the Ivi_Update function does not invoke the operation complete callback for attribute, Ivi_Update calls the buffered I/O callback with the IVI_MSG_FLUSH message.

During this process, the Specific Driver 308 might call one of the Ivi_GetAttribute functions from a compare or write callback. If Specific Driver 308 does so, Ivi_Update invokes the buffered I/O callback with the IVI_MSG_SUSPEND message before it invokes the read callback, and it sends the IVI_MSG_RESUME message afterward. Ivi_Update also sends the suspend and resume messages around any calls it makes to the operation complete callback.

When Ivi_DefaultBufferedIOCallback receives an IVI_MSG_SUSPEND message, it restores the VISA I/O session to its original configuration. When it receives an IVI_MSG_RESUME message, it configures the VISA I/O session in the same way it does when it receives the IVI_MSG_START_UPDATE message.

The buffered I/O callback can receive multiple suspend messages before it receives a resume message. It must take action only on the first of these suspend messages, and it must not take action on resume messages until the number of resume messages matches the number of suspend messages.

After Ivi_Update performs all deferred updates, it performs the following actions:

1. Invokes the check status callback for the session if the IVI_ATTR_QUERY_INSTR_STATUS attribute is enabled and the IVI_VAL_DONT_CHECK_STATUS flag is 0 for at least one of the attributes that it updates. Before invoking the check status callback, Ivi_Update invokes the buffered I/O callback with the IVI_MSG_SUSPEND message.

2. Invokes the buffered I/O callback with the IVI_MSG_FLUSH message.

3. Invokes the buffered I/O callback with the IVI_MSG_END_UPDATE message. Ivi_DefaultBufferedIOCallback responds to this message by restoring the VISA I/O session to its original configuration.

Simulation

The present invention includes a simulation feature which enables simulation of an instrumentation system. The simulation feature enables a user to be able to write a test program which simulates the calls to the instrument driver. During a simulation, the instrumentation system performs two operations, these being 1) range checking the input values, ensuring that the user application makes valid requests to the instrument and 2) creating dummy output data in response to received commands.

This enables the user to simulate his test before the test is actually performed to ensure that the test behaves correctly. The simulation feature also enables the user to develop his test program before the instrument arrives from the vendor. Thus the simulation feature enables the user to begin development of the application earlier than would otherwise be possible.

Benefits of the Present Invention

The system and method of the present invention provides a number of features, including instrument interchangeability, state caching, simulation features, verification of replacement instruments, and an attribute/callback model.

The present invention enables a user to use a single instrument driver, referred to as a class driver, for a particular class of instruments, and the class driver operates regardless of the particular instrument within the class. In other words, the single class driver operates for a plurality of instruments of a given class. Thus, once the application is written, the user can choose any instrument within the class. Further, the user application can directly access specific functionality of an instrument, i.e., functionality which is not generic to the class, by directly accessing the specific driver.

The instrument interchangeability feature allows a user to swap instruments within a class. For example, when a user writes a test executive that runs a complex test using a number of different instruments (one or more different instruments), and one of those instruments breaks, the present invention provides the ability to replace that instrument withouthaving to rewrite the application.

Conclusion

Therefore, a system and method for controlling an instrumentation system is shown and described. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system including instrument simulation features, the system comprising:

a computer system comprising a CPU and memory;
wherein the memory of the computer system stores:
a user application which is operable to perform an application using an instrument, wherein the instrument is of a first class;
a class driver which is operable to receive calls from the user application, wherein the class driver is common to a plurality of instruments of the first class; and
a class simulation driver, wherein the class simulation driver is operable to simulate operation of the instrument.

2. The system of claim 1, wherein the class driver is operable to call the class simulation driver to simulate operation of the instrument.

3. The system of claim 1, wherein the class simulation driver is operable to simulate operation of the plurality of instruments of the first class.

4. The system of claim 1, wherein the class simulation driver is operable to simulate output values and return values of function calls.

5. The system of claim 1, wherein each of the plurality of instruments of the first class includes a specific driver which is specific to the respective instrument;
wherein the class simulation driver is operable to simulate operation of at least a portion of a specific driver for each of the plurality of instruments of the first class.

6. The system of claim 5,
wherein the memory of the computer system further stores a specific driver that is specific to the instrument, wherein the specific driver includes simulation features for simulating control of the instrument;
wherein the class driver is operable to call the class simulation driver to simulate operation of the instrument;
wherein the class driver is further operable to call the specific driver to simulate operation of the instrument.

7. The system of claim 6, wherein, in simulating operation of the instrument, the specific driver is operable to perform range checking.

8. The system of claim 6, wherein, in simulating operation of the instrument, the specific driver is operable to return dummy data.

9. The system of claim 6, wherein the class driver is operable to call the class simulation driver to simulate operation of at least a portion of the specific driver.

10. The system of claim 6,
wherein the class driver is operable to call the specific driver to check input parameters;
wherein the class driver is operable to call the class simulation driver to simulate operation of the specific driver.

11. The system of claim 6,
wherein the class driver includes a class simulation feature which is operable to be enabled or disabled;
wherein, if class simulation is disabled:
the class driver is operable to call the specific driver; and
the specific driver is operable to perform range checking;
wherein, if class simulation is enabled:
the class driver is operable to call the specific driver;
the specific driver is operable to perform range checking;
the class driver is operable to call the class simulation driver;
the class simulation driver is operable to return dummy data; and
the class simulation driver is operable to simulate function return values.

12. The system of claim 6,
wherein the class driver is operable to initialize the class simulation driver;
wherein the class driver is operable to provide a handle of the specific driver to the class simulation driver;
wherein the class simulation driver is operable to obtain information from the specific driver.

13. A system including instrument simulation features, the system comprising:
a computer system comprising a CPU and memory;
wherein the memory of the computer system stores:
a user application which is operable to perform an application using an instrument, wherein the instrument is of a first class;
a specific driver which is specific to the instrument;
a class driver which is operable to receive calls from the user application, wherein the class driver is common to a plurality of instruments of the first class; and
a class simulation driver, wherein the class simulation driver is operable to simulate at least a portion of the specific driver.

14. The system of claim 13, wherein the class driver is operable to call the class simulation driver to simulate operation of the at least a portion of the specific driver.

15. The system of claim 13, wherein each of the plurality of instruments of the first class includes a specific driver which is specific to the respective instrument;
wherein the class simulation driver is operable to simulate operation of at least a portion of a specific driver for each of the plurality of instruments of the first class.

16. The system of claim 13, wherein the class simulation driver is operable to simulate output values and return values of function calls.

17. The system of claim 13, wherein the class simulation driver is operable to simulate operation of the plurality of instruments of the first class.

18. A memory medium comprising program instructions for simulating operation of an instrument, the memory medium comprising:
a user application which is operable to perform an application using an instrument, wherein the instrument is of a first class;
a class driver which is operable to receive calls from a user application, wherein the class driver is common to a plurality of instruments of the first class; and
a class simulation driver, wherein the class simulation driver is operable to simulate operation of the instrument.

19. The memory medium of claim 18, wherein the class driver is operable to call the class simulation driver to simulate operation of the instrument.

20. The memory medium of claim 18, wherein the class simulation driver is operable to simulate operation of the plurality of instruments of the first class.

21. The memory medium of claim 18, wherein the class simulation driver is operable to simulate output values and return values of function calls.

22. The memory medium of claim 18, wherein each of the plurality of instruments of the first class includes a specific driver which is specific to the respective instrument;
wherein the class simulation driver is operable to simulate operation of at least a portion of a specific driver for each of the plurality of instruments of the first class.

23. The memory medium of claim 18,
wherein the memory medium further stores a specific driver that is specific to the instrument, wherein the specific driver includes simulation features for simulating control of the instrument;
wherein the class driver is operable to call the class simulation driver to simulate operation of the instrument;
wherein the class driver is further operable to call the specific driver to simulate operation of the instrument.

24. The memory medium of claim 23, wherein, in simulating operation of the instrument, the specific driver is operable to perform range checking.

25. The memory medium of claim 23, wherein, in simulating operation of the instrument, the specific driver is operable to return dummy data.

26. The memory medium of claim 23, wherein the class driver is operable to call the class simulation driver to simulate operation of at least a portion of the specific driver.

27. The memory medium of claim 23,
wherein the class driver is operable to call the specific driver to check input parameters;
wherein the class driver is operable to call the class simulation driver to simulate operation of the specific driver.

28. The memory medium of claim 23,
wherein the class driver includes a class simulation feature which is operable to be enabled or disabled;
wherein, if class simulation is disabled:
the class driver is operable to call the specific driver; and
the specific driver is operable to perform range checking;
wherein, if class simulation is enabled:
the class driver is operable to call the specific driver;
the specific driver is operable to perform range checking;
the class driver is operable to call the class simulation driver;
the class simulation driver is operable to return dummy data; and
the class simulation driver is operable to simulate function return values.

29. The memory medium of claim 23,
wherein the class driver is operable to initialize the class simulation driver;
wherein the class driver is operable to provide a handle of the specific driver to the class simulation driver;
wherein the class simulation driver is operable to obtain information from the specific driver.

30. A method for simulating an instrument, the method comprising:
a user application invoking functionality of a class driver to perform an application using an instrument, wherein the instrument is of a first class, wherein the class driver is common to a plurality of instruments of the first class;
the class driver invoking functionality in a class simulation driver; and
the class simulation driver simulating operation of the instrument.

31. The method of claim 30, wherein the class simulation driver is operable to simulate operation of each of the plurality of instruments of the first class.

32. The method of claim 30, wherein the class simulation driver simulating operation of the instrument comprises the class simulation driver simulating output values and returning values of function calls.

33. The method of claim 30, wherein the instrument includes a specific driver which is specific to the instrument;

wherein the class simulation driver simulating operation of the instrument comprises the class simulation driver simulating operation of at least a portion of the specific driver.

34. The method of claim 33, wherein the specific driver includes simulation features for simulating control of the instrument;

the method further comprising the class driver calling the specific driver to simulate operation of the instrument.

* * * * *